United States Patent [19]

Bauerle et al.

[11] Patent Number: 4,992,942
[45] Date of Patent: Feb. 12, 1991

[54] APPARATUS AND METHOD FOR CONTROLLING A SYSTEM, SUCH AS NUTRIENT CONTROL SYSTEM FOR FEEDING PLANTS, BASED ON ACTUAL AND PROJECTED DATA AND ACCORDING TO PREDEFINED RULES

[75] Inventors: William L. Bauerle; Robert P. Fynn, both of Wooster, Ohio

[73] Assignee: Bahm, Inc., St. Louis, Mo.

[21] Appl. No.: 302,765

[22] Filed: Jan. 25, 1989

[51] Int. Cl.$^5$ .................... A01D 46/00; A01G 13/00; A01G 27/00

[52] U.S. Cl. .................................. 364/420; 364/513; 364/140; 364/152

[58] Field of Search ............... 364/400, 420, 513, 140, 364/152

[56] References Cited

U.S. PATENT DOCUMENTS

| | | | |
|---|---|---|---|
| 3,578,431 | 5/1971 | Ingestad et al. | 71/1 |
| 3,892,982 | 7/1975 | Holmes | 307/118 |
| 4,015,366 | 4/1977 | Hall, III | 364/172 |
| 4,178,716 | 12/1979 | Harper et al. | 147/62 |
| 4,209,131 | 6/1980 | Barash et al. | 239/68 |
| 4,245,433 | 1/1981 | Sjostedt et al. | 47/59 |
| 4,557,071 | 12/1985 | Fah | 47/81 |

FOREIGN PATENT DOCUMENTS 0142989  5/1985  European Pat. Off. .

OTHER PUBLICATIONS

Dionex sales brochure, Series 8100 Process Analyzer, p. 2.
Dionex sales brochure, Soil, Water and Plant Analysis by Ion Chromatography, pp. 2-4.
Peter W. Cheung, Introduction to CHEMFET Sensor Technology, p. 5.
Fraser, J. M. and R. P. Fynn, A Direct Derivation of the Multi-Attribute Utility Function, Department of Industrial and Systems Engineering Working Paper 88-001, Ohio State University, Columbus, Ohio, 1988.
Clemmens, Albert J. and Kenneth H. Solomon, "Potential Soil and Water Application of Expert Systems Technology", ASAE Paper No. 86-5038, St. Joseph, Mich., American Society of Agricultural Engineers, 1986.
Giacomelli, Gene A., "Expert Systems Development for Greenhouse Potted Plant Production", ASAE Paper No. 87-5012, St. Joseph, Mich., American Society of Agricultural Engineers, 1987.
Smith, R. D., J. R. Barrett and R. M. Peart, "Crop Production Management with Expert Systems", ASAE Paper No. 85-5521, St. Joseph, Mich., American Society of Agricultural Engineers, 1985.
Motorola MIR 300 "Computerized Irrigation Control System".
Nantais, Thomas "Automatic Fertilizer Concentration Control", 1986.

*Primary Examiner*—Allen R. MacDonald
*Attorney, Agent, or Firm*—Senniger, Powers, Leavitt & Roedel

[57] ABSTRACT

A nutrient control system for nourishing plants. An injector provides a quantity of nourishment having individual concentrations of specific nutrients. A conduit distributes the quantity of nourishment to the plants. First storage memory stores initial data relating to the plants being nourished. A computer selects the amounts of specific nutrients and selects the quantity of nourishment to be applied to the plants based on the initial data in the first storage memory and, responsive to the selection, controls the injector to adjust the individual concentrations of the specific nutrients and the quantity of nourishment to be supplied to the plants as a function of the selected amounts of the specific nutrients and the selected quantity of nourishment.

48 Claims, 9 Drawing Sheets

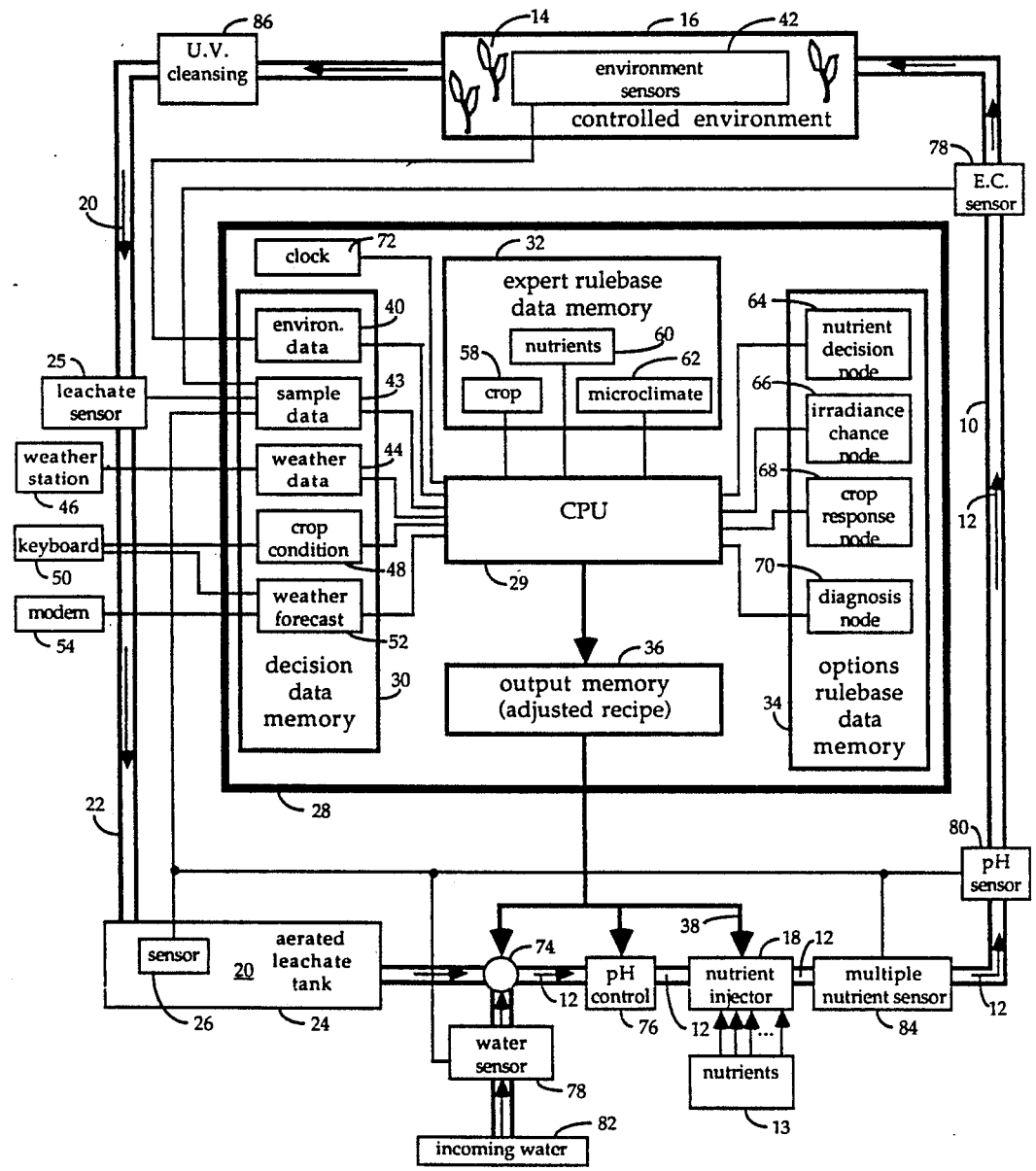
Figure 1 Block diagram of the close loop system
© 1988 BAHM, Inc.

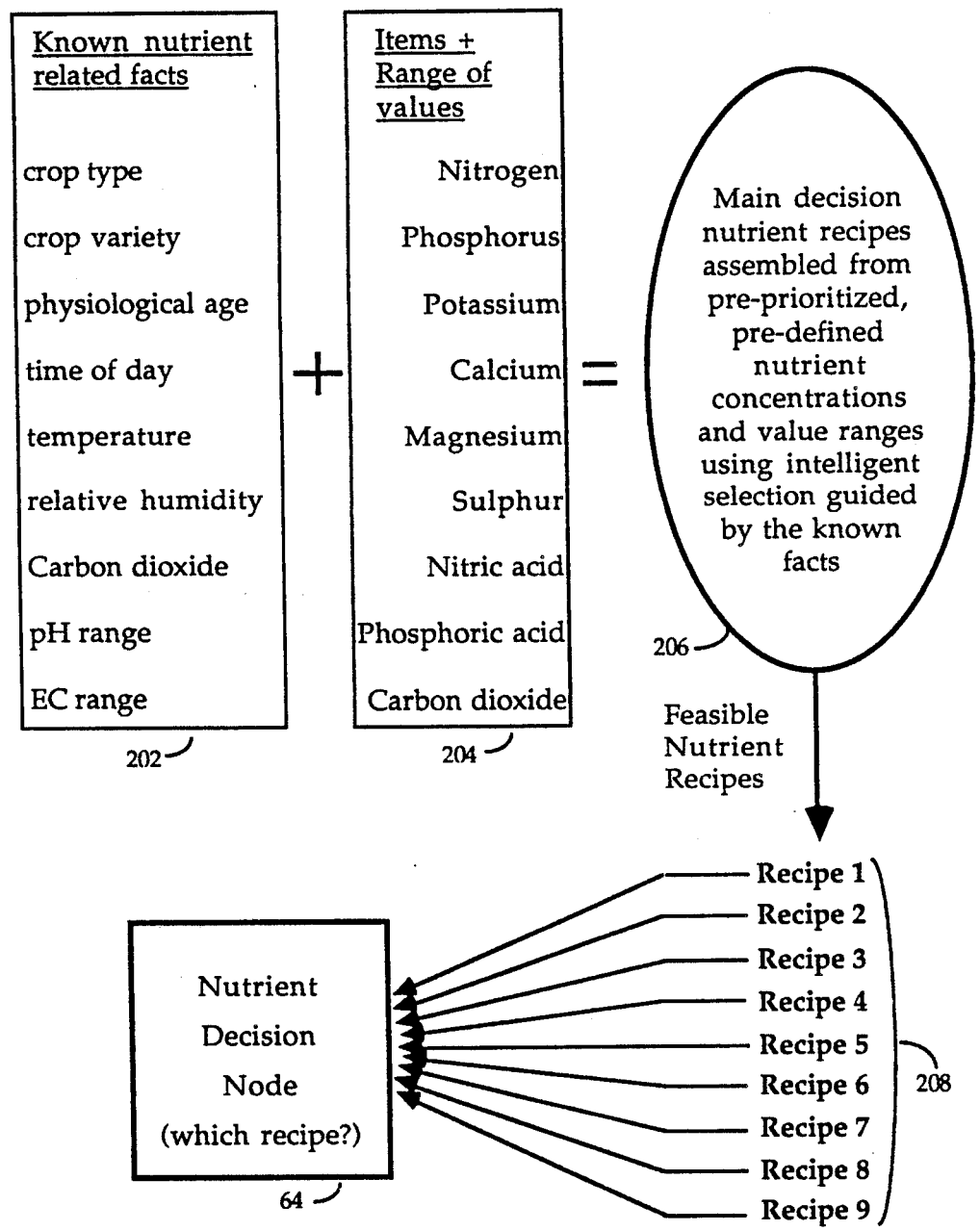
Figure 2 Nutrient Decision Node
© 1988 BAHM, Inc.

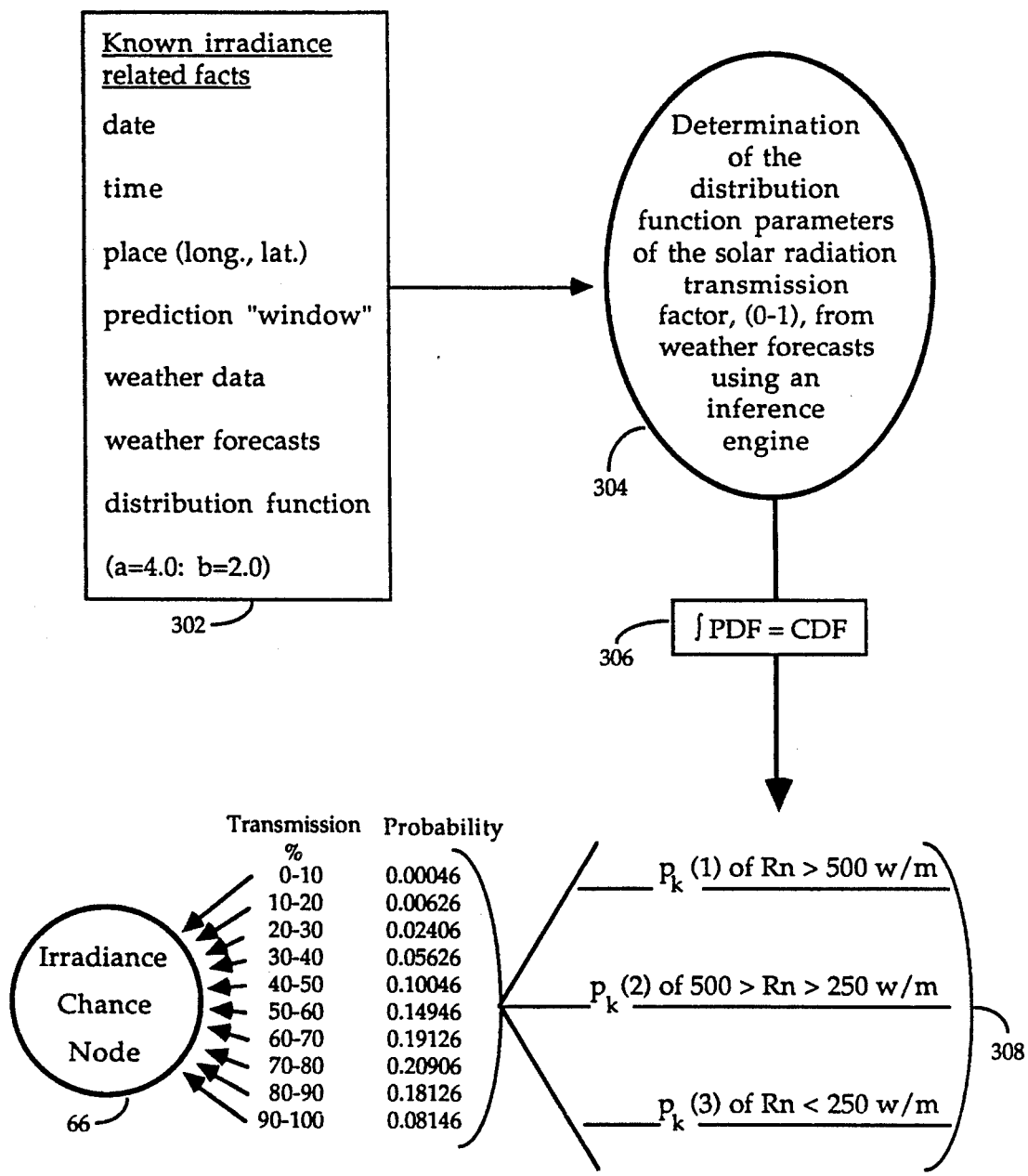
Figure 3 Solar Irradiance Transmission Probability Distribution
© 1988 BAHM, Inc.

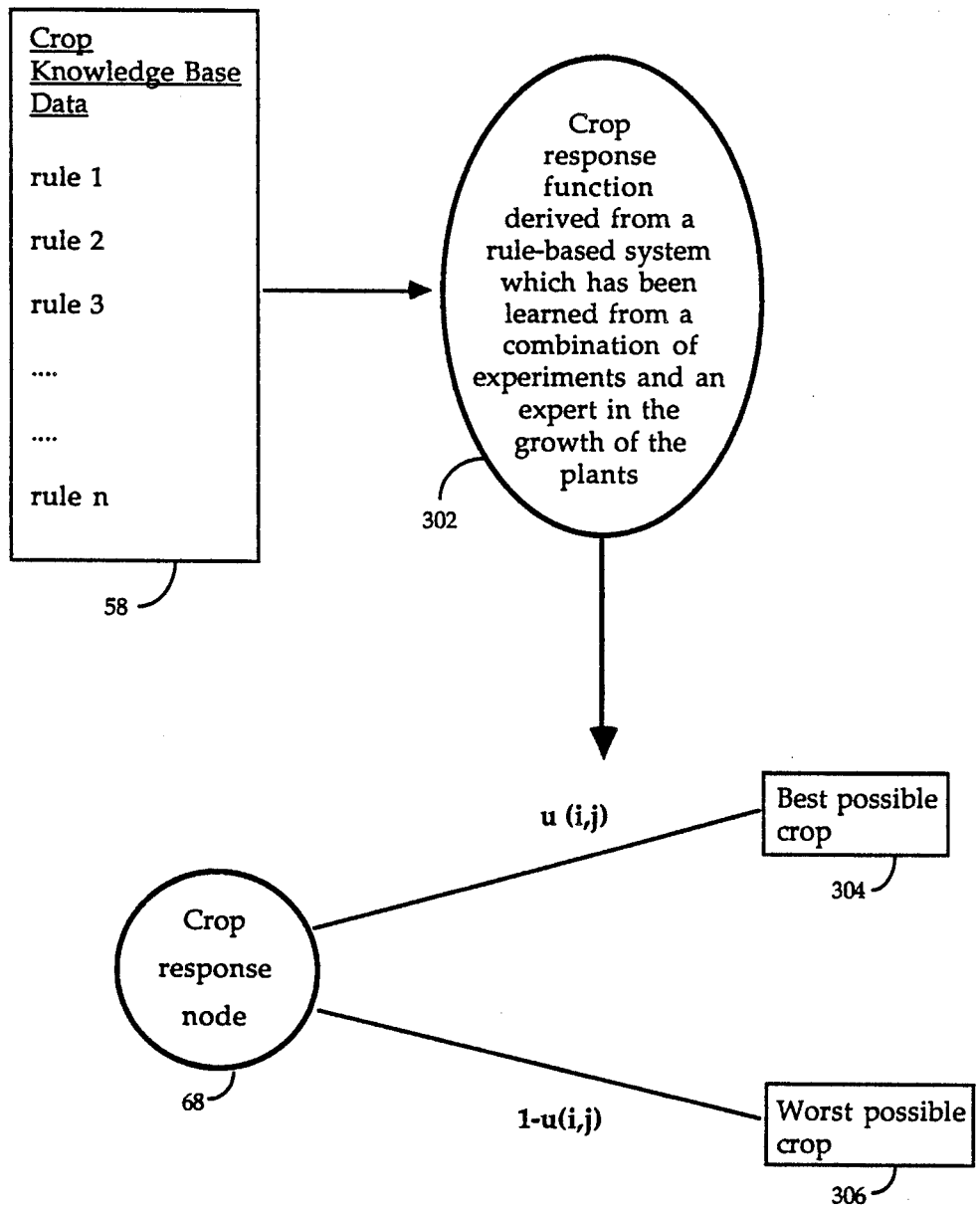
Figure 5 Crop response function
© 1988 BAHM, Inc.

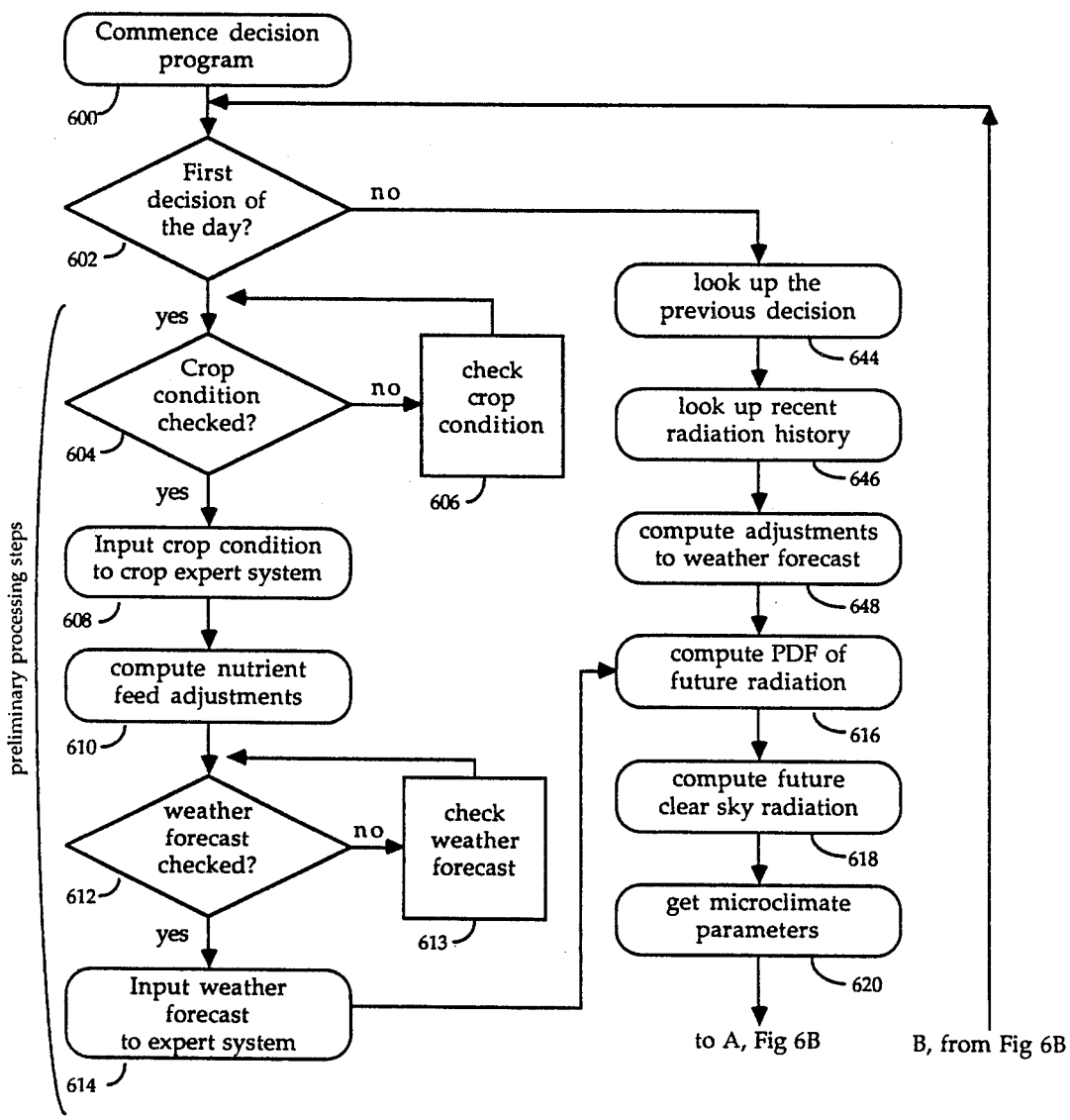
Figure 6A Open loop decision flow chart (part 1 of 2)
© 1988 BAHM, Inc.

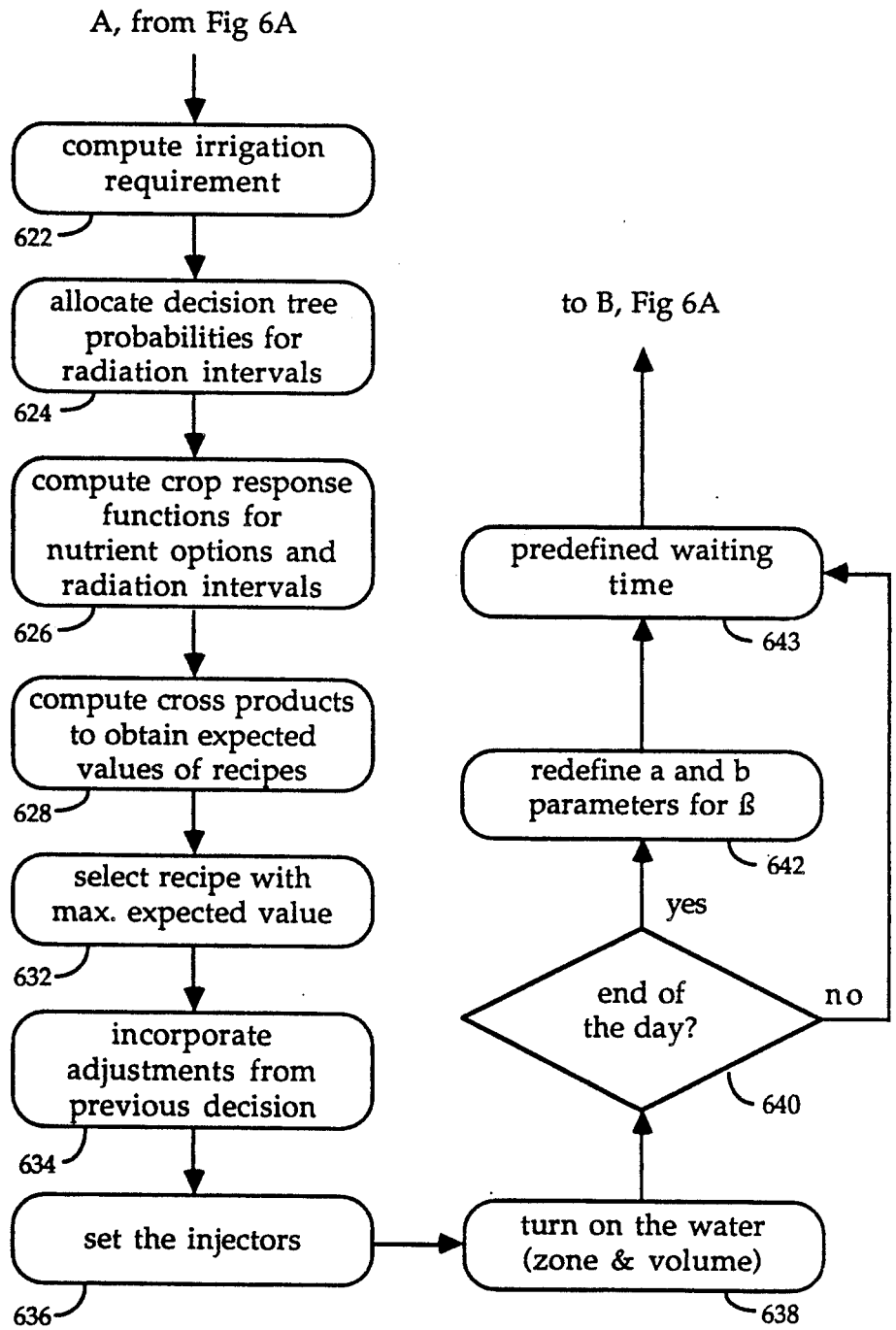
Figure 6B Open loop decision flow chart (part 2 of 2)
© 1988 BAHM, Inc.

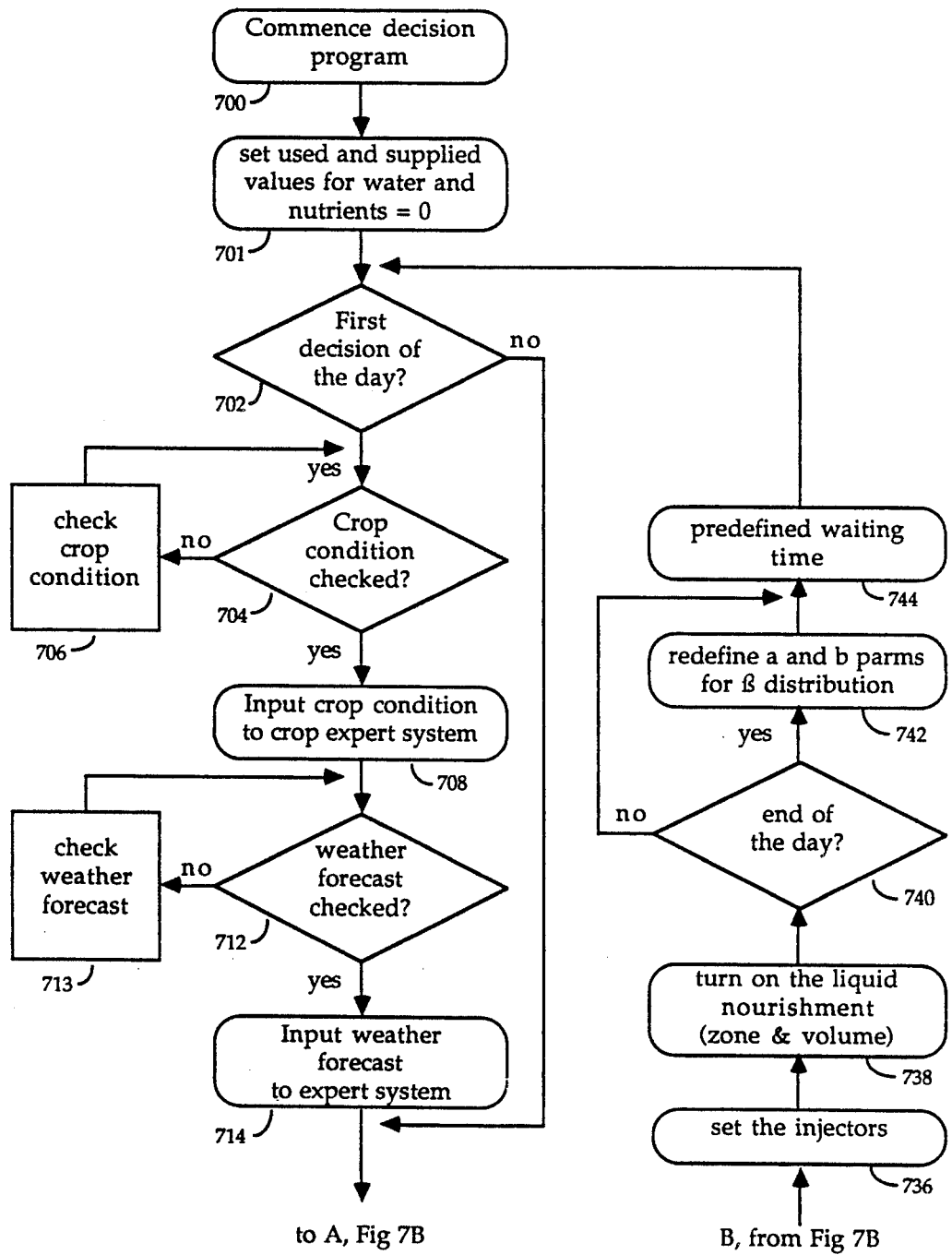
Figure 7A Closed loop decision flow chart (part 1 of 2)
© 1988 BAHM, Inc.

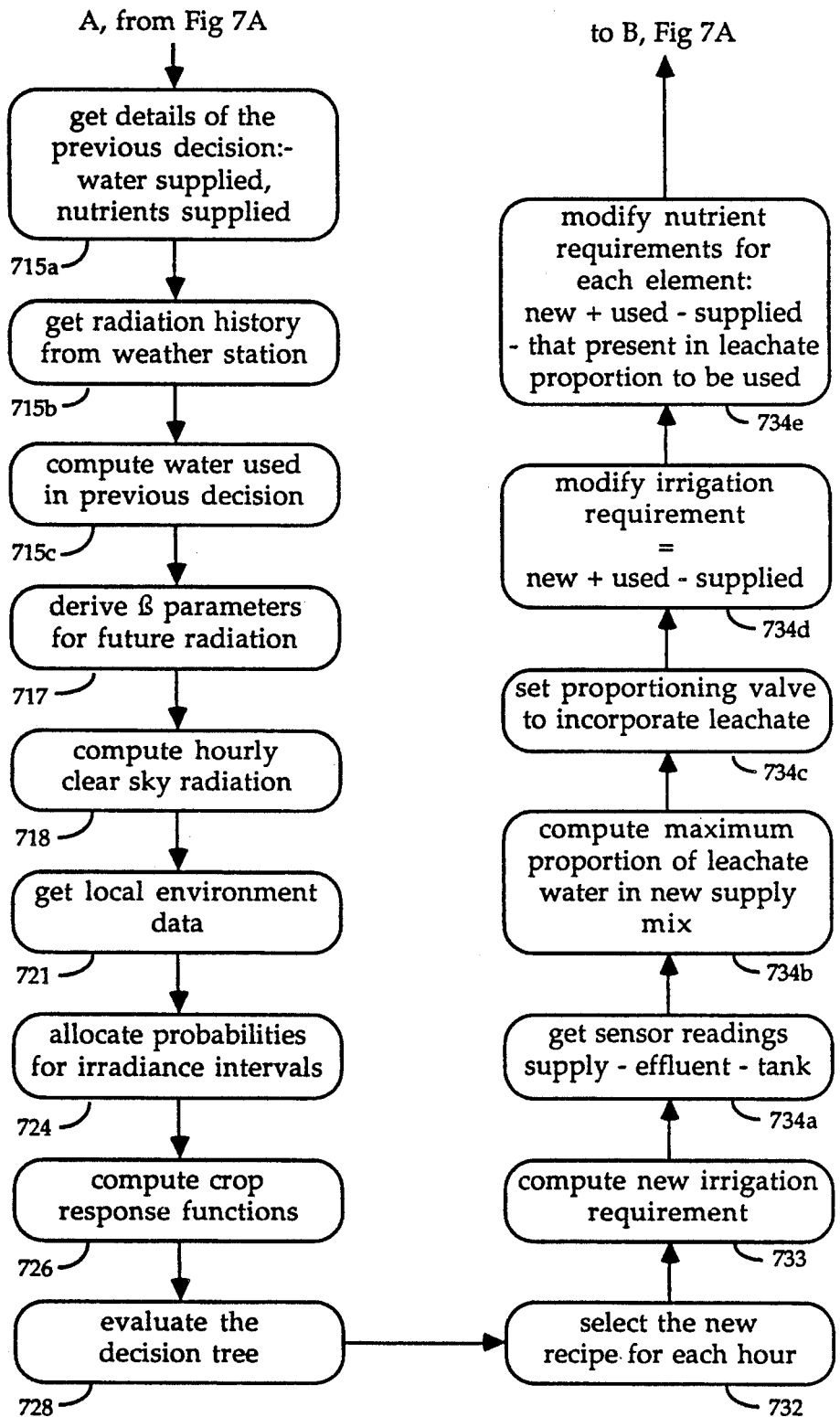
Figure 7B Closed loop decision flow chart (part 2 of 2)
© 1988 BAHM, Inc.

APPARATUS AND METHOD FOR CONTROLLING A SYSTEM, SUCH AS NUTRIENT CONTROL SYSTEM FOR FEEDING PLANTS, BASED ON ACTUAL AND PROJECTED DATA AND ACCORDING TO PREDEFINED RULES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. © 1988 BAHM, INC.

BACKGROUND OF THE INVENTION

The field of the invention generally relates to an apparatus and method for controlling a system affected by stochastic variables and, in particular, to a nutrient control system for nourishing plants.

In agriculture many management decisions are repetitive and made in the context of limited resources, with limited knowledge of possible future events. These decisions are important to the growth and nurturing of crops because actions taken early in the life of a plant can profoundly affect its health and total yield. Plant growth management expertise results from years of cultivating living plants, and decisions are influenced by experience garnered over the years.

There exists a need to be able to coordinate many parameters, both objective and subjective, in order to make decisions which satisfy minimum standards of all variables. The effects of some decisions may remain unknown for a long time and thus systems of control through immediate feedback become impossible. Often the outcomes can only be estimated, but there exists the ability to make reasonable predictions based upon the expertise of people knowledgeable in the area. Computerized decision making which benefits from this human expertise is desirable.

Horticultural production, a prime example of controlled environment agriculture, could usefully incorporate the concepts and practicalities of computerized decision making. Consideration of all of the management options required to be evaluated in a horticultural operation is an enormous task. Competition in the production of horticultural crops continues to intensify. Planting, variety selection, fertilization, pest management, disease and weed control and harvest and delivery have been examined. As a result, the adoption of more advanced techniques of decision analysis, artificial intelligence and expert systems as possible solutions have been proposed.

The science of decision analysis has been assembled over many years to analyze various outcomes of decision options in order to conclude which of the available options would be the most advantageous. The construction of decision trees and the use of probabilities and utility functions to arrive at an optimal decision out of a set of options has been used for scenarios from investments to fire fighting to the siting of the Mexico airport. The methodology has been established and the Bayesian view of probability is straightforward and mathematically sound.

Decision analysis necessitates the derivation of the probabilities, outcomes and/or utilities that are required to construct a decision tree. The computer science world, in its research into artificial intelligence, has introduced a computer programming approach commonly referred to as an inference engine which could be used to give probabilities, outcomes, and utilities. An inference engine is an algorithm used with knowledge bases to infer conclusions. Such a system comprising an engine and knowledge base is called an expert system, as the knowledge based files are usually constructed from the knowledge of a person or persons having expertise in the area of concern.

In analyzing the respective roles played by experts and decision analysts, it was concluded that the expertise gained through years of experience by an expert could be referred to as "soft logic". It is not founded in math, but it could be perfectly sound, and it would be subject to manipulation by changes of evidence.

Conversely, the science of decision analysis could be referred to as "hard logic." Decision analysis was founded in math with very specific theorems and proofs. Varying inputs could produce varying outputs, but the means by which those outputs were computed remained the same.

There is also a need for a model combining decision analysis, with its mathematics or "hard logic" approach, and expert systems, with their intuitive expertise or "soft logic" so that consistent, repetitive, short-term decisions could be made. There is also a need for a model that could be assembled in computer memory in such a way that a computer could make such a "decision" and act upon it. There is also a need for such a model to make operational decisions regarding the control of systems. There is also a need for such a model to be built and implemented to control systems such as a controlled environment or a greenhouse, so that the grower is free to make tactical decisions rather than operational decisions.

Operational decisions made on the production of plants grown in a controlled environment should incorporate considerations of incoming solar radiation, heating and ventilating, carbon dioxide levels, irrigation and nutrient supply and the possibility of disease and/or pests. The production of the plants depends on maintaining the growth parameters, temperature, relative humidity, carbon dioxide concentration, radiation, and water and nutrient supply, within predefined limits to achieve acceptable growth, output and quality. These limits vary depending upon the maturity of the plant, the type of plant that is being grown, the environmental conditions and the solar radiation available.

Some of the parameters change value quickly and some change slowly. Temperature and relative humidity effects of heating and cooling the air in a controlled environment could be evident within seconds, particularly close to heating pipes. Plant uptake of water and nutrients have time constants of the order of minutes. Intermittent solar energy fluctuations can have time constants of minutes, but major radiation fluctuations take place diurnally. Finally, the item which is the most important, the output, takes weeks or months to reach maturity and then fluctuates in production from one day to the next.

In order to operate such a decision model successfully, there is a need to identify the controllable variables, the stochastic variables and the indices of performance.

SUMMARY OF THE INVENTION

It is an object of this invention to provide a decision making model that exploits the advantages of both decision analysis and expert systems in such a way that the model makes better decisions than those made by either decision analysis or expert systems used alone.

It is another object of this invention to provide a model applicable to a specific problem of nutrient feeding in agriculture.

It is another object of this invention to provide a computer model which can make decisions controlling the operation of a controlled environment and act upon these decisions in a meaningful way.

It is yet another object of this invention to provide an apparatus for controlling component quantities of a system affected by stochastic variables by projecting the value of the stochastic variables.

It is another object of this invention to provide a nutrient control system for nourishing plants which anticipates the nutrient needs of the plants based on projected solar irradiance levels, carbon dioxide consumption of plants and/or the photosynthesis rate.

It is still another object of this invention to provide a nutrient control system for nourishing plants which selects a recipe of nutrients which has the highest probability of producing a desired result.

It is another object of this invention to provide nutrient control system for nourishing plants during the course of a day which employs an injector for injecting nutrient quantities into an open or closed loop irrigation system wherein the injected quantities are based on the nutrient amounts the plants need to produce a desired result under the solar irradiance levels which are projected for the day.

In one form, the invention is an apparatus for controlling, during a given period of time, component quantities of a system affected by one or more stochastic variables and by one or more measured variables to direct the system toward a desired status. Controller means controls the component quantities of the system. Determining means determines the stochastic variables and the measured variables preceding the given period of time. Memory means stores initial data corresponding to the stochastic variables and the measured variables determined by the determining means. Computer control means includes estimating means for estimating projected stochastic variables for the given period of time based on the initial data in the memory means; calculating means for calculating projected component quantities having the highest probability of producing the desired status of the system based on the initial data in the memory means and based on the projected stochastic variables; and means, responsive to the calculating means, for controlling the controller means to adjust, during the given period of time, the component quantities as a function of the projected component quantities.

In another form, the invention is a nutrient control system for nourishing plants. Means provides a quantity of nourishment having individual concentrations of specific nutrients. Means distributes the quantity of nourishment to the plants. First storage means stores initial data relating to the plants being nourished. Computer control means includes means for selecting the amounts of specific nutrients and for selecting the quantity of nourishment to be applied to the plants based on the initial data in the first storage means; and means, responsive to the selecting means, for controlling the providing means to adjust the individual concentrations of the specific nutrients and the quantity of nourishment to be supplied to the plants as a function of the selected amounts of the specific nutrients and the selected quantity of nourishment.

In still another form, the invention is a method of controlling, during a given period of time, component quantities of a system affected by stochastic variables and by measured variables to direct the system toward a desired status. The component quantities of the system are controlled and the stochastic variables and the measured variables preceding the given period of time are determined. Initial data corresponding to the stochastic variables and the measured variables determined by said determining step is stored. The projected stochastic variables for the given period of time are estimated based on the initial data. The projected component quantities having the highest probability of producing the desired status of the system based on the initial data and based on the projected stochastic variables are projected. In response to said calculating step, the controlling step adjusts, during the given period of time, the component quantities as a function of the projected component quantities.

Other objects and features will be in part apparent and in part pointed out hereinafter.

BRIEF DESCRIPTION OF THE DRAWINGS

FIG. 1 is a functional block diagram, partially in schematic, of the closed loop system according to the invention.

FIG. 2 is a diagrammatic description of the operation of the nutrient decision node showing the relationships involved in the process of generating the assembly of feasible nutrient recipes.

FIG. 3 is a diagrammatic description of one example of the operation of the irradiance and photosynthesis chance node showing the relationships involved in the process of generating the probability distribution of the solar irradiance transmission intervals wherein the beta parameters are $a=4.0$ and $b=2.0$.

FIG. 5 is a diagrammatic description of the operation of the crop response node showing the relationships involved in the process of generating the crop response function of the potential crop growth.

FIGS. 6A and 6B are a flow chart of the open loop decision process according to the invention wherein leachate is permitted to drain off.

FIGS. 7A and 7B are a flow chart of the closed loop decision process according to the invention wherein leachate is recirculated.

Corresponding reference characters indicate corresponding parts throughout the several views of the drawings.

BRIEF DESCRIPTION OF APPENDICES

Figure 4C:
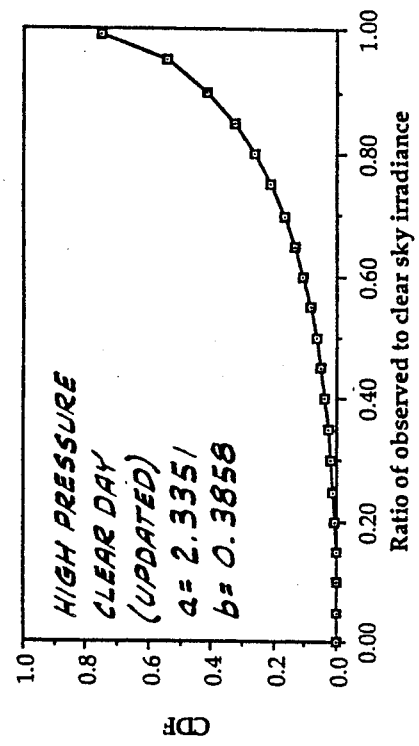
FIGS. 4C and 4D are graphs of the cumulative density function (CDF) versus the ratio of observed clear sky irradiance for the statistics of Tables V and VI updated with actual observed irradiance.

Appendix A—Software Listing
Appendix B—Crop Nutrition Rulebase
Appendix C—The Beta Distribution
Appendix D—Clear Sky Irradiance Model

DETAILED DESCRIPTION OF PREFERRED EMBODIMENTS

The system of the invention formulates a decision model for controlling component quantities of a system to solve classes of problems having the following characteristics:

having a solution requiring real-time control, i.e., a solution depending on measurable variables;

for component quantities which define identifiable actions that could be taken;

having a solution which depends upon future occurrences which are probabilistic in nature, i.e., a solution depending on stochastic variables which can be predicted with some degree of accuracy;

for system outcomes whose values are based upon non-monetized as well as monetized entities; and, for a system requiring ability to enhance results by adaption and learning.

In one preferred embodiment, the model is a nutrient decision model for a controlled environment agriculture system for growing plants; the component quantities are quantities of nutrients to be fed to the plants being grown; the measured variables are the environmental conditions, leachate components and crop condition; and the stochastic parameters are future weather conditions. The decision model calculates the available options and determines which option is the most advantageous from the point of view of the environment, the crop and the responsible use of resources.

The fundamental process that is modeled in this invention is one of competent decision making. It is not a model that makes only decisions, but one that draws upon a large base of experience to make competent decisions. It is established upon known principles, facts and accepted knowledge. Relevant scientific disciplines involved include use of decision analysis, stochastic processes, utility functions, expert systems, plant science, climatology, computer modeling, electronics and control.

The nutrient decision model aids the grower in the management of all plants such as cucumbers, tomatoes, bedding plants and ornamental crops in controlled environments. Timely supply of nutrients to the individual plant so as to make optimum use of available sunlight within the temperature and humidity constraints imposed upon the plant by the environment is essential. If the stress on the plant is controlled by appropriate nutrient selection methods, then the plant tends to produce a higher yield of fruit or flower at a higher quality.

The grower can control all components of the plant environment, such as temperature, humidity and nutrient supply, except for sunlight. The nutrient decision model of the invention optimizes the nutrient supply for a given period, such as one day, according to the conditions that prevail at the beginning of the given period and the probabilities applying to the forecast of sunlight conditions within the given period. The use of the model of the invention moves the grower from being a person who makes operational decisions to one who makes tactical decisions. The growth system as a whole is monitored and controlled, and decisions are made in real time by the computer system of the invention, based upon probabilities of future events.

Referring to FIG. 1, a block diagram of the closed loop nutrient control system according to the invention for nourishing plants is illustrated. The system includes conduit means, such as supply pipe 10, for delivering liquid nourishment 12 to the plants 14 being grown in controlled environment 16. Nutrient injector 18 (such as the Control System and Method for Chemical Injectors invented by Herbert E. Anderson, Jr. and described in co-pending Ser. No. 07/266,885, filed Nov. 3, 1988) introduces into the supply pipe 10 individual quantities of specific nutrients 13. Nutrient injector 18 is adjustable to vary individual quantities of each nutrient 13 being introduced into supply pipe 10. In general, injector 18 comprises any feed control system responsive to control signals provided by a computer for adding nutrients to the liquid nourishment 12. The feed control system preferably must be accurately dependable, able to meter the amount of water or liquid nourishment being supplied, precise in adjusting and controlling the concentrations of the nutrients in the liquid nourishment and able to deliver as nutrients fluid chemicals of different densities. For example, injectors 18 may be high-accuracy chemical feed pumps or mixing valves which mix the liquid nourishment with one or more nutrients in a controllable ratio. The computer would selectively activate the pumps or open or close the mixing valves to control the amount of nutrients added to the liquid nourishment.

The liquid nourishment 12 including the injected quantities, if any, of nutrients 13 is checked by multiple nutrient sensor 84 to ensure that injector 18 is operating properly and to verify that the liquid nourishment 12 has the correct nutrient concentrations. The nourishment is provided to plants 14 by an irrigation delivery system such as those known in the prior art. Unused liquid nourishment 12 which is supplied to plants 14 is collected as liquid leachate 20 by return pipe 22. The leachate, which may be treated before reuse such as by ultraviolet cleanser 86, is stored in tank 24 where it may be further treated or aerated, such as by bubbling air therethrough. Accordingly, the liquid nourishment 12 comprises water 82 containing nutrients as determined by water sensor 78, leachate 20 mixed with the water by valve 74, and nutrients 13 injected into the mixture by injector 18.

The system of the invention is also provided with means for measuring the concentrations of specific nutrients in the liquid leachate. For example, sensor 25 may be located in return line 20 and sensor 26 may be located within the leachate tank 24 for measuring the concentrations of specific nutrients in the liquid leachate 20. Computer control 28 is responsive to sensors 25 and 26 and controls the nutrient injector 18 to adjust the quantity of liquid nourishment 12 and/or the individual quantities of specific nutrients 13 in the quantity of liquid nourishment 12. Computer control 28 performs this adjustment as a function of the measured concentration of the specific nutrients 13 in the liquid leachate 20 as measured by sensors 25 and 26. As a result, the individual concentrations of the specific nutrients 13 in the quantity of liquid nourishment 12 being supplied to plants 14 is controlled in response to the concentrations of specific nutrients 13 in the liquid leachate 20 as measured by sensors 25 and 26. The quantity of liquid nourishment 12 supplied to injector 18 is a combination of water and liquid leachate 20 provided by valve 74 as controlled by control 28 and has a pH responsive to pH control 76 as controlled by control 28. As a result, nutrients are supplied to the plants according to the needs of the plant. It is the metabolic rate of the plant that determines the nutrient concentrations being supplied. Plants will actively take up nutrients. Which nutrients are taken up and the amount taken are based on the plant metabolism and not based on the applied concentrations. Of course, there is some osmotic penetration of the nutrients into the roots. Sensor 84 confirms that the proper recipe of nutrient concentrations is being provided by injector 18. The system of the invention is a feed forward system predicting the plants needs based on past uptake by the plant and based on projected solar irradiance levels. After delivery of the leachate, feedback information is provided by leachate sensor 20 to indicate what nutrients are being taken up. Sensor 84 may be used for feedback to control the concentrations being delivered, particularly if injector 18 is not accurate.

In general, the information which is processed by computer control 28 to determine the control of nutrient injector 18 is stored in three different memories and falls into three categories. Decision data memory 30 stores decision data relating to the environment of the plants 14 being nourished. Expert rulebase data memory 32 stores expert rulebase data relating to predefined rules to be followed when nourishing the plants 14. Options rulebase data memory 34 stores rulebase data relating to options resulting from processing of the decision data according to the rules defined by the expert rule base data. Computer control 28 then selects the amounts of specific nutrients and the quantity of nourishment corresponding to the option with the highest probability of producing a desired result in plants 14. Computer control 28 then controls the nutrient injector 18 to adjust the individual concentrations of the specific nutrients and the quantity of liquid nourishment to be supplied to the plants as a function of the selected amounts of the specific nutrients and the selected quantity of liquid nourishment. In particular, the adjusted recipe for the liquid nourishment is stored in output memory 36 and supplied to nutrient injector 18 via line 38.

Referring to FIG. 1, the system operates in the following manner. At the beginning of each day (or other given period of time), decision data is collected and stored in decision data memory 30 Generally, the expert rulebase data stored in memory 32 does not change on the day to day basis. This data relates to the particular system, the particular crops and the particular location of controlled environment 16. Any changes to the expert rulebase data would be entered into memory 32 at the beginning of the growth cycle before the system initiates control. Computer control 28 then calculates the options rulebase data and stores such data in memory 34. Finally, computer control 28 selects the option which provides the highest probability of achieving the desired results and stores the recipe corresponding to this option in output memory 36. This is referred to as an adjusted recipe because the recipe would change according to changes in the solar irradiance levels so that the newly stored recipe would be an adjustment of the recipe of the previous time period. This adjusted recipe is then used for the upcoming period to control the nutrients in liquid nourishment 12 which is supplied to plants 14 via supply pipe 10. The time period is dictated, in part, by the fluctuations in the solar irradiance levels.

The decision data includes environmental data (measured variables) gathered by the environment sensors 42 in controlled environment 16. This data would include such information as air and soil temperature, moisture content in the air and soil and any other environmental factors which may affect plant growth.

The decision data also includes weather data 44 provided by weather station 46. This weather data would indicate the weather conditions of the area at which the controlled environment is located. This data would include information which describes the environment around the controlled environment such as temperature, humidity, barometric pressure, height and density of cloud cover, percent of cloud cover, wind speed and any other weather factors which may affect the environment surrounding controlled environment 16.

Decision data would also include crop condition data 48. In one preferred embodiment, this data would be manually provided by an operator via keyboard 50. Crop condition data would describe the condition of the crop such as the leaf condition including the color and rigidity, physical dimensions, root condition or any other aspects of the physical condition of the plants 14.

Keyboard 50 may also be employed to provide weather forecast data 52 describing the weather forecast for the upcoming period which is to be controlled, e.g., one day. Alternatively, modem 52 may be connected to a database or other source of information which would provide weather forecast data. The weather forecast data would include information such as fronts, including their position and direction and speed of movement, projected temperatures, projected cloud cover and any other weather forecasting data which may affect the weather to which controlled environment 16 would be subjected in the upcoming day.

Decision data also includes sample data 43 provided by various sensors and alarms. In one preferred embodiment of the invention, the sample data would be provided by sensors 25 and 26 and indicate the level of the nutrients in the leachate 20 and the level of the nutrients stored in leachate tank 24, respectively. In the closed loop embodiment according to the invention, the leachate 20 is recirculated for reuse. Therefore, the level of nutrients in the leachate 20 must be determined so that computer control 28 can calculate the amount of leachate 20 and the amount of water and nutrients which must be added to leachate 20 in order to achieve the desired recipe. Water sensor 78 measures the level of nutrients in the water being supplied to mixing valve 74.

The expert rulebase data stored in memory 32 includes data which is in three categories: crop, nutrients and microclimate. The crop data are profiles of the particular crops being grown. These profiles provide a description of the growth cycle and the minimum and maximum amounts of each nutrient which may be supplied to each crop during its various growth cycle. Nutrient data 60 includes a description of the various nutrients which are available and the range of concentrations in which nutrient injector 18 is able to supply the nutrients. Microclimate data 62 includes data describing the environmental control of the controlled environment 16 such as the temperature, moisture and air conditioning control capabilities of the controlled environment 16, and their limits of operation. Microclimate data 62 also includes the rules by which the weather data 44 and weather forecast data 52 are processed to project the estimated solar irradiance levels for the upcoming day.

There are four rulebases, called nodes, consulted by CPU 29 and incorporated into this nutrient decision model as part of the rulebase data memory 34. The nutrient decision node 64 is a listing of the various recipes available for the nutrient feeding program. The irradiance chance node 66 is a listing of solar irradiance probability functions. The crop response node 68 is a decision tree listing the crop response functions which can be followed to achieve a desired outcome and their corresponding probability of success. The diagnosis node 70 analyzes nutrient problems in the plant and specifies the recipe changes needed to correct possible deficiencies.

The nutrient decision node 64 is a rulebase which relates available nutrient options (i.e., recipes) to the crop type and maturity and to the environmental conditions prevailing at the time of the decision. The CPU 29 calculates the clear sky irradiance figure for the upcoming day (or other preselected period). The probabilities of the fraction of solar radiation transmitted through the atmosphere are derived from the microclimate rulebase data 62 in conjunction with the weather data 44 and weather forecast data 52 such as the weather forecast broadcast by AM Weather on the Public Broadcasting System. These are combined to give irradiance probabilities for the coming hours, which are stored in the irradiance chance node 66. The crop response node 68 is a collection of utility functions based on rules, such as provided by a horticulturist, stored as crop data 58 stored in memory 32 about the strategies to be followed for particular conditions. As both potential yield and quality of the crop can be taken into account by the horticulturist, the resulting evaluation yields various paths in a decision tree. The decision tree outcome is, in effect, a multi-attribute utility function modified to evaluate the path in the decision tree which has the highest probability of the desired outcome. It is termed a "crop response function." The diagnostic rulebase node 70 is derived from the nutrient deficiencies and toxicities of the particular plant stored as nutrient data 60 in memory 32, and from the information gained by growing of a crop in a controlled environment under the direction of a horticulturist familiar with the plant.

The following description of the invention will relate to the use of the invention to grow a cucumber crop in Ohio. This description of an Ohio model is illustrative of one preferred embodiment of the invention. The invention may be used for growing any plants and may be adopted to assist in the development of any living organism, plant or animal. In general, in one form the invention is an apparatus for controlling, during a given period of time (one day), component quantities (nutrients) of a system (e.g., controlled environment, greenhouse) affected by stochastic variables (weather) and by measured variables (environmental factors) to direct the system toward a desired status (particular type of plant growth). Nutrient injector 18 constitutes controller means for controlling the component quantities of the system. The sensors, keyboard, and modem constitute means for determining the measured variables and the stochastic variables preceding the given period of time. Decision data memory 30 constitutes memory means for storing initial data corresponding to the determined measured variables and the determined stochastic variables. Computer control 28 constitutes computer control means. The computer control means includes expert rulebase data memory 32 and CPU 29 which constitute estimating means for estimating projected stochastic variables for the given period of time based on the initial data in the decision data memory and means for calculating projected component quantities having the highest probability of producing the desired status of the system based on the initial data in the memory means and based on the projected stochastic variables. Output memory 36 constitutes means, responsive to the calculating means, for controlling the nutrient injector to adjust, during the given period of time, the nutrient quantities as a function of the projected nutrient quantities.

Plants require water and nutrients at different rates and in different proportions according to temperature, relative humidity, available solar irradiance and plant maturity and condition. The decision options in the Ohio model were comprised of a mixture or recipe of nutrients. The unknown chance node for the Ohio model constructed from a probability distribution of future solar irradiance, and the decision tree Paths were evaluated by CPU 29 and stored in crop response node 68. The Ohio model crop rulebase 58 was derived from discussions and interactions with an experienced horticulturist while growing a cucumber crop.

The advice from an expert comes from many years of learning and the ability to recall situations. It may be difficult to ascertain how an expert derives a solution, because often the expert does not fully appreciate all of the inputs considered in order to come to a solution to a problem. One way to extract the relevant expertise from the expert is for an operator to try to grow a crop while being aided by an agricultural expert. This method builds a certain amount of competence in the operator and permits a knowledge base to be assembled that would be used to evaluate the paths in the decision tree. This method was used in the construction of the Ohio model.

During the growth cycle, it is assumed that the crop is maintained as free of pests and diseases as possible. The plants must be trained up their supports, early fruit taken off the plant to promote leaf growth, suckers removed from the plants as they grew, fruit picked, and samples taken of the leaves and nutrient solution. The solution sampling and measuring of pH and electric conductivity of the solution can be done by the operator. A technician skilled in the art of ion chromotography and trained to take leaf samples can perform this work. Alternatively, the solution sampling can be done by sensors such as chemically sensitive field effect transistors (such as a CHEMFET as developed by the University of Washington) and electrical conductivity sensors which would provide analog signals indicative of the nutrient concentrations. These signals would be converted to digital signals by an analog-to-digital converter, not shown, and stored as sample data in memory 43. Alternatively, sampling may be performed by on-line monitoring of anions, cations, metals and organic compounds by a liquid chromatography analyzer (such as a Dionex Series 8100 Process Analyzer). Any problems occurring with the injector system should be rectified by the operator. These rules were followed in developing the Ohio model.

The first task in construction of the decision node rulebase is to assemble the decision options within the decision node 64 of the model. This requires use of the knowledge base of the nutrient management and operational procedures stored in expert rulebase data memory 32. The date, crop type and maturity of the crop dictate what kinds of nutrient decisions would be faced by the operator at any particular time. In an ongoing situation, historical data of the operation is stored and this data is evaluated and used to modify future decision options.

The initial selection of nutrients is dictated by the nutrients available to the grower. One preferred embodiment of the injector injects up to a total of ten nutrient mixtures, with eight of those being controlled from a remote station. The selection of the nutrients to be used at each injector station depends upon the different crops to be irrigated by the same injector. For the Ohio model experiment one crop was used, so the selection was dictated by the fact that the crop was cucumbers. Many different formulations of nutrients were available and the decision was made to use those shown in Table I.

TABLE I

NUTRIENT SOLUTIONS USED IN CUCUMBER MODEL

| Nutrient | Head # |
|---|---|
| Phosphoric acid | 1 |
| Nitric acid | 2 |
| Potassium Sulfate | 3 |
| Magnesium Sulfate | 4 |
| Mono Am Phosphate | 5 |
| Calcium Nitrate | 6 |
| Potassium Nitrate | 7 & 9 |
| Urea | 8 |
| Micro-nutrients | 10 |

The confines of the mathematical combinations of the mixtures allowed by these nutrients and their concentrations are stored as nutrient data 60 in memory 32. FIG. 2 illustrates the process of defining the decision options to be stored in memory 34. In the case of a plant growth model, the decision options are recipes 208 stored in nutrient decision node 64.

At this stage of the model operation, the solar irradiance figures are not known. The known nutrient related facts 202, as shown in FIG. 2, are the crop type and variety, crop maturity, time and temperature, relative humidity, acceptable PH range, electrical conductivity limits, and the nutrients available. Taking these items into account, items and ranges of values 204 are determined. The recipes 208 are assembled by step 206 from the predefined nutrient concentrations and their value ranges as prioritized by the rules in expert rulebase memory 32. For the Ohio model, Table II was compiled to aid in the selection of the nutrient recipes.

TABLE II

FERTILIZER CONCENTRATION LIMITS (in mg/l) FOR CUCUMBER "MUSTANG" AT VARIOUS GROWTH STAGES

| Growth/ stage | Elect. cond. (umhos) | N as NO₃ | N as NH₄ | P | K | Ca | Mg | S |
|---|---|---|---|---|---|---|---|---|
| Plant-Flower | | | | | | | | |
| max | 1800 | 200 | 50 | 75 | 400 | 200 | 50 | 50 |
| min | 1200 | 75 | 0 | 40 | 150 | 80 | 30 | 30 |
| Flower-Fruit | | | | | | | | |
| max | 2500 | 300 | 60 | 75 | 600 | 300 | 50 | 40 |
| min | 0000 | 50 | 5 | 40 | 100 | 60 | 30 | 30 |
| Fruit onwards | | | | | | | | |
| max | 2500 | 200 | 60 | 75 | 400 | 300 | 50 | 40 |
| min | 0000 | 50 | 5 | 40 | 100 | 80 | 30 | 30 |

Each element must be maintained between the selected limits. For the Ohio model, each element was maintained between the limits shown in the table. In addition, in order to keep the construction of recipes and their number to manageable proportions, the limits should be split into low, medium and high.

The acids were used primarily for maintaining the pH at 5.4±0.2. Thus, they effectively became a part of the background supply. pH can be extremely difficult to compute, so changes in pH and changes in the acid head settings were not computed, but measured, and the pH adjusted accordingly. The acid supply may be controlled directly by control 76 in response to electrical conductivity sensor 78 and pH sensor 80. The computer reads the head settings of the injector 18 and incorporates the acid head settings when computing the new nutrient levels of the liquid nourishment. An alkalinity curve is then plotted of the liquid nourishment before beginning the growth of the crop so that intelligent estimates of the pH level of the liquid nourishment to be supPlied are made.

The remaining compounds are used for control of nitrogen, phosphorus, potassium, calcium, magnesium and sulphur. For the Ohio model, each item was split into different concentration levels according to the stage of the crop as shown in Table III.

TABLE III

RANGES OF NUTRIENT CONCENTRATIONS FOR CUCUMBER MODEL (in mg/l)

| | low | medium | high |
|---|---|---|---|
| Nitrogen | | | |
| plant to flower | 75–120 | 120–160 | 160–200 |
| flower to fruit | 0–200 | 0–250 | 30–300 |
| fruit onwards | 0–100 | 0–150 | 150–200 |
| Potassium | | | |
| plant to flower | 150–240 | 240–320 | 320–400 |
| flower to fruit | 0–400 | 0–500 | 50–600 |
| fruit onwards | 0–150 | 0–230 | 50–300 |
| Calcium | | | |
| plant to flower | 80–120 | 120–160 | 160–200 |
| flower to fruit | 0–140 | 0–220 | 220–300 |
| fruit onwards | 0–150 | 0–230 | 50–300 |
| Phosphorus | maintained between 40 to 75 | | |
| Magnesium | maintained between 30 to 50 | | |
| Sulphur | maintained between 30 to 40 | | |

After processing the information in the manner described above, the possible recipes available to the grower are computed. In the cucumber model, the possible recipes were combinations of the following: 3 levels of nitrogen, 3 levels of potassium, 3 levels of calcium, 1 level of each of phosphorus, magnesium and sulphur, which totalled 27 recipes. However, a further filtering is possible. Potassium and nitrogen could be tied together if the nutrient ratios are correct. Maintaining a ratio of K/N at a minimum of 2 is preferred nutritional practice. This was taken into account in the formulation of Table III and gave a total of 9 recipes when nitrogen and potassium were tied together. In general, CPU 29 calculates by assembly step 206 the decision options, i.e. recipes 208. The decision tree objective is to identify the recipe with the maximum expected value to produce the desired result as explained below.

The construction of the chance node rulebase is illustrated in FIG. 3A. This portion of the model derives probabilities for solar irradiance transmission through the atmosphere from the weather station 46, weather data 44, weather forecasts 52. In addition, the probabilities may be based on the ratio between solar irradiance received and the computed clear sky irradiance for previous particular days. The chance node 66 stores data representing a probability description of solar irradiance levels for the upcoming day. This data is updated during the day by considering the immediate history of solar irradiance and comparing it to the probabilities derived at the beginning of the day. In the Ohio model described herein, weather forecast data 52 was input from "AM Weather", a television program broadcast each weekday morning on Public Television Service for airplane pilots.

In general, let j designate the number of irradiance ranges, and k designate the number of probability distributions of irradiance. The probability of occurrence of the irradiance ranges, $P_k(j)$, are computed from the clear sky irradiance, $K\downarrow$, and the probability density function, $\beta$, as follows:

$$P_k(j) = \frac{\Gamma(a+b)}{\Gamma(a)\cdot\Gamma(b)} \int_{val(j)}^{val(j+1)} x^{(a-1)} \cdot (1-x)^{(b-1)} dx, \{x \in (0,1)\} \quad (1)$$

where a and b are beta parameters derived from the weather forecast, $\Gamma$ is the gamma function, and $$val(1) = 0.0, \quad (2)$$

$$val(2) = \begin{bmatrix} 250/K\downarrow & K\downarrow > 250 \\ 1.0 & K\downarrow \leq 250 \end{bmatrix} \quad (3)$$

$$val(3) = \begin{bmatrix} 500/K\downarrow & K\downarrow > 500 \\ 1.0 & K\downarrow \leq 500 \end{bmatrix} \quad (4)$$

$$val(4) = 1.0 \quad (5)$$

These relationships are described diagrammatically in FIG. 3 where Rn is the total irradiance at the earth's surface after accounting for all attenuation, i.e.:

$$Rn = K\downarrow * \beta \text{ distribution fraction} \quad (6)$$

As shown in FIG. 3, the known irradiance related facts 302 are date and time provided by clock 72 place (longitude, latitude) and prediction window (given period of control; e.g., one day) stored as microclimate data 62, weather data 44, weather forecast data 52, and the distribution function calculated by CPU 29. Weather forecast data is specified by the operator via keyboard 50 or obtained through a modem 54. Determination step 304 determines the distribution function parameters of the solar radiation transmission factor, on a scale from zero (0) to one (1), from the weather forecast data 52 in conjunction with other known irradiance related facts 302 by using any logic process such as an inference engine. In integration step 306, the probability density function (PDF) is integrated to generate the cumulative density function (CDF) which, in turn, is used to generate the probability of occurrence ($P_k$) 308 of the solar irradiance intervals (transmission percentage intervals). These intervals and their corresponding probabilities are stored in irradiance chance node 66.

The calculation of the beta parameters a and b, the $\beta$ probability density function (PDF) and the cumulative distribution function (CDF) are described mathematically in Appendix C.

In order to derive data for use in the model, two computations must be completed by CPU 29. The first is to find the clear sky irradiance figure for the day in question, and the second is to compute the $\beta$ probability density function for that day. Clear sky irradiance is computed as detailed in Appendix D. The $\beta$ probability density function is derived from an analysis of the weather data and forecasts and the clear sky irradiance values relevant to each forecast as indicated above.

The $\beta$ distribution parameters for solar irradiance transmission are derived from the weather data 44 and weather forecast 52 and by comparing historical forecast situations with the ratio of actual solar irradiance to the theoretical clear sky irradiance figure for that day. In the Ohio model described herein, the AM Weather data during the winter of 1987 was studied and compared for the site (in Ohio). The factors which may be recorded from the weather forecast data 52 are: (1) the lay of any local weather front and its direction of movement; (2) the type of front (cold, warm or occluded); (3) which pressure system was nearest the site in meteorological terms; and (4) whether the forecast predicts a clear space, a lightly overcast (light green) color, or a heavy overcast (dark green) color, over the site.

Data gathered for the Ohio model are shown in Table IV arranged by date, and Table V arranged in order of the solar irradiance ratio. The position of the pressure system and the overlays in the forecast closely describe the clarity of the sky. Note that the overall distribution was bimodal, as there were more occurrences of the fractions at the lower and upper ends of the scale than there were in the middle of the scale.

TABLE IV
AM WEATHER DETAILS BY DATE FOR OHIO MODEL

| Date 1987 | Irradiance Ratio | Frontal system Lay | Dir'n | type | Ohio Pressure | Clarity |
|---|---|---|---|---|---|---|
| 2 5 | 0.96494 | e-w | se | cold | high | |
| 2 6 | 1.01769 | e-w | s | cold | high | |
| 2 7 | 0.93358 | e-w | s | cold | high | clear |
| 2 8 | 0.23624 | sw-ne | s | cold | | heavy overcast |
| 2 9 | 0.94007 | sw-ne | se | cold | | |
| 2 10 | 1.00812 | sw-ne | se | cold | high | |
| 2 11 | 0.94969 | e-w | e | cold | high | |
| 2 12 | 0.20386 | e-w | s | | low | heavy overcast |
| 2 13 | 0.94686 | e-w | s | cold | high | |
| 2 14 | 0.17308 | e-w | e | warm | low | |
| 2 15 | 0.97424 | e-w | ne | occl. | high | overcast |
| 2 16 | 0.71180 | e-w | ne | | high | |
| 2 17 | 0.50927 | | | | low | snow |
| 2 18 | 1.05647 | | | | | clear |
| 2 19 | 1.05977 | | | | high | |
| 2 20 | 0.92665 | | | | high | |
| 2 21 | 0.68759 | | | | | |
| 2 22 | 0.45018 | n-s | e | warm | low | |
| 2 23 | 0.32881 | | | | high | fog |
| 2 24 | 0.76960 | n-s | e | | high | |
| 2 25 | 1.00098 | n-s | e | | high | |
| 2 26 | 0.84368 | n-s | e | | high | |
| 2 27 | 0.44557 | n-s | e | cold | low | |
| 2 28 | 0.32257 | e-w | e | occl. | low | overcast |
| 3 1 | 0.11874 | e-w | e | occl. | low | |
| 3 2 | 0.64053 | nw-se | e | weak | low | snow |
| 3 3 | 0.62336 | | | | | |
| 3 4 | 0.67685 | | | | | |
| 3 5 | 0.77648 | | | | | |
| 3 6 | 0.97011 | w-e | s | cold | high | |
| 3 7 | 1.04737 | w-e | s | cold | high | |
| 3 8 | 0.86840 | w-e | s | | high | |
| 3 9 | 0.14023 | sw-ne | s | cold | low | |
| 3 10 | 1.03251 | | | | | |
| 3 11 | 0.89037 | | | | | |
| 3 12 | 0.96591 | | | | high | |
| 3 13 | 0.79945 | e-w | e | | high | |
| 3 14 | 0.24270 | nw-se | | warm | low | snow |
| 3 15 | 0.47512 | nw-se | e | | low | snow |
| 3 16 | 1.06685 | ew-s | | occl. | high | clear |

TABLE IV-continued
AM WEATHER DETAILS BY DATE FOR OHIO MODEL

| Date 1987 | Irradiance Ratio | Frontal system Lay | Dir'n | type | Ohio Pressure | Clarity |
|---|---|---|---|---|---|---|
| 3 17 | 1.02903 | nw-se | ne | | high | clear |
| 3 18 | 0.77724 | nw-se | se | occl. | low | clear |
| 3 19 | 1.06593 | nw-se | e | weak | high | |
| 3 20 | 1.09042 | n-s | e | occl. | high | |
| 3 21 | 1.04985 | n-s | e | occl. | high | |

TABLE V
FORECAST AGAINST IRRADIANCE RATIO FOR MODEL

| Date 1987 | Irradiance Ratio | Frontal system Lay | Dir'n | type | Ohio Pressure | Clarity |
|---|---|---|---|---|---|---|
| 3 20 | 1.09042 | n-s | e | occl. | high | |
| 3 16 | 1.06685 | ew-s | | occl. | high | clear |
| 3 19 | 1.06593 | nw-se | e | weak | high | |
| 2 19 | 1.05977 | | | | high | |
| 2 18 | 1.05647 | | | | | clear |
| 3 21 | 1.04985 | n-s | e | occl. | high | |
| 3 7 | 1.04737 | w-e | s | cold | high | |
| 3 10 | 1.03251 | | | | | |
| 3 17 | 1.02903 | nw-se | ne | | high | clear |
| 2 6 | 1.01769 | e-w | s | cold | high | |
| 2 10 | 1.00812 | sw-ne | se | cold | high | |
| 2 25 | 1.00098 | n-s | e | | high | |
| 2 15 | 0.97424 | e-w | ne | occl. | high | overcast |
| 3 6 | 0.97011 | w-e | s | cold | high | |
| 3 12 | 0.96591 | | | | high | |
| 2 5 | 0.96494 | e-w | se | cold | high | |
| 2 11 | 0.94969 | e-w | e | cold | high | |
| 2 13 | 0.94686 | e-w | s | cold | high | |
| 2 9 | 0.94007 | sw-ne | se | cold | | |
| 2 7 | 0.93358 | e-w | s | cold | high | clear |
| 2 20 | 0.92665 | | | | high | |
| 3 11 | 0.89037 | | | | | |
| 3 8 | 0.86840 | w-e | s | | high | |
| 2 26 | 0.84368 | n-s | e | | high | |
| 3 13 | 0.79945 | e-w | e | | high | |
| 3 18 | 0.77724 | nw-se | se | occl. | low | clear |
| 3 5 | 0.77648 | | | | | |
| 2 24 | 0.76960 | n-s | e | | high | |
| 2 16 | 0.71180 | e-w | ne | | high | |
| 2 21 | 0.68759 | | | | | |
| 3 4 | 0.67685 | | | | | |
| 3 2 | 0.64053 | nw-se | e | weak | low | snow |
| 3 3 | 0.62336 | | | | | |
| 2 17 | 0.50927 | | | | low | snow |
| 3 15 | 0.47512 | nw-se | e | | low | snow |
| 2 22 | 0.45018 | n-s | e | warm | low | |
| 2 27 | 0.44557 | n-s | e | cold | low | |
| 2 23 | 0.32881 | | | | high | fog |
| 2 28 | 0.32257 | e-w | e | occl. | low | overcast |
| 3 14 | 0.24270 | nw-se | | warm | low | snow |
| 2 8 | 0.23624 | sw-ne | s | cold | | heavy overcast |
| 2 12 | 0.20386 | e-w | s | | low | heavy overcast |
| 2 14 | 0.17308 | e-w | e | warm | low | |
| 3 9 | 0.14023 | sw-ne | s | cold | low | |
| 3 1 | 0.11874 | e-w | e | occl. | low | |

In the Ohio growth model, the irradiance ratio exceeded unity on some days. This is because the model used for predicting clear sky radiation is only accurate to ten percent, and the atmospheric pressure was not available for the model predictions every day. These two points account for the discrepancy in the actual figures. The numbers used in the derivation of the $\beta$ distribution parameters were limited to unity or less. This introduced some further error.

The beta ($\beta$) distribution parameters a and b are derived at the beginning of each day (or other preset period, if desired) after receiving the weather forecast data based on the data available at the time of derivation. At the end of the day (or other preset period) the ratio of the actual irradiance received to the computed clear sky irradiance is known. Thus, a new set of data can be added to the microclimate data memory 62. This new data will change the a and b parameters of the $\beta$ distribution to be used under those particular forecast conditions. Therefore, parameters a and b change on a day-to-day basis. Even when the weather forecast does not change, parameters a and b may change because their value depends in part on the actual weather data 44 collected as well as the weather forecast data 52 (which may be unchanged). Therefore, parameters a and b adapt to the actual weather data collected.

For the Ohio model, taking the irradiance ratio figures from Table V that correspond to high pressure and no fog (clear day) yields the statistics shown in the top left quadrant of Table VI for the listed statistical parameters.

TABLE VI
STATISTICS CALCULATED FROM IRRADIANCE RATIO FIGURES OF TABLE V

| STATISTICAL PARAMETERS | HIGH PRESSURE CLEAR DAY (FIG. 4A) | HIGH PRESSURE CLEAR DAY UPDATED (FIG. 4C) |
|---|---|---|
| $\bar{x}$ | 0.9448 | 0.8582 |
| $\Sigma x$ | 24.5650 | 56.642 |
| $\Sigma x^2$ | 23.3708 | 50.737 |
| n | 26 | 66 |
| $s^2$ | 0.00646 | 0.0327 |
| a | 6.6771 | 2.3351 |
| b | 0.3901 | 0.3858 |

| STATISTICAL PARAMETERS | LOW PRESSURE OVERCAST (FIG. 4B) | LOW PRESSURE OVERCAST UPDATED (FIG. 4D) |
|---|---|---|
| $\bar{x}$ | 0.3617 | 0.2937 |
| $\Sigma x$ | 5.0641 | 9.9870 |
| $\Sigma x^2$ | 2.3328 | 3.9799 |
| n | 14 | 34 |
| $s^2$ | 0.03854 | 0.0317 |
| a | 1.8053 | 1.6282 |
| b | 3.1855 | 3.9147 |

The sample mean $\bar{x}$ and the sample variance $s^2$ are used as estimates for $\mu$ and $\sigma^2$, the $\beta$ parameters. As shown in Appendix C, a and b are derived from a dummy parameter (dum);

$$\text{dum} = \frac{\bar{x}}{1 - \bar{x}}$$

then, $$b = \frac{\text{dum}}{s^2(\text{dum} + 1)^3} - \frac{1}{\text{dum} + 1}$$

and $$a = \text{dum} * b$$

Thus, in the Ohio model, when the AM Weather forecast showed high pressure, and the time of the year was winter and there was no fog shown, then the $\beta$ distribution was described with the parameters a and b as shown in the top left quadrant of Table VI. The cumulative distribution function, CDF, for the values of a and b on a high pressure, clear day are shown in FIG. 4.

Similarly, taking the irradiance ratio figures from Table V that correspond to low pressure and fog (heavy overcast) gave the characteristics shown in the bottom left quadrant of Table VI. Thus, in the experiment when the AM Weather forecast showed a low pressure, and the time of year was winter and there was fog or heavy overcast, then the $\beta$ function was described with the parameters a and b as shown in the bottom left quadrant of Table VI. The cumulative distribution function, CDF, for the values of a and b for a low pressure, overcast day shown in FIG. 4.

Figure 4D:
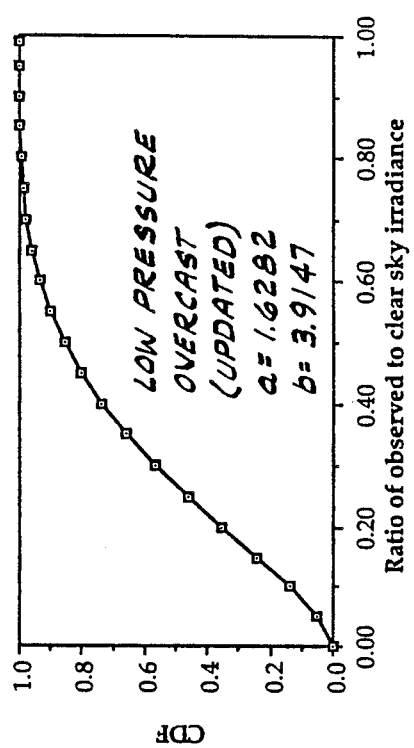

During the experiment in the winter of 1988, these curves were updated with the weather forecasts and clear sky irradiance calculations at that time. This exemplifies the capacity of the model to adapt to the conditions in which it is operating. The CDF curves derived from the $\beta$ distributions for high atmospheric pressure and clear days, and low atmospheric pressure and overcast days are shown in FIGS. 4C and 4D, respectively. Thus, in the Ohio model, when the AM Weather forecast showed a high pressure, and the time of the year was winter and it was clear, then the $\beta$ function was described with the parameters a=2.3351 and b=0.3858 as shown in top right quadrant of Table VI. These statistics superseded those derived previously for this atmospheric condition, and their graph is shown in FIG. 4C.

The statistics for the derivation of the curves for low pressure and overcast conditions are shown in the lower right quadrant of Table VI. Thus, in the experiment, when the AM Weather forecast showed a low pressure, and the time of the year was winter and there was fog or heavy overcast, then the $\beta$ function was described with the parameters a=1.6282 and b=3.9147 as shown in the lower right quadrant of Table VI. These statistics, derived previously for this atmospheric condition, and their graphs are shown in FIG. 4D.

Figure 4A:
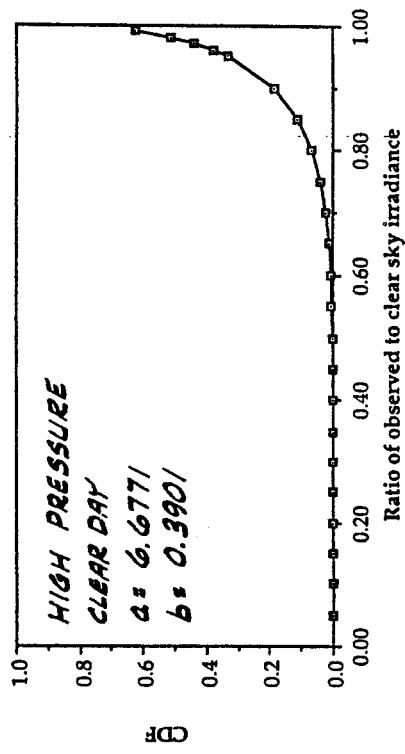
FIGS. 4A and 4B are graphs of the cumulative density function (CDF) versus the ratio of observed clear sky irradiance for the statistics of Tables V and VI.
Figure 4B:
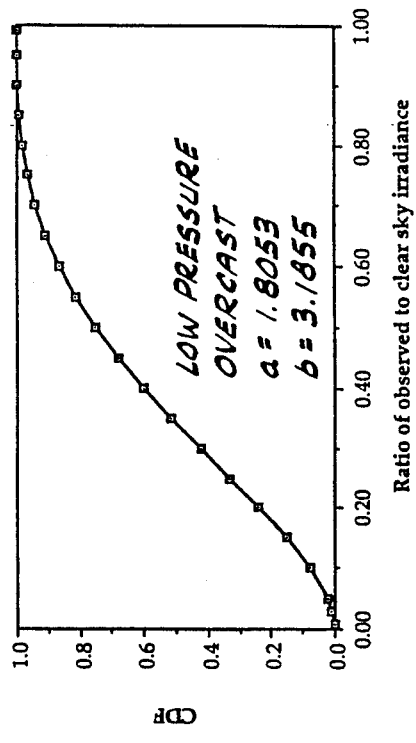

Notice the change in the shapes of the updated curves of FIGS. 4C and 4D when compared to the corresponding curves of FIGS. 4A and 4B, respectively, derived before the 1988 update. B parameters were also derived for the conditions of winter, low pressure, and clear; and winter, high pressure and overcast. They were as follows:

low pressure and clear; a=1.5117, b=1.4954,
high pressure and overcast; a=1.6008, b=0.8819.

These $\beta$ parameters only serve to illustrate the point of adaption. Within the operating model they would change from day to day as more data was added to the base.

FIGS. 4A-4D show four alternative probability curves for the possible solar irradiance transmission ratios, i.e., k=1 to 4. The analysis may be continued for other years to establish probability curves that have a smaller variance. It is also possible that more parameters can be incorporated into the analysis to minimize the variance of the sample.

It is contemplated that the options rulebase data memory 34 may include multiple chance nodes so that disease and pest strategies can be incorporated into operation of the system. For example, the use of the model with integrated pest management (IPM) techniques may be employed to make maximum use of the model's potential.

In the construction of the crop response node 68, a simulation model is preferably used to evaluate each path of the decision tree and compute outcomes. Alternatively, if such a model does not exist, an intuitive model of an expert in the domain can be used instead. The details for this intuitive model can be gleaned from the telephone discussions, the video-tape, and the informal discussions between the operator and the expert, and the experience of growing the crop in the controlled environment.

The combination of accepted practice techniques combined with possible new "discoveries" in the way the plants react to the recipe solution can significantly complicate the model. Accordingly, the capability of accurately controlling the input and measuring the output as leachate should preferably be available. In this way, a rulebase can be constructed that assesses the combination of each recipe proposal with each solar irradiance level and gives a crop response function for that combination. This crop response function describes the probability of obtaining the best crop in the terms of quality and yield.

It has been found that the uptake of nutrients is active rather than passive. For example, in the Ohio model, it was found that if the crop required water (days 72-80), it took the water regardless of the nutrient concentration. In fact, the leachate increased in concentration during this time showing that the crop was selectively taking water and leaving nutrients.

The nutrient decision model computes each crop response function by CPU 29 based upon an evaluation of the path taken to each outcome. For example, a recipe comprising medium nitrogen, medium calcium and low potassium being fed to a fruiting crop during a period of low solar irradiance was unlikely to result in producing a good fruiting output because vegetative growth would be enhanced. The probability of producing the "best" crop under those cultural conditions would be about 0.3. That is, a thirty percent chance of producing a "best" crop, or, conversely, a seventy percent chance of producing a bad crop as estimated by a combination of the expert's observations and the final analysis of the person building the knowledge base. The crop response function of that path is allocated a value of 0.3. In general, the function is dependent upon two items, the nutrient recipe in the decision node and the solar irradiance in the chance node, giving:

$u(i,j)$=crop response function for the $i^{th}$ recipe and the $j^{th}$ solar irradiance range derived from the historical expertise of growing the crop.

FIG. 5 illustrates the derivation of the crop response functions stored as data in the crop response node 68. The rules 1—n which are stored in memory 32 as part of the crop data 58 are used by CPU 29 to derive by step 302 the crop response function stored in node 68. This crop response function is derived from a rulebase system which has been learned from a combination of experiments and from an expert in the growth of plants. The crop response function, $u(i,j)$, corresponds to the best crop response 304 and is stored in node 68. Additionally, value $1-u(i,j)$ corresponds to the worst crop response 306 and is stored in node 68. The crop rulebase 58 which was combined with this crop response function to give the recipes is listed in Appendix B.

In one aspect, the invention exploits the utility function in decision analysis as a means of placing values on outcomes. The utility function is an indifference function which relates the subject's indifference between having a particular outcome for certain and a chance, p, at the best outcome. That path is then allocated the "value" p. The utility is based upon the decision maker's indifference to an outcome that was already established.

The question to the expert in a utility scenario becomes: "What probability of achieving the best result is equivalent in utility to the outcomes that will result from this path?"

This is impossible to answer, because the expert can not determine with certainty (a probability of 1.0) the actual outcome of the path. However, the expert definitely has an opinion built from years of experience about the probable outcomes of particular paths. For this reason the concept of a modified, or pseudo-utility function is used.

The question to the expert now becomes: "What is the probability of achieving the best crop, given the path taken to this outcome?" If a high nitrogen, high potassium and low calcium recipe was fed to a fruiting crop on a day with low light levels (a particular path), how would the expert evaluate that path? It was not so much a matter of indifference between a definite outcome and the probability of the best outcome, as the grower's estimate of the best outcome being the result of this particular cultural practice. For this reason the pseudo-utility function is described as a crop response function.

To summarize, the recipe(i) selected was the one that had the maximum expected value, y(i), where:

$$y(i) = \sum_{j=1}^{n} P_k(j) * u(i,j) \text{ for } i = 1, \ldots m \quad (7)$$

where, m is the number of nutrient recipes, $P_k(j)$, (equation 1) is the probability of occurrence of the $j^{th}$ level of solar irradiance predicted from the $k^{th}$ selection of the a and b parameters of the $\beta$ distribution as selected from the results of the weather forecast 52, n is the number of solar irradiance levels, and u(i,j) is the crop response function derived from the historical expertise of growing the crop using the $i^{th}$ nutrient recipe and the $j^{th}$ level of solar irradiance. That is, y(i) is the vector which has values corresponding to the cross-product of the irradiance chance data stored in node 66 and the crop response function stored in node 88.

It is contemplated that quality of product, path entropy, environmental impacts and other relevant judgments can be incorporated into the decision making process according to the invention.

A controlled environment operation requires decisions to be made from time to time within the day that have major impacts upon the final profitability of the enterprise. There are many decisions that need to be made on a repetitive, short-term, basis that directly affect the final quality and yield of a crop. Examples of these included irrigation quantities, nutrient feeds, temperature settings, relative humidity settings, ventilation, shading, and control of pests and diseases.

It is contemplated that the model may be used to test plant responses under particular conditions. For example, plant nutritionists, pathologists and entomologists frequently hypothesize about possible chemical interactions within plants and between them and their environment. Using the rulebase, the model may be programmed with a hypothetical rulebase that a scientist believes to be true and which reflects these interactions. The model would then be implemented to make the decisions while growing a crop. Decisions taken by the model during the growth period would be consistent with the hypothesized rulebase. Combinations of temperature, relative humidity and chemistry can, therefore, be tested because the model would act as if the rulebase were true. In the event of an improvement in the crop, the scientist would then have to determine what the actual chemical reasons were for the improvement.

OPERATION OF THE MODEL

Appendix A is a software listing for a computer according to one preferred embodiment of the invention. FIG. 6A and 6B show a summary flow chart of the nutrient decision model for an open loop decision operation according to the invention. At the beginning of the day the grower determines the weather forecast and inspects the controlled environment noting anything particular about the crop. The model is then started. The grower provides the information about the weather forecast 52 and the crop condition 48 to memory 30 via keyboard 50. If the crop condition is unusual, i.e., deficient or toxic, the CPU 29 runs the nutrient diagnosis procedure stored in node 70 to establish the cause of the deficiency or toxicity in the crop. Once established, an adjustment will be made to take this problem into consideration in the following feed program.

The input of weather forecast data 52 enables the building of the probabilities of solar irradiance transmission ranges for the coming day as described above using the $\beta$ distribution and the irradiance chance node 66. The date provided by clock 72 and latitude and longitude provided by microclimate 62 enables the clear sky radiation figure to be computed. This figure, together with the probabilities of the transmission ranges provides the probabilities for actual solar irradiance values for the coming day.

The environmental data 40 such as temperature and relative humidity in the controlled environment can be provided by environmental sensors 42 or can be retrieved from the climate control computer. These, together with the solar irradiance value at the mean of the relevant $\beta$ distribution enables the computation of the irrigation requirement of the crop.

The maturity of the crop (part of the crop condition 58) and nutrient decision node 64 define the nutrient recipe options open to the model for consideration. These options are combined with the irradiance ranges and crop response data 68 to compute the crop response function of each possible path of the decision tree. Once the crop response functions are derived, the cross products of the decision tree are computed and the recipe option with the maximum expected value is selected. The model then incorporates adjustments from the previous files of surpluses or deficiencies in the supply and any special nutritional requirements from the diagnosis node 70.

Once the acceptable ranges of the nutrients are finalized, the model computes the settings of the injector that ensure that all nutrients are within suitable limits. The instruction is then given to irrigate with the relevant quantity of water and the nutrient settings at the positions required.

FIGS. 6A and 6B are a flow chart of the open loop decision process. Step 600 commences the decision program. Step 602 determines whether or not the decision being made is the first decision of the day. In one preferred embodiment of the invention, the decisions are updated on a daily basis. The initial decision of the day includes some preliminary processing steps 604–614. Subsequent decisions in the course of the day do not require that these preliminary processing steps be executed. Instead, updating steps 644-648 are executed.

The first preliminary processing step is step 604 which checks the crop condition. If crop condition data 48 has not been input (or updated) into the decision data memory 30, step 606 is executed to instruct the operator to check the crop condition before proceeding with the program. Once the crop condition has been checked, CPU 29 evaluates the crop condition data 48 in accordance with the crop data 58 of expert rulebase data memory 32 in step 608. As a result of this evaluation, any nutrient feed adjustments which may be necessary are computed by CPU 29 by executing step 610.

Decision step 612 determines whether the weather forecast has been checked. If it has not, the operator is reminded to check the weather forecast by step 613, and input it into decision data memory 30 as weather forecast data 52. If it has been checked, CPU 29 evaluates weather forecast data 52 in accordance with the micro-climate data 62 of expert rulebase data memory 32. This evaluation is performed by step 614. From this evaluation, CPU 29 computes the PDF of future radiation by step 616 and the future clear sky radiation by step 618 to yield the microclimate parameters a and b by step 620. These computation steps have been described in detail above.

CPU 29 is now in a position to execute step 622 to compute the irrigation requirement. Once this has been done, CPU 29 allocates the decision tree probabilities for the various radiation intervals by step 624 and computes by step 626 crop response functions for nutrient options and radiation intervals. In step 628, CPU 29 computes the cross products within the decision tree to obtain the expected values of recipes. At step 630 the new decision is finalized by selecting the recipe with the maximum expected value. Finally, the nutrient feed adjustments previously computed by step 610 are incorporated into the finalized decision by step 634. Thereafter, CPU 29 provides the adjusted recipe to output memory 36. This adjusted recipe is then output to nutrient injectors 18 to set the injectors by step 636. CPU 29 then turns on the water according to the zone and volume which have been previously specified to execute the decision by step 638.

Decision step 640 determines whether or not the end of the day, or whatever period of operation has been set, has occurred. If it has, CPU 29 redefines parameters a and b for the beta distribution by step 642 taking into account the actual radiation which occurred during the course of the day by executing step 642. Thereafter, or in the event that the end of the day has not been reached, a predefined waiting time, such as 30 minutes, is permitted to elapse by step 643. In one preferred embodiment of the invention, this waiting time is used to implement other decision making irrigation procedures for one or more other zones or crops. Thereafter, the process returns to step 602 to determine whether or not the first decision of the day has been made. When it has not, CPU 29 executes step 644 to look up the previous decision established by step 634. CPU then determines the recent radiation history by evaluating the weather data 44 in memory 30 collected from weather station 46. Thereafter, CPU 29 computes adjustments to the weather forecast data 52 in accordance with the micro-climate data and expert rulebase data memory 32. This is performed by step 648, at which point the process then continues with step 616.

The flowchart of FIGS. 6A and 6B is referred to as an open-loop design because the liquid nourishment being provided to the plants is made by adding nutrients to fresh water 82 by the nutrient injectors 18 and discarding the water and nutrients not used by the crop, hereinafter referred to as leachate. In other words, the leachate from the controlled environment 16 is not recirculated within the system so that the system is considered to be an open loop. In contrast, FIGS. 7A and 7B illustrate the flowchart for a closed loop decision process wherein the leachate from the controlled environment 16 is collected, treated such as by cleansing by ultraviolet light 86, aerated in tank 24 and recirculated for reuse. Such a closed loop system may be used in such applications as a greenhouse operation where leachate can be collected or in a space station in which all waste materials are collected, treated and reused to the fullest possible extent.

Referring to FIGS. 7A and 7B, step 700 commences the decision program. Step 701 sets the used and supplied values for water and nutrients to zero. This is a reset step which is required so that the closed loop system can use the leachate. In the closed loop decision process, the decision program determines the amount of leachate to be used as liquid nourishment (if any), the amount of water to be used as liquid nourishment (if any), and the amount of nutrients (if any) to be added to the liquid nourishment. Step 702 determines whether or not the decision being made is the first decision of the day. In one preferred embodiment of the invention, the decisions are updated on a daily basis. The initial decision of the day includes some preliminary processing steps 704-714. Subsequent decisions in the course of the day do not require that these processing steps be executed.

The first preliminary processing step is step 704 which checks the crop condition. If crop condition data 48 has not been input (or updated) into the decision data memory 30, step 706 is executed to instruct the operator to check the crop condition before proceeding with the program. Once the crop condition has been checked, CPU 29 evaluates the crop condition data 48 in accordance with crop data 58 of expert rulebase data memory 32 in step 708. At this point, any nutrient feed adjustments are not yet calculated as compared to the open loop flowchart. This is because the closed loop flowchart takes into account the leachate and its nutrient contents.

Decision step 712 determines whether the weather forecast has been checked. If it has not, the operator is reminded to check the weather forecast by step 713 and input it into decision data memory 30 as weather forecast data 52. If it has been checked, CPU 29 evaluates weather forecast data 52 in accordance with the micro-climate data 62 of expert rulebase data memory 32. This evaluation is performed by step 714. Thereafter, by step 715a, CPU 29 accesses the details of the previous decision such as the amount of water supplied and the amounts of the nutrients supplied. By step 715b, the CPU 29 also accesses the radiation history from the weather station. At this point, CPU 29 computes by step 715c the amount of water used in the previous decision by subtracting the amount of leachate from the total liquid nourishment supplied.

CPU 29 derives by step 717 the beta parameters for future radiation by the process described above and illustrated in Appendix C. At step 718, CPU 29 computes the hourly clear sky radiation projections for the upcoming day. CPU 29 then reads by step 721 the environmental data 40 in decision data memory provided by environmental sensors 42. Thereafter, step 724 allocates the decision tree probabilities for radiation intervals and step 726 computes the crop response functions for nutrient options and radiation intervals. By step 728, CPU 29 computes the cross products of the decision tree to obtain the expected values of the recipes and selects the new recipe for each hour by step 732. CPU 29 is now in a position to compute the new irrigation requirements and executes step 733.

In steps 734a-734e, CPU 29 computes the nutrient feed adjustment. Initially, the sensor readings provided by sensor 26 and stored as sample data 43 in decision data memory 30 are read by step 734a to determine the nutrient levels of the leachate stored in aerated leachate tank 24. CPU 29 then computes by step 734b the maximum possible proportion of leachate water which can be added to the new supply mix. If the proportion of any one nutrient in the leachate is too high, water will be added to the leachate to make the liquid nourishment to be supplied to the plants. If the proportion of any nutrient in the leachate is lower than the desired levels, the nutrient injector 18 adds the additional necessary nutrients to bring the amounts and proportions of nutrients in the liquid nourishment up to the required levels. At step 734c, the proportioning valve 74 which mixes leachate and water is set to the appropriate ratio. At step 734d, the modified irrigation requirement is computed by adding the new liquid nourishment to that which was used by the plant in the previous period minus that which was supplied to the plant in the previous period. At step 734e, the nutrient requirements for each nutrient element are modified by subtracting the present amount of each element in the leachate proportion to be used and computing surpluses or deficits of each nutrient in the previous irrigation cycle, as was done above. This results in an adjusted recipe which is then output to nutrient injectors 18 to set the injectors by step 736. CPU 29 then turns on the liquid nourishment according to the zone and volume which have been previously specified to execute the decision by step 738.

Decision step 740 determines whether or not the end of the day, or whatever period of operation has been set, has occurred. If it has, CPU 29 redefines parameters a and b for the beta distribution by step 742 taking into account the actual radiation which occurred during the course of the day by executing step 742. Thereafter, or in the event that the end of the day has not been reached, a predefined waiting time, such as thirty minutes, is permitted to lapse by step 744. In one preferred embodiment of the invention, this waiting time is used to implement another decision-making irrigation procedure for one or more other zones or crops. Thereafter, the process returns to step 702 to determine whether or not the first decision of the day has been made. When it has not, CPU 29 proceeds directly to step 715a.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

APPENDIX A
Software Listing

```
program AIDM;
{
    purpose - AIDM shell for the Macintosh    © 1988 BAHM, INC.
    dated Oct 23rd 1988
}

{$R-}              { Turn off range checking       }
    {$I-}              { Turn off I/O error checking   }
    {$B+}              { Set bundle bit (for icon, etc.) }
    {$R AIDM.Rsrc}     { Identify resource file        }
    {$T APPLDM01}      { Set application ID            }
    {$U-}              { Turn off auto link to runtime units }
    {$S+}              { Turn on segmenter             } uses PasInOut,Memtypes,QuickDraw,OSIntf,ToolIntf,PackIntf,
         PasConsole,PasPrinter;

{*************************************************************
*****}
{$S AIDMshell}
```

CONST

{SHELL SPECIFIC}

```
MenuCnt   =   8;    { total # of menus                    }
ApplMenu  = 1000;   { resource ID of Apple Menu           }
FileMenu  = 1001;   { resource ID of File Menu            }
FontMenu  = 1002;   { resource ID of Font Menu            }
SizeMenu  = 1003;   { resource ID of Size Menu            }
ClimMenu  = 1004;   { resource ID of Climate Menu         }
CropMenu  = 1005;   { resource ID of Crop Type Menu       }
StatMenu  = 1006;   { resource ID of Crop State Menu      }
DeciMenu  = 1007;   { resource ID of Decision Menu        }

AM        =   1;    { index into MenuList for Apple Menu  }
FM        =   2;    { ditto for File Menu                 }
EM        =   3;    { ditto for Font Menu                 }
PM        =   4;    { ditto for Size Menu                 }
CM        =   5;    { ditto for Climate Menu              }
GM        =   6;    { ditto for Crop Type Menu            }
SM        =   7;    { ditto for Crop State Menu           }
DM        =   8;    { ditto for Decision Menu             }

MainID    = 1000;   { resource ID for MainWindow          }
AboutID   = 1000;   { resource ID for dialog box          }
Text1ID   = 1000;   { resource IDs for 'About...' text    }
Text2ID   = 1001;
Text3ID   = 1002;

myCursID  = 1000;   { resource ID for myCursor            }
myCursor  =    5;   { array index for myCursor            }

LeftMargin =  10;   { left margin offset                  }

BSize     =  512;   { buffer size for DiskI/O             }
BCount    =  256;   { buffer count for Disk I/O           }
```

{CONSULT SPECIFIC}

```
    WORD_MAX = 40;
    LINE_MAX = 110;
    COLON = ':';
    PERIOD = '.';
```

```
COMMA = ',';
SPACE = ' ';
EQUALS = '=';
DEFINITE = 100;
```

{CLIMATE SPECIFIC}

```
PsychroConstant      = 66.0;    {in Pa}
MolecularWeightRatio = 0.6216;
CoverTrans           = 0.60;
CropReflection       = 0.23;
CropTransmission     = 0.05;
FloorReflectivity    = 0.80;
```

TYPE

{SHELL SPECIFIC}

```
Buffer       = packed array[1..BSize] of Char;  { used for DiskI/O }
BufFile      = file of Buffer;                  { ditto }
CursorList   = array[iBeamCursor..myCursor] of CursHandle;
PtrInteger   = ^integer;
PtrString    = ^str255;
```

{CONSULT SPECIFIC}

```
    word_string = string[WORD_MAX];
    line_string = string[LINE_MAX];
    value_ptr = ^value;
    legal_ptr = ^legal_value;
    item_ptr = ^item;

value = RECORD
        name:word_string;
        cert:integer;
        next:value_ptr;
        END;

legal_value = RECORD
        name:word_string;
        next:legal_ptr;
        END;

item = RECORD
        name:word_string;
        question:line_string;
```

```
        multivald:boolean;
        legal_list:legal_ptr;
        sought:boolean;
        value_list:value_ptr;
        next:item_ptr
        END;

prem_ptr = ^prem;
    con_ptr = ^con;
    rule_ptr = ^rule;

prem = RECORD
            item:word_string;
            value:word_string;
            next:prem_ptr
            END;
    con = RECORD
            item:word_string;
            value:word_string;
            cert:integer;
            next:con_ptr
            END;

rule = RECORD
            name:word_string;
            prem:prem_ptr;
            con:con_ptr;
            next:rule_ptr
            END;

{CLIMATE SPECIFIC} intarray = array[1..24] of integer;
  realarray = array[1..24] of real;
  probarray = array[1..3,1..24] of real;
  filename = text;

{CROP SPECIFIC} cropsinhere = (cucumber, tomato);
  stringarray = array[1..24] of string;
  utilarray = array[1..9,1..3] of real;

VAR

{SHELL SPECIFIC}
```

```
F          : file of Buffer;  { used in I/O routines }
Finished   : Boolean;         { used to terminate the program }
Ticks      : Longint;         { keeps track of time }
TV,TH      : Integer;         { location of text }
theEvent   : EventRecord;     { event passed from operating system}

{ Screen stuff}
DragArea    : Rect;    { defines area where window can be dragged in }
GrowArea    : Rect;    { defines area to which a window's size can
change}
ScreenArea  : Rect;    { defines screen dimensions }
CursList    : CursorList;  { used to hold cursor handles }

{ Menu stuff}
MenuList    : array[1..MenuCnt] of MenuHandle;  { holds menu info }

{ Window stuff }
MainPtr     : WindowPtr;    { pointer to main window    }
MainRec     : WindowRecord; { holds data for main window }
MainPeek    : WindowPeek;   { pointer to MainRec        }
ScreenPort  : GrafPtr;      { pointer to entire screen  }
FrontWindow : WindowPtr;    { pointer to active window  }

{ program specific stuff}
VFlag       : boolean;
FileSelected : Boolean;    { if true, file is selected  }
VolParmBlock : ParmBlkPtr;
FileParmBlock : ParmBlkPtr;
Reply       : SFReply;
SPtr        : StringPtr;
FontItem    : Integer;
SizeItem    : Integer;
LineSize    : Integer;
IsFontThere,
MenuFlag    : Boolean;

{CONSULT SPECIFIC}
rulebase,
goal,
goalvalue:string;

last_try,
    top_fact:item_ptr;
```

```
     s_item,
s_value,
answer:word_string;

s_line:line_string;
     s_cf:integer;
     top_rule:rule_ptr;
     kbase:text;
explain:boolean;

{CLIMATE SPECIFIC} hour,
day,
month
     :intarray;

solrad,    {solar radiation in KJ per square meter}
relhum,    {relative humidity in %}
windspeed,
windvector,
winddirect,
windstats,
rainfall,
ClearSkyRad,
CSRwatts,
ClearPAR,
Irrigation
     :realarray;

probs : probarray;

utility : utilarray;

k,l,m,n
     :integer;

c,e,
totaldatarad,    {total day's radiation in KJ per square meter - from data}
latitude,     {in degrees}
longitude,    {in degrees}
airtemp,      {in degrees Celcius}
dewpointtemp, {in degrees Celcius}
atmospress,   {in millibars}
ClearSkyRadiation,  {clear sky radiation in Kjoules/hr/sq m}
```

TotalClearSkyRad, {total day's clear sky radiation in KJ per sq m}
RadRatio, {ratio of total clear sky radiation to total data radiation}
PDFx,
CDFx,
x,
minx,
maxx,
GamaConst,
betavar1,
betavar2,
TimeInSecs,
SolarRad, {irradiance in Kj/hr/sq m}
DryBulb, {in degrees C}
WetBulb, {in degrees C}
Time,
EvapoTrans,
TotalEvap
    :real;

tab,dum,
solradcode,
airtempcode,
relhumcode,
windspeedcode,
windvectorcode,
winddirectcode,
windstatscode,
rainfallcode
    :char;

infile,
outfile,
datain,
dataout,
dbase,
outdata
    :filename;

starttime,
finishtime
    :DateTimeRec;

error
    :boolean;

{CROP SPECIFIC}

```
CropFile : string;
cropindex : 1..24;
physage : stringarray;
   sunlight    :1..3;
   recipe      :1..9;
   recipevalue :array[1..9] of real;
   recipewanted :intarray;
   maturity    :(preflowering,postflowering,fruiting);
   arbvalue    :real;
   arbvalue1   :real;
```

{*********************************************************************}
```
PROCEDURE ClearWindow(WPtr : WindowPtr);
{
   purpose            clears window, draws grow stuff, sets location
}
var
  TRect                  : Rect;
begin
  if (WPtr = MainPtr) and (Wptr = FrontWindow ) then begin
    EraseRect(WPtr^.portRect);       { clear rect area of window  }
    DrawGrowIcon(WPtr);              { draw grow icon             }
    TH := LeftMargin;
    TV := 50             { set text loc to upper left  }
  end
end; { of proc ClearWindow }
```

{*********************************************************************}
```
PROCEDURE DrawStart(Str : String);
{
   purpose    moves to text location and writes out Str
}
begin
  MoveTo(TH,TV);                { move to current text location }
  DrawString(Str);              { write on screen               }
  TH := TH + StringWidth(Str)    { advance location to end of str}
end; { of proc DrawStart }
```

{*********************************************************************}
```
PROCEDURE OutputText(TextLine : str255; var OutputLine : integer);
var
```

```
  I : integer;
  CurrentPoint : Point;
begin
  MoveTo(LeftMargin,OutputLine * LineSize);
  for I := 1 to Length(TextLine) do
  begin
    GetPen(CurrentPoint);
    { if next character will go off the right side of the
      page, then go to first print position of the next line }
    if CurrentPoint.h+CharWidth(TextLine[I]) > 500 then
    begin
      OutputLine := OutputLine + 1;
      MoveTo(LeftMargin,OutputLine * LineSize);
    end;
    DrawString(TextLine[I]);
  end;
  OutputLine := OutputLine+1;
end;

{*****************************************************
*********}
PROCEDURE ToggleFlag(var Flag : Boolean; Mndx,Indx : Integer);
{
   purpose      checks or de-checks item Indx in menu Mndx
   last update    20 Aug 86
}
var
  Ch         : Char;
begin
  Flag := not Flag;               { toggle flag (for you)    }
  if Flag                         { if flag is True...       }
    then Ch := Chr(CheckMark)     {   then check item in menu }
    else Ch := Chr(NoMark);       {   else clear any checkmark }
  SetItemMark(MenuList[Mndx],Indx,Ch)  { put char by item in menu  }
end; { of proc ToggleFlag }

{*****************************************************
********}
PROCEDURE SetItemState(Mndx,Indx : Integer; Flag : Boolean);
{
   purpose      if true, enables item Indx of menu Mndx; else disables
   last update    22 Aug 86
}
begin
  if Flag
    then EnableItem (MenuList[Mndx],Indx)
```

```
    else DisableItem(MenuList[Mndx],Indx)
end; { of proc SetItemState }

{*******************************************************
********}
PROCEDURE UpdateMenu;
{
·  purpose     enable or disable items in I/O menu as needed
}
begin
  SetItemState(CM,1,true);          { update menu Info }
  SetItemState(CM,2,false);         { update menu Info }
  SetItemState(GM,1,false);         { update menu Info }
  SetItemState(GM,2,false);         { update menu Info }
  SetItemState(SM,1,false);         { update menu Info }
  SetItemState(SM,2,false);         { update menu Info }
  SetItemState(DM,1,false);         { update menu Info }
  SetItemState(DM,2,false);         { update menu Info }
  SetItemState(DM,3,false);         { update menu Info }
end; { of proc UpdateMenu }

{***********************************************************
*******}
PROCEDURE GetDatafile (var infile:text);

VAR
database:string[20];

BEGIN
database:='data';
reset(infile,database);
END;

{***********************************************************
****}
PROCEDURE GetOutputfile (var outfile:text);

VAR
outbase:string[20];

BEGIN
outbase:='sample';
rewrite(outfile,outbase);
```

END;

{******** wait performs a timed wait for secs seconds ********}
PROCEDURE wait(secs:longint);
VAR
  time,
  TimeNow,
  NewTime:   longint;
BEGIN
  GetDateTime (timeNow);
  NewTime:=TimeNow+secs;
  repeat
  GetDateTime(time);
  until (time>=NewTime);
end;

{***************************************************************
*****}
{THIS IS WHERE ALL PROGRAMS SUCH AS CONSULT HAVE TO GO}
{***************************************************************
*********}
{$S AIDMutil}
{$I Utility.inc}
{$S AIDMexpt}
{$I Consult.inc}
{$S AIDMclim}
{$I Climate.inc}
{$S AIDMimpl}
{$I Implement.inc}
{***************************************************************
*********}
{$S AIDMmenu}
{ ******************* items in Apple Menu
******************** }

PROCEDURE DoAbout;
{
   purpose     bring up 'About...' box using a dialog box
}
var
  theItem    : Integer;
  AboutPtr   : DialogPtr;
  S1,S2,S3   : StringHandle;

```
begin
  SetCursor(CursList[myCursor]^);    { set to my cursor           }
  ShowCursor;                        { and turn it back on        }
  S1 := GetString(Text1ID);          { get text from resource file }
  S2 := GetString(Text2ID);
  S3 := GetString(Text3ID);
  ParamText(S1^,S2^,S3^,'');         { and set up as parameter text }
  AboutPtr := getNewDialog(AboutID,NIL,Pointer(-1));   { get dialog box}
  ModalDialog(NIL,theItem);          { put dialog box up; get result }
  DisposDialog(AboutPtr);            { get rid of dialog box       }
  SetCursor(Arrow)
end; { of proc DoAbout }

PROCEDURE DoDeskAcc(Item : Integer);
{
   purpose     start up desk accessory from Apple menu
}
var
  SavePort        : GrafPtr;
  RefNum          : Integer;
  DName           : String;
begin
  GetPort(SavePort);                 { save port before starting it }
  GetItem(MenuList[AM],Item,DName);  { get name of desk accessory  }
  refNum := OpenDeskAcc(DName);      { and start that sucker up!   }
  SetPort(SavePort);                 { restore grafport and continue }
end; { of proc DoDeskAcc }

{********************  items in File Menu
************************* }

{********************  items in Font Menu
************************* }

PROCEDURE DoFontMenu(ItemNum : Integer);
var
  ChCheckMark, NoCheckMark : char;
begin
  ChCheckMark := Chr(CheckMark);
  NoCheckMark := Chr(NoMark);
  SetItemMark(MenuList[EM],FontItem,NoCheckMark); { turn off prev mark }
```

```
  SetItemMark(MenuList[EM],ItemNum,ChCheckMark); { turn on new mark }
  FontItem := ItemNum;                           { update current pos }
end;

PROCEDURE DoSizeMenu(ItemNum : Integer);
var
  ChCheckMark, NoCheckMark : char;
begin
  ChCheckMark := Chr(CheckMark);
  NoCheckMark := Chr(NoMark);
  SetItemMark(MenuList[PM],SizeItem,NoCheckMark); { turn off prev mark }
  SetItemMark(MenuList[PM],ItemNum,ChCheckMark);  { turn on new mark }
  SizeItem := ItemNum;                            { update current pos }
end;

PROCEDURE SetUpFont;
var
    FontName,
    SizeName    :str255;
    FontNumber,
    SizeNumber,
    AfterDigits :integer;
    FontSize    :longint;

begin
    GetItem(MenuList[EM],FontItem,FontName);
    GetFNum(FontName,FontNumber);
    TextFont(FontNumber);
    GetItem(MenuList[PM],SizeItem,SizeName);
    AfterDigits := Pos(' ',SizeName);
    Delete(SizeName,AfterDigits,99);
    StringToNum(SizeName,FontSize);
    TextSize(FontSize);
    LineSize := FontSize + 4;
end;

{********************  items in Climate Menu
********************** }

PROCEDURE GetIrradiance;
```

```
{
    purpose    gets irradiance and probabilities
     for the day and location
}
   VAR
   date:DateTimeRec;
   secs:longint;

BEGIN
tab:=chr(9);
   GetRadiation;
   GetDateTime(secs);
   Secs2Date(secs,date);
   writeln(outfile,'');
   writeln(outfile,'');
   writeln(outfile,' Irradiance for: ',date.month,' ',date.day,' ',date.year);
   writeln(outfile,'');
   writeln(outfile,' Clear Sky Rad. per square meter    Probabilities of');
   writeln(outfile,'    outside   outside   inside        PAR');
   writeln(outfile,'    Kj/hr    watts    PAR    <50   50-150   >150');
   for m:=1 to 24 do
      begin
      writeln(outfile,ClearSkyRad[m]:10:0,tab,CSRwatts[m]:10:0,tab,
         ClearPAR[m]:10:0,tab,probs[1,m]:10:3,tab,probs[2,m]:10:3,
         tab,probs[3,m]:10:3);
      end;
   SetItemState(CM,4,true);
   SysBeep(10);
   end;

PROCEDURE GetIrrigation;
{
   purpose  gets the irrigation requirement of the crop hour by hour
}
   VAR
   date       :DateTimeRec;
   secs       :longint;
   Textline   : str255;
   Currentline :Integer;

BEGIN
tab:=chr(9);
   GetDateTime(secs);
```

```
   Secs2Date(secs,date);
   TimeInSecs:=3600.0;
   Clearwindow(Frontwindow);
   Textline:='Now getting irrigation details';
   TH:=(250 - length(textline) DIV 2);
   OutputText(textline,TV);
   for m:=1 to 24 do
'{as we now have the irradiance i should be able to generate temps[m] here}
 {this is where the thermodynamic model of the greenhouse goes}
      begin
      SolarRad:=ClearSkyRad[m]*(betavar1)/(betavar1+betavar2);
      GetEvapoTranspiration(SolarRad, DryBulb, WetBulb,
         TimeInSecs, Irrigation[m]);
      end;
   writeln(outfile,'');
   writeln(outfile,'');
   writeln(outfile,' Irrigation for: ',date.month,' ',date.day,' ',date.year);
   writeln(outfile,'');
   writeln(outfile,tab,tab,tab,'Liters per');
   writeln(outfile,tab,'Hour of day',tab,tab,'square meter');
   for m:=1 to 24 do
      begin
      writeln(outfile,tab,m:10,tab,tab,Irrigation[m]:20:3);
      end;
   writeln(outfile,'');
   SysBeep(10);
   end;

PROCEDURE DoForecast;
{
   purpose       analyses AM weather forecast
}
var
   Textline  : str255;
   Currentline :Integer;

begin
   rulebase:='weather';
   goal:='parameters';
   consult(rulebase,goal,goalvalue);
   Clearwindow(Frontwindow);
   Textline:='Beta parameters are: ' + goalvalue;
   OutputText(textline,TV);
```

```
   Textline:='Type in the beta parameter values and make sure the printer is
on.';
   OutputText(textline,TV);
   readln(betavar1,betavar2);
   writeln(outfile,'beta distribution parameters are: ',goalvalue);
   writeln(outfile,' ');
   Textline:='What is the atmospheric pressure in millibars?';
   OutputText(textline,TV);
   readln(atmospress);
   Textline:='What is the forecast air temperature in °F?';
   OutputText(textline,TV);
   readln(airtemp);
   airtemp:=(airtemp-32.0)*5.0/9.0;
   Textline:='What is the dewpoint temperature in °F?';
   OutputText(textline,TV);
   readln(dewpointtemp);
   dewpointtemp:=(dewpointtemp-32.0)*5.0/9.0;
   SetItemState(CM,2,true);
   SysBeep(10);
   end;

PROCEDURE DoCompartment;
{
   purpose    Gets greenhouse climate details
}
   begin
   writeln('    What is the greenhouse drybulb temperature in °F?');
   writeln(' ');
   writeln(' ');
   writeln(' ');
   readln(DryBulb);
   DryBulb:=(DryBulb-32.0)*5.0/9.0;
   writeln('    What is the greenhouse wetbulb temperature in °F?');
   writeln(' ');
   writeln(' ');
   writeln(' ');
   readln(WetBulb);
   WetBulb:=(WetBulb-32.0)*5.0/9.0;
   GetIrradiance;
   GetIrrigation;
   SetItemState(GM,1,true);
   SetItemState(GM,2,true);
   SysBeep(10);
``` end;

{**************** items in Crop Type Menu ****************}

```
PROCEDURE SelectFirstItem;
{
   purpose     sets file names to first item in list and reads in
               the expert system file on that crop
}
   begin
   ToggleFlag(VFlag,GM,1); { toggle check mark }
   ToggleFlag(VFlag,GM,2); { toggle check mark }
   CropFile:='cucumber';
   cropindex:=1;
   SetItemState(SM,1,true);
   SetItemState(SM,2,true);
   last_try:= NIL;
   top_fact:= NIL;
   read_file(CropFile);
   writeln('              DONE ');
   writeln(' ');
   writeln(' ');
   writeln(' ');
   writeln(' ');
   writeln(' ');
   SysBeep(10);
end;

PROCEDURE SelectSecondItem;
{
   purpose     sets file names to second item in list
}
   begin
   writeln (' this is the SelectTomatoFiles procedure');
   readln;
   ToggleFlag(VFlag,GM,2); { toggle check mark }
   ToggleFlag(VFlag,GM,1); { toggle check mark }
{  CropFile:='tomato';
   cropindex:=2;
   SetItemState(SM,1,true);
   SetItemState(SM,2,true);
       last_try:= NIL;
```

```
    top_fact:= NIL;
    read_file(CropFile);   }
    SysBeep(10);
end;

{******************  items in Crop State Menu
****************** }

PROCEDURE GetPhysAge;
{
    purpose    gets crop physiological age (whichever is checked)
}
    begin
    goal:='physage';
    answer:='';
    writeln;
    writeln;
    writeln(' Do you want the reasoning explained during the consultation?');
    writeln(' default = yes');
    writeln;
    readln(answer);
    IF((answer = '') OR (answer = 'y') OR (answer = 'yes'))
    THEN explain:=TRUE
    ELSE explain:=FALSE;
    s_item:=goal;
    pursue(s_item);
    p_result(s_item,s_value);
    goalvalue:=s_value;
    writeln('       The ',cropfile,' growth stage is: ',goalvalue);
    writeln(outfile,'The ',cropfile,' growth stage is: ',goalvalue);
    writeln(outfile,' ');
    physage[cropindex]:=goalvalue;
    maturity := fruiting;
        if (goalvalue = 'plant_to_flower')
        then maturity := preflowering;
        if (goalvalue = 'flower_to_fruit')
        then maturity := postflowering;
        if (goalvalue = 'fruiting')
        then maturity := fruiting;
    SetItemState(DM,1,true);
    SysBeep(10);
    end;
```

```
PROCEDURE GetHealth;
{
    purpose    analyses health of checked crop
}
   begin
   goal:='nutrition';
   answer:='';
   writeln;
   writeln;
   writeln(' Do you want the reasoning explained during the consultation?');
   writeln(' default = yes');
   writeln;
   readln(answer);
   IF((answer= '') OR (answer = 'y') OR (answer = 'yes'))
   THEN explain:=TRUE
   ELSE explain:=FALSE;
   s_item:=goal;
   pursue(s_item);
   p_result(s_item,s_value);
   goalvalue:=s_value;
   writeln('     The crop nutrition problem is: ',goalvalue);
   writeln(outfile,'The crop nutrition problem is: ',goalvalue);
   writeln(outfile,' ');
   SysBeep(10);
   end;

{ ***************** items in Decision Menu
********************* }

PROCEDURE GetConcentrations;
{
    purpose    averages out and folds back the tree to establish ppms
}
VAR
curr_item:item_ptr;
curr_value:value_ptr;

begin
tab:=chr(9);
   for recipe := 1 to 9 do
   for sunlight := 1 to 3 do
      case maturity of
         preflowering : case recipe of
```

```
1 : case sunlight of
      1 : utility[recipe,sunlight]:=0.7;
      2 : utility[recipe,sunlight]:=0.6;
      3 : utility[recipe,sunlight]:=0.5;
   end;

2 : case sunlight of
      1 : utility[recipe,sunlight]:=0.8;
      2 : utility[recipe,sunlight]:=0.8;
      3 : utility[recipe,sunlight]:=0.5;
   end;

3 : case sunlight of
      1 : utility[recipe,sunlight]:=1.0;
      2 : utility[recipe,sunlight]:=0.7;
      3 : utility[recipe,sunlight]:=0.4;
   end;

4 : case sunlight of
      1 : utility[recipe,sunlight]:=0.3;
      2 : utility[recipe,sunlight]:=0.8;
      3 : utility[recipe,sunlight]:=0.7;
   end;

5 : case sunlight of
      1 : utility[recipe,sunlight]:=0.4;
      2 : utility[recipe,sunlight]:=1.0;
      3 : utility[recipe,sunlight]:=0.7;
   end;

6 : case sunlight of
      1 : utility[recipe,sunlight]:=0.6;
      2 : utility[recipe,sunlight]:=0.9;
      3 : utility[recipe,sunlight]:=0.6;
   end;

7 : case sunlight of
      1 : utility[recipe,sunlight]:=0.3;
      2 : utility[recipe,sunlight]:=0.6;
      3 : utility[recipe,sunlight]:=0.9;
   end;

8 : case sunlight of
```

```
            1 : utility[recipe,sunlight]:=0.4;
            2 : utility[recipe,sunlight]:=0.8;
            3 : utility[recipe,sunlight]:=0.9;
        end;

9 : case sunlight of
            1 : utility[recipe,sunlight]:=0.6;
            2 : utility[recipe,sunlight]:=0.7;
            3 : utility[recipe,sunlight]:=0.8;
        end;

end;

postflowering : case recipe of
    1 : case sunlight of
            1 : utility[recipe,sunlight]:=0.5;
            2 : utility[recipe,sunlight]:=0.5;
            3 : utility[recipe,sunlight]:=0.5;
        end;

2 : case sunlight of
            1 : utility[recipe,sunlight]:=0.9;
            2 : utility[recipe,sunlight]:=0.8;
            3 : utility[recipe,sunlight]:=0.4;
        end;

3 : case sunlight of
            1 : utility[recipe,sunlight]:=1.0;
            2 : utility[recipe,sunlight]:=0.7;
            3 : utility[recipe,sunlight]:=0.4;
        end;

4 : case sunlight of
            1 : utility[recipe,sunlight]:=0.1;
            2 : utility[recipe,sunlight]:=0.6;
            3 : utility[recipe,sunlight]:=0.7;
        end;

5 : case sunlight of
            1 : utility[recipe,sunlight]:=0.5;
            2 : utility[recipe,sunlight]:=1.0;
            3 : utility[recipe,sunlight]:=0.4;
        end;
```

```
6 : case sunlight of
       1 : utility[recipe,sunlight]:=0.6;
       2 : utility[recipe,sunlight]:=0.9;
       3 : utility[recipe,sunlight]:=0.6;
    end;

7 : case sunlight of
       1 : utility[recipe,sunlight]:=0.1;
       2 : utility[recipe,sunlight]:=0.4;
       3 : utility[recipe,sunlight]:=0.9;
    end;

8 : case sunlight of
       1 : utility[recipe,sunlight]:=0.5;
       2 : utility[recipe,sunlight]:=0.8;
       3 : utility[recipe,sunlight]:=0.8;
    end;

9 : case sunlight of
       1 : utility[recipe,sunlight]:=0.6;
       2 : utility[recipe,sunlight]:=0.7;
       3 : utility[recipe,sunlight]:=0.8;
    end;
end;

fruiting : case recipe of
    1 : case sunlight of
           1 : utility[recipe,sunlight]:=0.5;
           2 : utility[recipe,sunlight]:=0.5;
           3 : utility[recipe,sunlight]:=0.5;
        end;

2 : case sunlight of
           1 : utility[recipe,sunlight]:=0.9;
           2 : utility[recipe,sunlight]:=0.8;
           3 : utility[recipe,sunlight]:=0.4;
        end;

3 : case sunlight of
           1 : utility[recipe,sunlight]:=1.0;
           2 : utility[recipe,sunlight]:=0.7;
           3 : utility[recipe,sunlight]:=0.4;
```

```
              end;

4 : case sunlight of
              1 : utility[recipe,sunlight]:=0.1;
              2 : utility[recipe,sunlight]:=0.6;
              3 : utility[recipe,sunlight]:=0.7;
            end;

5 : case sunlight of
              1 : utility[recipe,sunlight]:=0.5;
              2 : utility[recipe,sunlight]:=1.0;
              3 : utility[recipe,sunlight]:=0.4;
            end;

6 : case sunlight of
              1 : utility[recipe,sunlight]:=0.6;
              2 : utility[recipe,sunlight]:=0.9;
              3 : utility[recipe,sunlight]:=0.6;
            end;

7 : case sunlight of
              1 : utility[recipe,sunlight]:=0.1;
              2 : utility[recipe,sunlight]:=0.4;
              3 : utility[recipe,sunlight]:=0.9;
            end;

8 : case sunlight of
              1 : utility[recipe,sunlight]:=0.5;
              2 : utility[recipe,sunlight]:=0.8;
              3 : utility[recipe,sunlight]:=0.8;
            end;

9 : case sunlight of
              1 : utility[recipe,sunlight]:=0.6;
              2 : utility[recipe,sunlight]:=0.7;
              3 : utility[recipe,sunlight]:=0.8;
            end;
          end;
      end; {of maturity}
for m := 6 to 18 do
begin
arbvalue:=0.0;
   for recipe := 9 downto 1 do
```

```
begin
recipevalue[recipe]:=0.0;
   for sunlight := 1 to 3 do
   begin recipevalue[recipe]:=recipevalue[recipe]+probs[sunlight,m]*utility[recipe,sunlight];
      end;
   arbvalue1:=recipevalue[recipe];
   if (arbvalue1>arbvalue) then
      begin
         arbvalue:=arbvalue1;
         recipewanted[m]:=recipe;
      end;
   end; {of recipe loop}
   writeln(' ');
   writeln(' ');
writeln(outfile,' ');
writeln(outfile,'recipe selected for hour ',m,' is ',recipewanted[m]);
writeln(outfile,' ');
writeln('          recipe selected for hour ',m,' is ',recipewanted[m]);
   writeln(' ');
   writeln(' ');
   writeln(' ');
   explain:=FALSE;
   goal:='recipe';
   s_item:=goal;
   curr_item:=find_item(s_item);
   curr_item^.sought:=false;
   pursue(s_item);
   goal:='nitrogen';
   s_item:=goal;
   curr_item:=find_item(s_item);
   curr_value:=curr_item^.value_list;

pursue(s_item);
   p_result(s_item,s_value);
   goalvalue:=s_value;
   writeln(outfile,tab,'Set the nitrogen at: ',tab,goalvalue);
   goal:='phosphorus';
   s_item:=goal;
   pursue(s_item);
   p_result(s_item,s_value);
```

```
   goalvalue:=s_value;
   writeln(outfile,tab,'Set the phosphorus at: ',tab,goalvalue);
   goal:='potassium';
   s_item:=goal;
   pursue(s_item);
   p_result(s_item,s_value);
   goalvalue:=s_value;
   writeln(outfile,tab,'Set the potassium at: ',tab,goalvalue);
   goal:='calcium';
   s_item:=goal;
   pursue(s_item);
   p_result(s_item,s_value);
   goalvalue:=s_value;
   writeln(outfile,tab,'Set the calcium at: ',tab,goalvalue);
   goal:='magnesium';
   s_item:=goal;
   pursue(s_item);
   p_result(s_item,s_value);
   goalvalue:=s_value;
   writeln(outfile,tab,'Set the magnesium at: ',tab,goalvalue);
   goal:='sulphur';
   s_item:=goal;
   pursue(s_item);
   p_result(s_item,s_value);
   goalvalue:=s_value;
   writeln(outfile,tab,'Set the sulphur at: ',tab,goalvalue);
   goal:='maxec';
   s_item:=goal;
   pursue(s_item);
   p_result(s_item,s_value);
   goalvalue:=s_value;
   writeln(outfile,'Do not exceed an electrical conductivity of
',tab,goalvalue);
   writeln(outfile,' ');
end; {of m loop}
   SetItemState(DM,2,true);
   SetItemState(DM,3,true);
   SysBeep(10);
end;

PROCEDURE GetSettings;
{
   purpose      solves equations for injector settings
```

```
                    get from spreadsheet for now.
}
   begin
   writeln ('   Using the software "MULTIPLAN" and the spreadsheet for');
   writeln ('   the ANDERSON injector, compute the injector heads
position');
   writeln ('   to give the range of nutrient concentrations required.');
   writeln ('   Hourly concentrations and irrigation requirements are');
   writeln ('   shown on the outfile.');
   writeln;
   writeln ('    OK?');
   writeln(' ');
   writeln(' ');
   writeln(' ');
   readln (answer);
   SysBeep(10);
   end;

PROCEDURE DoImplement;
{
   purpose    phones the injector and sets and irrigates
}
   begin
   writeln ('   Using the software "MICROPHONE" to communicate with');
   writeln ('   the ANDERSON injector, set the injector heads and');
   writeln ('   initiate the irrigation cycle.');
   writeln ('   Hourly head settings and irrigation requirements are');
   writeln ('   shown on the outfile.');
   writeln;
   writeln ('    OK?');
   writeln(' ');
   writeln(' ');
   writeln(' ');
   readln (answer);
   SysBeep(10);
   end;

{***************************************************************
*********}
{$S AIDMevnt}
{************  event handling routines   *********** }
```

```
PROCEDURE HandleMenu(MenuInfo : LongInt);
{
    purpose     decode MenuInfo and carry out command
}
var
  Menu      : Integer;     { menu number that was selected  }
  Item      : Integer;     { item in menu that was selected  }
  B         : Boolean;     { dummy flag for SystemEdit call  }
begin
  if MenuInfo <> 0 then begin
    ClearWindow(MainPtr);      { we're clearing the window    }
    PenNormal;                 { set the pen back to normal   }
    Menu := HiWord(MenuInfo);  { find which menu the command is in }
    Item := LoWord(MenuInfo);  { get the command number       }
    case Menu of               { and carry it out             }
      ApplMenu : if Item = 1
                 then DoAbout          { bring up "About..." window}
                 else DoDeskAcc(Item); { start desk accessory    }

FileMenu : case Item of
                 1 : Finished := True;  { Quit command           }
                 end;

FontMenu : begin
                 DoFontMenu(Item);
                 SetUpFont;
                 end;

SizeMenu : begin
                 DoSizeMenu(Item);
                 SetUpFont;
                 end;

ClimMenu : case Item of        { Climate menu       }
                 1 :   DoForecast;
                 2 : DoCompartment;
                 end;

CropMenu :    case Item of     { Crop Type menu     }
                 1 :   SelectFirstItem;
                 2 :   SelectSecondItem;
                 end;
```

```
    StatMenu :    case Item of         { Crop State menu    }
           1 : GetPhysAge;
           2 : GetHealth;
         end;

DeciMenu :    case Item of         { Decision menu      }
           1 : GetConcentrations;
           2 :   GetSettings;
           3 :   DoImplement;
         end;
   end;{case of Menu}
   HiliteMenu(0);                      { reset menu bar     }
  end
end; {of proc HandleMenu}

PROCEDURE HandleClick(WPtr : WindowPtr; MLoc : Point);
{
    purpose     handle mouse click within window
}
begin
  if WPtr = MainPtr                    { if this is our window... }
    then if WPtr <> FrontWindow        { and it's not in front... }
      then SelectWindow(WPtr)          { ...then make it active   }
end; { of proc HandleClick }

PROCEDURE HandleGoAway(WPtr : WindowPtr; MLoc : Point);
{
    purpose     handle mouse click in go-away box
}
var
  WPeek       : WindowPeek;            { for looking at windows  }
begin
  if WPtr = FrontWindow then begin     { if it's the active window }
    WPeek := WindowPeek(WPtr);         { peek at the window        }
    if TrackGoAway(WPtr,MLoc) then begin  { and the box is clicked }
      if WPeek^.WindowKind = userKind  { if it's our window   }
        then Finished := True          { then time to stop    }
        else CloseDeskAcc(WPeek^.WindowKind){    else close DeskAcc }
    end
  end
  else SelectWindow(WPtr)              { else make it active  }
end; { of proc HandleGoAway }
```

```
PROCEDURE HandleGrow(WPtr : WindowPtr; MLoc : Point);
{
    purpose     handle mouse click in grow box
}
type
  GrowRec    =
    record
      case Integer of
        0    : (Result   : LongInt);
        1    : (Height,Width : Integer)
      end;
var
  GrowInfo    : GrowRec;
begin
  if WPtr = MainPtr then with GrowInfo do begin { if it's our window   }
    Result := GrowWindow(WPtr,MLoc,GrowArea);   { get amt of growth   }
    SizeWindow(WPtr,Width,Height,True);         { resize window       }
    InvalRect(WPtr^.portRect)                   { set up for update   }
  end
end; { of proc HandleGrow }

PROCEDURE DoMouseDown(theEvent:EventRecord);
{
    purpose     identify where mouse was clicked and handle it
}
var
  Location    : Integer;
  theWindow   :  WindowPtr;
  MLoc        :  Point;
  WLoc        :  Integer;
begin
  MLoc := theEvent.Where;              { get mouse position          }
  WLoc := FindWindow(MLoc,theWindow);  { get window, loc in window   }
  case WLoc of                         { handle window locations     }
    InMenuBar  : HandleMenu(MenuSelect(MLoc));   { in the menu       }
    InContent  : HandleClick(theWindow,MLoc);    { inside the window }
    InGoAway   : HandleGoAway(theWindow,MLoc);   { in the go away box}
    InGrow     : HandleGrow(theWindow,MLoc);     { in the grow box   }
    InDrag     : DragWindow(theWindow,MLoc,DragArea); { in the drag bar}
    InSysWindow : SystemClick(theEvent,theWindow)    { in a DA window  }
  end
end; { of proc DoMouseDown }
```

```
PROCEDURE DoKeypress(theEvent : EventRecord);
{
    purpose      handles keypress (keyDown, autoKey) event
}
var
  KeyCh        : Char;
begin
  if (theEvent.modifiers and cmdKey) <> 0 then begin { menu key command }
    KeyCh := Chr(theEvent.Message and charCodeMask); { decode character }
    HandleMenu(MenuKey(KeyCh))                  { get menu and item}
  end
  else SysBeep(1)                               { do *something* }
end; { of proc DoKeypress }

PROCEDURE DoUpdate(theEvent : EventRecord);
{
    purpose      handles window update event
}
var
  SavePort,theWindow   : WindowPtr;
begin
  theWindow := WindowPtr(theEvent.Message);    { find which window   }
  if theWindow = MainPtr then begin            { only update ours    }
    SetCursor(CursList[watchCursor]^);         { set cursor to watch }
    GetPort(SavePort);                         { save current grafport }
    SetPort(theWindow);                        { set as current port }
    BeginUpdate(theWindow);                    { signal start of update}

{ and here's the update stuff! }
    ClearWindow(theWindow);                    { do update stuff     }
  { now, back to our program...}

EndUpdate(theWindow);                      { signal end of update }
    SetPort(SavePort);                         { restore grafport    }
    SetCursor(Arrow)                           { restore cursor      }
  end
end; { of proc DoUpdate }

PROCEDURE DoActivate(theEvent : EventRecord);
{
    purpose      handles window activation event
}
var
```

```
  I        : Integer;
  AFlag    : Boolean;
  theWindow : WindowPtr;
begin
  with theEvent do begin
    theWindow := WindowPtr(Message);        { get the window       }
    AFlag := Odd(Modifiers);                { get activate/deactive }
    if AFlag then begin                     { if it's activated... }
      SetPort(theWindow);                   {   make it the port    }
      FrontWindow := theWindow;             {   know it's in front  }
      DrawGrowIcon(theWindow);              {   set size box        }
    end
    else begin
      SetPort(ScreenPort);                  { else reassign port    }
      if theWindow = FrontWindow            { if it's in front      }
        then FrontWindow := NIL             { ...then forget that   }
    end;
    if theWindow = MainPtr then begin       { if it's our window    }
      DrawMenuBar                           { update menu bar       }
    end
  end
end; { of proc DoActivate }

PROCEDURE Initialize;
{
    purpose     initialize everything for the program
}
var
  FontName   :Str255;
  Indx       : Integer;
  Result     : Real;
begin
  { initialize all the different managers                  }
  InitGraf(@thePort);         { create a grafport for the screen }
  MoreMasters;
  MoreMasters;
  InitFonts;                  { start up the font manager    }
  InitWindows;                { start up the window manager   }
  InitMenus;                  { start up the menu manager    }
  TEInit;                     { start up the text manager for DAs }
  InitDialogs(NIL);           { start up the dialog manager   }
  FlushEvents(everyEvent,0);  { clear events from previous state }
```

```
{ get four standard system cursors, plus one custom one         }
for Indx := iBeamCursor to watchCursor do begin
  CursList[Indx]:=GetCursor(Indx); { read in from system resource }
  HLock(Handle(CursList[Indx]))    { lock the handle down         }
end;
CursList[myCursor] := GetCursor(MyCursID); { get cursor from resources}
HLock(Handle(CursList[myCursor]));         { and lock it down      }
SetCursor(CursList[watchCursor]^);{ bring up watch cursor         }

{ set up menus }
MenuList[AM] := GetMenu(ApplMenu);{ read menus in from resource fork }
MenuList[FM] := GetMenu(FileMenu);
MenuList[CM] := GetMenu(ClimMenu);
MenuList[GM] := GetMenu(CropMenu);
MenuList[SM] := GetMenu(StatMenu);
MenuList[DM] := GetMenu(DeciMenu);
AddResMenu(MenuList[AM],'DRVR'); { pull in all desk accessories    }
{*************************************************************
*************}
MenuList[EM] := GetMenu(FontMenu);
AddResMenu(MenuList[EM],'FONT'); { pull in all fonts              }
FontItem := 1;
DoFontMenu(FontItem);

MenuList[PM] := GetMenu(SizeMenu);
SizeItem := 3;
DoSizeMenu(SizeItem);
{*************************************************************
************}
for Indx := 1 to MenuCnt do    { place menus in menu bar          }
  InsertMenu(MenuList[Indx],0);
DrawMenuBar;                   { draw updated menu bar to screen  }

{ set up window stuff }
GetWMgrPort(ScreenPort);       { get grafport for all windows     }
SetPort(ScreenPort);           { and keep hand just in case       }
MainPtr := GetNewWindow(MainID,@MainRec,Pointer(-1));  { get window }
SetPort(MainPtr);              { set window to current graf port  }
SelectWindow(MainPtr);         { and make window active           }
FrontWindow := MainPtr;        { remember that it's in front      }
DrawGrowIcon(MainPtr);         { draw the grow box in the corner  }
MainPeek := WindowPeek(MainPtr); { get pointer to window record   }
MainPeek^.windowKind := UserKind; { set window type = user kind (ID=8)}
```

```
ScreenArea := screenBits.Bounds;  { get size of screen (don't assume) }
with ScreenArea do begin
  SetRect(DragArea,5,25,Right-5,Bottom-10);  { set drag region      }
  SetRect(GrowArea,50,20,Right-5,Bottom-10)  { set grow region      }
end;

{ program-specific initialization }
  VFlag := False;
  FileSelected := False;        { set file opened false     }
  New(SPtr);
  New(VolParmBlock);
  New(FileParmBLock);
  VolParmBlock^.ioVRefNum := 0;
  UpdateMenu;.                  { update menu as needed     }
  MenuFlag:=false;
  Finished := False;            { set program terminator to false }
GetOutputfile (outfile);
end; { of proc Initialize }

PROCEDURE CleanUp;
{
    purpose     to do whatever's needed before returning to Finder
}
begin
  close(outfile);
  DisposeWindow(MainPtr)        { get rid of the main window      }
end; { of proc CleanUp }

PROCEDURE CursorAdjust;
{
    purpose     change cursors depending upon location
}
var
  MousePt          : Point;
begin
  if MainPtr = FrontWindow then with MainPeek^ do begin
    GetMouse(MousePt);                       { find where mouse is }
    if PtInRect(MousePt,port.portRect) then    { if over window then }
      if Button                              { if button down... }
        then SetCursor(CursList[plusCursor]^) {   then make a plus  }
        else SetCursor(CursList[myCursor]^)   {   else make an ainj }
      else SetCursor(Arrow)                   { else make an arrow }
  end
``` end; { of proc CursorAdjust }

PROCEDURE HandleEvent(theEvent : EventRecord);
{
    purpose      decodes event and handles it
}
begin
  case theEvent.What of
    mouseDown      : DoMouseDown(theEvent);    { mouse button pushed }
    keyDown        : DoKeyPress(theEvent);     { key pressed down    }
    autoKey        : DoKeyPress(theEvent);     { key held down       }
    updateEvt      : DoUpdate(theEvent);       { window need updating }
    activateEvt    : DoActivate(theEvent)      { window made act/inact }
  end
end; { of proc HandleEvent } begin { main body of program MyDemo }
  Initialize;                    { set everything up      }
  repeat                         { keep doing the following }
    SystemTask;                  { update desk accessories }
    CursorAdjust;                { update which cursor     }
    if GetNextEvent(everyEvent,theEvent) { if there's an event... }
      then HandleEvent(theEvent)         { ...then handle it    }
  until Finished;                { until user is done      }
  Cleanup                        { clean everything up     }
end. { of program MyDemo }

© 1988 BAHM, INC.

{*******************************************************************}
{$S AIDMexpt}   © 1988 BAHM, INC.
{******************* dated Nov 15th 1988 *******************

CREATING A NODE IN THE ITEM LIST
This module creates a new node in the linked item list. It adds a new node to the top of the item list and returns a pointer to the item named in that node.
The first step creates a new node.
The second locates the top of the list.
The third sets the the top pointer to the newly created node.
The "with" statement initializes all fields of the new record.}

PROCEDURE make_node(VAR curr_item:item_ptr);

VAR
head: item_ptr;

```
BEGIN
new(curr_item);
head:=top_fact;
top_fact:=curr_item;
WITH curr_item^ DO
      BEGIN
      next:=head;
      value_list:=NIL;
      question:='';
      legal_list:=NIL;
      multivald:=FALSE;
      sought:=FALSE;
      END;
END;
```

{*************************************************************
LOCATING AN ITEM NAME IN THE LINKED LIST
The module find_item acts on an item name, returning a pointer
to the place in the list if the item is found,
or nil if it is not.}

```
FUNCTION  find_item(f_item:word_string):item_ptr;

VAR
curr_item:  item_ptr;

BEGIN
IF (last_try<>NIL) AND (last_try^.name=f_item)
THEN  find_item:=last_try
ELSE
      BEGIN
      curr_item:=top_fact;
      last_try:=NIL;
      find_item:=NIL;
      WHILE((curr_item<>NIL) AND (last_try=NIL)) DO
            BEGIN
            IF(curr_item^.name=f_item)THEN
                  BEGIN
                  find_item:=curr_item;
                  last_try:=curr_item
                  END;
            curr_item:=curr_item^.next
            END;
      END;
END;
```

```
{***********************************************************
SPLITTING THE ITEM-VALUE COUPLET
This module acts on an expression in the form ITEM=VALUE,
extracting the item name and the value name and returning them
in separate strings.
The procedure searches the input string for the position of the
"=" sign.
It then places the item name in f_item and the value name in
f_value.}

PROCEDURE split(f_line:line_string; VAR f_item,f_value:word_string);

VAR
st_left,
st_right: integer;

BEGIN
st_right:=pos(PERIOD,f_line);
IF(st_right=length(f_line))
     THEN  f_line:=copy(f_line,1,st_right-1);
st_left:=pos(EQUALS,f_line);
st_right:=pos(COMMA,f_line);
IF((st_left=0) AND (st_right=0)) THEN
     f_item:=f_line;
IF(st_right=0) THEN st_right:=length(f_line)+1;
IF(st_left>0) THEN
     BEGIN
     f_item:=copy(f_line,1,st_left-1);
     IF(pos(')',f_item)=0) THEN
          f_value:=copy(f_line,st_left+1,st_right-st_left-1)
     END;
st_right:=pos(')',f_item);
IF(st_right>0) THEN
     f_item:=copy(f_line,1,st_right-1);
END;

{***********************************************************
TESTING ITEMS AND VALUES
The next module verifies that an item-value couplet is present
in the knowledge base.}

FUNCTION  test(f_item,f_value:word_string):value_ptr;

VAR
curr_item:item_ptr;
curr_value:value_ptr;
```

```
BEGIN
curr_item:=find_item(f_item);
test:=NIL;
IF(curr_item<>NIL) THEN
      BEGIN
      curr_value:=curr_item^.value_list;
      WHILE(curr_value<>NIL) DO
            BEGIN
            IF(curr_value^.name=f_value) THEN test:= curr_value;
            curr_value:=curr_value^.next
            END;
      END;
END;
```

{*************************************************************
ADDING AN ITEM TO THE LIST
This module is passed two strings: an item name and a value name.
The procedure adds the item name to the linked item list and
inserts the value name in the item node's respective value list.

The first step looks for an item name. If not found, it creates
a new node and adds the name at the top of the list.}

```
PROCEDURE add_item(f_item,f_value:word_string);

VAR
curr_item:item_ptr;
value_list,
head: value_ptr;

BEGIN
curr_item:= find_item(f_item);
IF(curr_item=NIL) THEN
      make_node(curr_item);
curr_item^.name:=f_item;
curr_item^.sought:=TRUE;
value_list:=test(f_item,f_value);
IF(value_list=NIL) THEN
      BEGIN
      head:=curr_item^.value_list;
      new(value_list);
      WITH value_list^ DO
            BEGIN
            next:=head;
            cert:=0;
```

```
            name:=f_value;
        END;
    curr_item^.value_list:=value_list;
    END;
END;
```

{*********************************************************
DISPLAYING THE VALUE LIST
This module acts on an item pointer, writing all the value names contained in the item node's value list.
The listing ends when NIL is returned.}

```
PROCEDURE see_vals(curr_item:item_ptr;cf_on:boolean);

VAR
curr_value:value_ptr;
cf:integer;

BEGIN
curr_value:=curr_item^.value_list;
write(' ',curr_item^.name,' = ');
IF(curr_value=NIL) THEN write(' Undefined');
WHILE(curr_value<>NIL) DO
    BEGIN
    write(' ',curr_value^.name);
    IF(cf_on=TRUE) THEN
        BEGIN
        cf:=curr_value^.cert;
        writeln(', cf: ',cf,'. ');
        write('      ');
        END;
    curr_value:=curr_value^.next;
    IF(curr_value<>NIL) THEN write('and = ');
    END;
writeln
END;
```

{*********************************************************
DISPLAYING FACTS IN THE KNOWLEDGE BASE
This module displays item names and value names which are in the knowledge base.}

```
PROCEDURE see_items(cf_on:boolean);

VAR
curr_item:item_ptr;
```

```
BEGIN
writeln;
writeln(' Knowledge Base Facts:');
writeln;
curr_item:=top_fact;
WHILE(curr_item<>NIL) DO
      BEGIN
      see_vals(curr_item,cf_on);
      curr_item:=curr_item^.next
      END;
writeln;
writeln(' End of Knowledge Base');
END;
```

{*********************************************************
CERTAINTY FACTORS
The next four units (two functions and two procedures) deal
with the certainty factors involved in the judgements of the
item=value couplets.
** VAL takes the end of the string showing the cf and changes it
from a string to the actual integer number.
** GET_CF will be used to extract the certainty factor from an
item-value couplet.
** BLEND will permit updating of existing certainty factors by
combining new input with previously assigned cf integers.
** ADD_CF will be used to save the new certainty factor in the
item-value list.
These four units follow below.}

{*************}
```
PROCEDURE val(the_string:line_string; VAR variable, code: integer);

VAR
counter,
number,
word_length: integer;

FUNCTION ten_to_the(n:integer):integer;

VAR
i,
dummy:integer;
```

```
BEGIN
dummy:=1;
FOR i:=1 to n DO
      dummy:= dummy * 10;
ten_to_the:= dummy
END;

BEGIN
variable:= 0;
code:= 0;
word_length:= length(the_string);
counter:= word_length;
IF(counter>3) THEN code:=2
ELSE
      REPEAT
      BEGIN
            number:= ord(the_string[counter]) - 48;
            IF ((number>=0) AND (number<=9)) THEN
            variable:=variable+number*ten_to_the(word_length-counter)
            ELSE
            code:=1;
         counter:=counter-1;
         END;
         UNTIL(counter=0);
END;

{************}
FUNCTION get_cf (f_line:line_string):integer;

VAR
result,
st_right,
cf: integer;
trim: line_string;

BEGIN
cf:= DEFINITE;
st_right:= pos(PERIOD,f_line);
IF st_right = length(f_line) THEN f_line:= copy(f_line,1,st_right-1);
st_right:= pos('cf',f_line);
IF (st_right>0) AND (st_right+3<LINE_MAX) THEN
      BEGIN
      trim:= copy(f_line,st_right+3,length(f_line)-st_right-2);
      val(trim,cf,result);
```

```
        IF(result>0) THEN cf:=DEFINITE;
        IF pos('poor',trim)>0   THEN cf:= 25;
        IF pos('fair',trim)>0   THEN cf:= 50;
        IF pos('good',trim)>0   THEN cf:= 75;
        IF pos('excellent',trim)>0   THEN cf:= DEFINITE
        END;
  get_cf:= cf
  END;

{***********************************}

FUNCTION blend (cf1,cf2:integer):integer;

BEGIN
blend:= (((100*cf1)+(100*cf2)-(cf1*cf2)) DIV 100)
END;

{***********************************}

PROCEDURE add_cf (f_item,f_value:word_string; cf2: integer);

VAR
cf1: integer;
curr_value: value_ptr;

BEGIN
curr_value:= test(f_item,f_value);
cf1:= curr_value^.cert;
curr_value^.cert:= blend(cf1,cf2)
END;

{*****************************************************************
MULTIVALUED ITEMS
Some items are multivalued.  This section takes into account
the fact that some items may have more than one value.
The following modules ascertain whether or not an item in the
linked list is multivalued and defines a particular item as being
multivalued.

OK_ADD reports on the status of any specified item name in the
list to see if it is multivalued or not multivalued.}

FUNCTION ok_add(f_item:word_string; cf:integer):boolean;
```

```
VAR
curr_item: item_ptr;
curr_value: value_ptr;
is_100: boolean;

BEGIN
ok_add:= TRUE;
is_100:= FALSE;
curr_item:= find_item(f_item);
IF(curr_item<>NIL) THEN
      BEGIN
      curr_value:= curr_item^.value_list;
      WHILE(curr_value<>NIL) DO
            BEGIN
            IF(curr_value^.cert=DEFINITE) THEN is_100:= TRUE;
            curr_value:= curr_value^.next;
            END
      END;
IF((cf=DEFINITE)AND(is_100=TRUE)AND(curr_item^.multivald=FALSE))
      THEN ok_add:= FALSE
END;
```

{MAKE_MULTI changes the status of an item from "not multivalued" to "multivalued".}

```
PROCEDURE make_multi(f_line:line_string);

VAR
curr_item: item_ptr;
dummy,
f_item: word_string;

BEGIN
split(f_line,f_item,dummy);
curr_item:= find_item(f_item);
IF(curr_item=NIL) THEN make_node(curr_item);
curr_item^.name:= f_item;
curr_item^.multivald:= TRUE;
END;
```

{*************************************************************
LEGAL VALUES
This section defines the legal values for the items.
The input will be able to contain an item name and a list of legal values which will be stored in the linked item list.

FIND_WORD locates a legal value in a string containing an item name and a list of legal values.
This locates the nth value in a string in the form
ITEM=VAL1,VAL2,VAL3 etc.
and stores the located value name as the variable WORD.
If no nth value is found, FALSE is returned.}

```
FUNCTION find_word
(f_line:line_string; n:integer; VAR word: word_string):boolean;
VAR
x,
com_place:integer;

BEGIN
find_word:= FALSE;
word:= '';
FOR x:= 1 to n DO
      BEGIN
      com_place:= pos(COMMA,f_line);
      IF(com_place=0) THEN
            BEGIN
            com_place:= length(f_line)+1;
            find_word:= TRUE
            END;
      word:= copy(f_line,1,com_place-1);
      f_line:= copy(f_line, com_place+1, length(f_line)-com_place)
      END
END;
```

{*********}
{ADD_LEGAL adds a legal value to a specified item name.
It adds a new node to the top of the item's legal value list.}

```
PROCEDURE add_legal(f_item:word_string; curr_item:item_ptr);

VAR
curr_value,
head: legal_ptr;

BEGIN
new(curr_value);
curr_value^.next:=NIL;
curr_value^.name:=f_item;
head:=curr_item^.legal_list;
IF(head<>NIL) THEN
```

```
BEGIN
    WHILE(head^.next<>NIL) DO
        head:=head^.next;
    head^.next:=curr_value
    END
ELSE
    curr_item^.legal_list:=curr_value
END;

{**********}
{FIND_LEGAL locates a particular legal value in an item's list
of legal values.
It splits the string and then checks to see if the item exists
in the item list.}

FUNCTION find_legal
(f_item:word_string; n:integer; VAR word:word_string):boolean;

VAR
curr_item:item_ptr;
curr_value:legal_ptr;
counter:integer;

BEGIN
curr_item:= find_item(f_item);
find_legal:= TRUE;
IF(curr_item<>NIL) THEN
    BEGIN
    curr_value:= curr_item^.legal_list;
    word:= curr_value^.name;
    counter:=1;
    IF(curr_value=NIL) THEN find_legal:= FALSE;
    WHILE((curr_value<>NIL) AND (counter<n)) DO
        BEGIN
        curr_value:= curr_value^.next;
        IF(curr_value<>NIL) THEN
            BEGIN
            word:= curr_value^.name;
            counter:=counter+1
            END
        ELSE find_legal:= FALSE;
        END
    END
ELSE find_legal:= FALSE
END;
```

{**********}
{MAKE_LEGALS acts on a string containing an item name and a list of legal values, to separate each value name in the list.}

PROCEDURE make_legals(f_line:line_string);

VAR
curr_item:item_ptr;
counter,
st_place:integer;
new_line:line_string;
word:word_string;
done:boolean;
f_item,
dummy:word_string;

BEGIN
split(f_line,f_item,dummy);
curr_item:= find_item(f_item);
IF(curr_item=NIL) THEN make_node(curr_item);
curr_item^.name:= f_item;
st_place:= pos(EQUALS,f_line);
new_line:=copy(f_line, st_place+1, length(f_line)-st_place);
counter:=1;
done:=FALSE;
WHILE(done=FALSE) DO
    BEGIN
    done:= find_word(new_line, counter, word);
    add_legal(word, curr_item);
    counter:= counter+1
    END
END;

{************}
{ADD_QUESTION saves a question about a specified item input by the operator.
It acts on an input string in the form ITEM=QUESTION and stores the question with the item in the linked item list.}

PROCEDURE add_question(f_line:line_string);

VAR
new_line:line_string;
curr_item:item_ptr;
f_item,

```
dummy:word_string;
st_place:integer;

BEGIN
split(f_line,f_item,dummy);
curr_item:=find_item(f_item);
IF(curr_item=NIL) THEN make_node(curr_item);
curr_item^.name:=f_item;
st_place:=pos(EQUALS,f_line);
new_line:=copy(f_line,st_place+1,length(f_line)-st_place);
curr_item^.question:=new_line
END;
```

{**********}
{P_QUESTION displays an existing question about a named item.}

```
PROCEDURE p_question(f_item:word_string);

VAR
curr_item:item_ptr;

BEGIN
curr_item:=find_item(f_item);
IF(curr_item<>NIL) THEN
    BEGIN
    IF(curr_item^.question<>'') THEN writeln(' ',curr_item^.question)
    ELSE writeln(' What is the value of ',f_item,'?')
    END
ELSE writeln(' I do not have the value of ',f_item,'?')
END;
```

{******}
{ASK allows the operator to answer a question posed by the program.}

```
PROCEDURE ask(f_item:word_string; VAR f_value:word_string);

VAR
pick,
pick1,
num_vals:integer;
okay:boolean;
word,
select:word_string;
```

```
BEGIN
p_question(f_item);
IF find_legal(f_item,1,word)=FALSE THEN
      readln(f_value)
ELSE
      BEGIN
      num_vals:=1;
      WHILE(find_legal(f_item,num_vals,word)<>FALSE) DO
            BEGIN
            writeln(' ',num_vals,'. ',word);
            num_vals:=num_vals+1
            END;
      pick:=0;
      WHILE((pick<1) OR (pick>=num_vals)) DO
            BEGIN
            writeln('  Please enter a number from 1 to ',num_vals-1);
            readln(select);
            pick:=ord(select[1])-48;
            IF(length(select)>1) THEN
                  BEGIN
                  pick1:=ord(select[2])-48;
                  IF((pick1>=0) AND (pick1<10)) THEN pick:=pick*10+pick1
                  END
            END;
      okay:=find_legal(f_item,pick,word);
      f_value:=word
      END
END;
```

{*************************************************************
The next set of program modules read, save and retrieve rules.
The modules are as follows.}

{********}
{P_READ performs simple housekeeping chores}

PROCEDURE p_read(VAR oline:line_string);

VAR
c:char;
cs:string[1];
len,
counter,

```
st_place:integer;
supress:boolean;
in_line:line_string;

BEGIN
readln(kbase,in_line);
oline:='';
len:=length(in_line);
st_place:=pos(' and',in_line);
IF(st_place>0) THEN len:=st_place;
supress:=FALSE;
FOR counter:=1 to len DO
      BEGIN
      c:=in_line[counter];
      IF((c=EQUALS) AND (pos('question',oline)>0)) THEN supress:=TRUE;
      IF(ord(c)=9) THEN c:=' ';
      IF((c in['A'..'Z']) AND (supress=FALSE)) THEN
            c:=chr(ord(c)+32);
      cs:=' ';
      cs[1]:=c;
      IF((c<>' ') OR (supress=TRUE)) THEN
            oline:=concat(oline,cs)
      END
END;

{*******}
{ADD_PREM is used to add a premise to the current rule}

FUNCTION add_prem
(curr_prem:prem_ptr;  f_line:line_string):prem_ptr;

VAR
temp,
new_prem:prem_ptr;
f_item,
f_value:word_string;

BEGIN
split(f_line,f_item,f_value);
add_prem:=curr_prem;
new(new_prem);
WITH new_prem^ DO
      BEGIN
```

```
        item:=f_item;
        value:=f_value;
        next:=NIL;
        END;
IF(curr_prem=NIL) THEN add_prem:=new_prem
ELSE
    BEGIN
    WHILE(curr_prem^.next<>NIL) DO curr_prem:=curr_prem^.next;
    curr_prem^.next:=new_prem
    END
END;

{*********}
{ADD_CON adds the corresponding conclusion}

FUNCTION add_con(curr_con:con_ptr;f_line:line_string):con_ptr;

VAR
temp,
new_con:con_ptr;
f_item,
f_value:word_string;

BEGIN
split(f_line,f_item,f_value);
add_con:=curr_con;
new(new_con);
WITH new_con^ DO
    BEGIN
    item:=f_item;
    value:=f_value;
    cert:=get_cf(f_line);
    next:=NIL
    END;
IF(curr_con=NIL) THEN add_con:=new_con
ELSE
    BEGIN
    WHILE(curr_con^.next<>NIL) DO curr_con:=curr_con^.next;
    curr_con^.next:=new_con
    END
END;

{********}
```

{P_RULE displays the named rule on the console}

PROCEDURE p_rule(curr_rule:rule_ptr);

VAR
curr_prem:prem_ptr;
curr_con:con_ptr;

```
BEGIN
writeln('  ',curr_rule^.name,':if');
curr_prem:=curr_rule^.prem;
WHILE(curr_prem<>NIL) DO
      BEGIN
      write('   ',curr_prem^.item,'=');
      write('   ',curr_prem^.value);
      curr_prem:=curr_prem^.next;
      IF(curr_prem<>NIL) THEN writeln(' and')
      ELSE writeln
      END;
writeln('then');
curr_con:=curr_rule^.con;
WHILE(curr_con<>NIL) DO
      BEGIN
      write('   ',curr_con^.item,'=');
      write('   ',curr_con^.value,' cf',curr_con^.cert);
      curr_con:=curr_con^.next;
      IF curr_con<>NIL THEN writeln(' and')
      ELSE writeln
      END
END;
```

{*******}
{ENTER_RULE reads a rule from a text file and adds it to the system's rule list}

PROCEDURE enter_rule(rule_name:word_string);

VAR
new_rule,
curr_rule:rule_ptr;
line:line_string;
done:boolean;

```
BEGIN
new(new_rule);
IF(top_rule<>NIL) THEN
      BEGIN
      curr_rule:=top_rule;
      WHILE(curr_rule^.next<>NIL) DO  curr_rule:=curr_rule^.next;
      curr_rule^.next:=new_rule;
      END
ELSE  top_rule:=new_rule;
WITH new_rule^ DO
      BEGIN
      name:=rule_name;
      next:=NIL;
      prem:=NIL;
      con:=NIL;
      END;
p_read(line);
done:=FALSE;
WHILE((NOT done) AND (NOT Eof(kbase))) DO
      BEGIN
      new_rule^.prem:=add_prem(new_rule^.prem,line);
      p_read(line);
      IF pos('then',line)>0 THEN done:=TRUE
      END;
p_read(line);
done:=FALSE;
REPEAT
      IF(Eof(kbase)) THEN done:=TRUE;
      new_rule^.con:=add_con(new_rule^.con,line);
      IF line[length(line)]='.' THEN done:=TRUE
      ELSE  p_read(line)
UNTIL(done);
{writeln;
p_rule(new_rule)}
END;

{*******}
{READ_FILE reads the entire contents of a rule file into a knowledge base.}

PROCEDURE read_file(var rulebase:string);

VAR
```

```
command:word_string;
m_line,
f_line:line_string;
st_place:integer;

BEGIN
writeln('  Reading in file containing rules for ',rulebase,':');
reset(kbase,rulebase);
top_rule:=NIL;
command:='';
WHILE( NOT Eof(kbase)) DO
      BEGIN
      p_read(f_line);
      st_place:=pos('(',f_line);
      IF(st_place=0) THEN st_place:=pos(COLON,f_line);
      IF(st_place>1) THEN
            BEGIN
            command:= copy(f_line,1,st_place-1);
            m_line:= copy(f_line,st_place+1,length(f_line)-st_place);
            IF(command='multivalued') THEN make_multi(m_line);
            IF(command='question') THEN add_question(m_line);
            IF(command='legalvals') THEN make_legals(m_line);
            IF(pos('rule',command)>0) THEN enter_rule(command)
            END;
      END;
close(kbase);
END;
```

{*********************************************************
*********************************************************
THE INFERENCE ENGINE
The following modules comprise the inference engine that
pursues a goal to ascertain the path to that goal.
Inference is a generalization from specific data or information
(opposite to a deduction) and the engine runs backwards through
the rules to do its job.
The modules follow.}

{********}
{FIND_RULE searches the rule list to locate the first rule that
applies to the item whose value is currently being sought.
It finds a rule with the given item name in the conclusion.
It uses the conclusion pointer CURR_CON to search through the rule list for a matching item name.
If a matching item name is found, TRUE is returned.}

FUNCTION find_rule(itm:word_string; curr_rule:rule_ptr):rule_ptr;

VAR
found:boolean;
curr_con:con_ptr;

BEGIN
found:=FALSE;
find_rule:=NIL;
WHILE((curr_rule<>NIL) AND (found=FALSE)) DO
    BEGIN
    curr_con:=curr_rule^.con;
    WHILE(curr_con<>NIL) DO
        BEGIN
        IF(curr_con^.item=itm) THEN
            BEGIN
            found:=TRUE;
            find_rule:=curr_rule
            END;
        curr_con:=curr_con^.next
        END;
    curr_rule:=curr_rule^.next
    END
END;

{********}
{CONCLUDE implements the conclusions of a rule.
This procedure implements a conclusion when the inference engine
finds a link between the premise of one rule and the conclusion
of another.
It ascertains the certainty factor of the conclusion, based on
the respective cf integers of the contributing
rules, and prints its conclusion on the screen.}

PROCEDURE conclude(curr_rule:rule_ptr; prem_cert:integer);

VAR
curr_con:con_ptr;
cert:integer;
BEGIN
curr_con:=curr_rule^.con;
    WHILE(curr_con<>NIL) DO

```
            BEGIN
                add_item(curr_con^.item, curr_con^.value);
                cert:=(prem_cert*curr_con^.cert) DIV 100;
                add_cf(curr_con^.item, curr_con^.value, cert);
                curr_con:=curr_con^.next
            END
END;

{*********}
{EXPLAIN_HOW displays the current premise and then goes back
through all premises used until it reaches the beginning.
Thus a track of all the arguements to the conclusion is traced.}

PROCEDURE explain_how(curr_rule:rule_ptr);

VAR
curr_prem:prem_ptr;
curr_con:con_ptr;

BEGIN
writeln;
writeln(' Because:');
curr_prem:=curr_rule^.prem;
WHILE(curr_prem<>NIL) DO
       BEGIN
       write('   ',curr_prem^.item,' = ');
       write('   ',curr_prem^.value);
       curr_prem:=curr_prem^.next;
       IF(curr_prem<>NIL) THEN writeln(' and')
       ELSE writeln
       END;
writeln(' We can conclude that ');
curr_con:=curr_rule^.con;
WHILE(curr_con<>NIL) DO
       BEGIN
       write('   ',curr_con^.item,' = ');
       write('   ',curr_con^.value);
       curr_con:=curr_con^.next;
       IF curr_con<>NIL THEN writeln(' and')
       ELSE writeln
       END;
writeln
END;
```

{**********}
{EXPLAIN_WHY explains why a question has been asked}

PROCEDURE explain_why(f_item:word_string);

BEGIN
writeln;
write(' Since no rules are able to conclude a value');
writeln(' for ',f_item,' --');
writeln(' The user must be asked.');
writeln
END;

{**********}
{PURSUE acts on the name of an item and attempts to apply the rules to give the item a value.
It is the heart of the inference engine.
If no rules conclude anything about the item, the user is asked to enter its value.
The procedure uses a rule pointer to point to the current rule under consideration.
It begins by checking the item list to see of the item already exists.
If the item is not found, a new node is created at the top of the list.
The program then sets out to find a rule that has the item name in its conclusion. It then tests each part of the rule's premise.
If the rule passes, its conclusion is added to the knowledge base.
If the item's value cannot be found with the rules, the program prompts the operator to enter a value name.}

PROCEDURE pursue(f_item:word_string);

VAR
f_value:word_string;
curr_item:item_ptr;
curr_value:value_ptr;
curr_rule:rule_ptr;
curr_prem:prem_ptr;
bad:boolean;
solved:boolean;
lowest:integer;

```
BEGIN
curr_item:=find_item(f_item);
IF curr_item=NIL THEN make_node(curr_item);
curr_item^.name:=f_item;
IF(curr_item^.sought<>TRUE) THEN
      BEGIN
      solved:=FALSE;
      curr_item^.sought:=TRUE;
      curr_rule:=find_rule(f_item, top_rule);
      WHILE((curr_rule<>NIL) AND (ok_add(f_item,DEFINITE)=TRUE)) DO
            BEGIN
            curr_prem:=curr_rule^.prem;
            bad:=FALSE;
            lowest:=DEFINITE;
            WHILE((curr_prem<>NIL) AND (bad=FALSE)) DO
                  BEGIN
                  pursue(curr_prem^.item);
                  curr_value:=test(curr_prem^.item, curr_prem^.value);
                  IF curr_value=NIL THEN bad:=TRUE
                  ELSE IF curr_value^.cert<lowest THEN
                        lowest:=curr_value^.cert;
                  curr_prem:= curr_prem^.next
                  END;
            IF(bad=FALSE) THEN
                  BEGIN
                  IF(explain=TRUE) THEN explain_how(curr_rule);
                  conclude(curr_rule, lowest);
                  solved:= TRUE
                  END;
            curr_rule:=find_rule(f_item, curr_rule^.next)
            END;
      IF(solved=FALSE) THEN
            BEGIN
            IF(explain=TRUE) THEN explain_why(f_item);
            ask(f_item, f_value);
            add_item(f_item, f_value);
            add_cf(f_item, f_value, DEFINITE)
            END
      END
END;

{*********************************************************}
{GET_GOAL gets the goals from the rulebase for use by the
inference engine}
```

```
PROCEDURE get_goal(f_item:word_string; VAR f_value:word_string);

VAR
curr_item:item_ptr;

BEGIN
curr_item:=find_item(f_item);
IF (curr_item=NIL) THEN f_value:='none'
ELSE
    ask(f_item, f_value);
END;
```

{***********************************************************}
{P_RESULT displays the results of the consultation.
The procedure is passed the name of the item goal by the main program.
It displays the entire value list for this item.}

```
PROCEDURE p_result(f_item:word_string; var f_value:word_string);

VAR
curr_item:item_ptr;
curr_value:value_ptr;

BEGIN
writeln;
writeln('  Results of Consultation:');
writeln;
curr_item:=find_item(f_item);
see_vals(curr_item,FALSE);
curr_value:=curr_item^.value_list;
f_value:=curr_value^.name;
writeln;
writeln('  End of Consultation.');
END;
```

{***********************************************************
THE USER INTERFACE
This is the Main Program that integrates the foregoing blocks
with a user interface.
***********************************************************}

```
PROCEDURE Consult(var rulebase, goal, goalvalue:string);

BEGIN
answer:='';
```

```
last_try:= NIL;
top_fact:= NIL;
read_file(rulebase);
writeln;
writeln;
writeln('  Do you want the reasoning explained during the consultation?');
writeln('  default = yes');
writeln;
readln(answer);
IF((answer = '') OR (answer = 'y') OR (answer = 'yes'))
THEN explain:=TRUE
ELSE explain:=FALSE;
s_item:=goal;
pursue(s_item);
p_result(s_item,s_value);
goalvalue:=s_value;
END;

© 1988 BAHM, INC.

{*************************************************************}
{$S AIDMclim}   © 1988 BAHM, INC.
{******************* dated Nov 15th 1988 *********************}
PROCEDURE GetDatafile (var infile:text);

VAR
database:string[20];

BEGIN
writeln('Type in the name of the database file (dataxx/xx)');
readln(database);
IF(database='') THEN database:='weatemp';
writeln('Getting data file - ',database);
reset(infile,database);
END;

{*************************************************************}
PROCEDURE GetOutputfile (var outfile:text);

VAR
outbase:string[20];

BEGIN
writeln('Type in the name of the output file (outfilexx/xx)');
readln(outbase);
IF(outbase='') THEN outbase:='sample';
```

```
writeln('Getting output file - ',outbase);
rewrite(outfile,outbase);
END;

{******** wait performs a timed wait for secs seconds ********}
PROCEDURE wait(secs:longint);
VAR
   time,
   TimeNow,
   NewTime:   longint;
BEGIN
   GetDateTime (timeNow);
   NewTime:=TimeNow+secs;
   repeat
    GetDateTime(time);
    until (time>=NewTime);
end;

{*************************************************************}
Function  dayOfYear:integer;
VAR
   date:DateTimeRec;
   secs:longint;
BEGIN
   GetDateTime (secs);
   Secs2Date (secs, date);
   case date.month of
       1:dayOfYear:=date.day;
       2:dayOfYear:=31+date.day;
       3:dayOfYear:=59+date.day;
       4:dayOfYear:=90+date.day;
       5:dayOfYear:=120+date.day;
       6:dayOfYear:=151+date.day;
       7:dayOfYear:=181+date.day;
       8:dayOfYear:=212+date.day;
       9:dayOfYear:=243+date.day;
       10:dayOfYear:=273+date.day;
       11:dayOfYear:=304+date.day;
       12:dayOfYear:=334+date.day;
    end;
END;   {of function dayOfYear}

{*************************************************************}
FUNCTION AirDensity (DBtemp:real):real;
```

```
BEGIN
AirDensity:= 1.285-0.004*DBtemp;
END;

{*****************************************************}
FUNCTION LatentHeat (DBtemp:real):real;

BEGIN
LatentHeat:= (2.5006-0.00235*DBtemp)*10*10*10*10*10*10;
END;

{*****************************************************}
FUNCTION SatVapPress (DBtemp:real):real;

BEGIN

SatVapPress:= 680.833*exp(0.06088*DBtemp);
END;

{*****************************************************}
FUNCTION SatVapSlope (DBtemp:real):real;

BEGIN
SatVapSlope:= 41.45*exp(0.06088*DBtemp);
END;

{*****************************************************}
FUNCTION VapPress (DBtemp,WBtemp:real):real;

CONST
PsychroConstant      = 66.0;
VAR
svp:real;

BEGIN
svp:=satvappress(DBtemp);
VapPress:= svp-PsychroConstant*(DBtemp-WBtemp);
END;

{*****************************************************}
FUNCTION VapResistance :real;

BEGIN
VapResistance:= 30.0;
END;
```

```
{*****************************************************************}
Function ephemeris(julianday:integer):real;
VAR
    e:real;
BEGIN
case julianday of
1:e:=-3.0; 2:e:=-3.5; 3:e:=-4.0; 4:e:=-4.5; 5:e:=-5.0;
6:e:=-5.4; 7:e:=-5.9; 8:e:=-6.3; 9:e:=-6.8; 10:e:=-7.4;
11:e:=-7.7; 12:e:=-8.0; 13:e:=-8.3; 14:e:=-8.8; 15:e:=-9.1;
16:e:=-9.4; 17:e:=-9.9; 18:e:=-10.1; 19:e:=-10.4; 20:e:=-10.7;
21:e:=-11.1; 22:e:=-11.4; 23:e:=-11.6; 24:e:=-11.9; 25:e:=-12.0;
26:e:=-12.2; 27:e:=-12.5; 28:e:=-12.8; 29:e:=-13.0; 30:e:=-13.2;
31:e:=-13.3; 32:e:=-13.4; 33:e:=-13.5; 34:e:=-13.6; 35:e:=-13.7;
36:e:=-13.8; 37:e:=-13.9; 38:e:=-14.0; 39:e:=-14.1; 40:e:=-14.3;
41:e:=-14.2; 42:e:=-14.2; 43:e:=-14.2; 44:e:=-14.3; 45:e:=-14.1;
46:e:=-14.1; 47:e:=-14.1; 48:e:=-14.1; 49:e:=-14.0; 50:e:=-14.0;
51:e:=-13.9; 52:e:=-13.8; 53:e:=-13.7; 54:e:=-13.6; 55:e:=-13.4;
56:e:=-13.3; 57:e:=-13.0; 58:e:=-12.9; 59:e:=-12.8; 60:e:=-12.5;
61:e:=-12.3; 62:e:=-12.1; 63:e:=-12.0; 64:e:=-11.8; 65:e:=-11.55;
66:e:=-11.3; 67:e:=-11.05; 68:e:=-10.8; 69:e:=-10.55; 70:e:=-10.3;
71:e:=-10.05; 72:e:=-9.8; 73:e:=-9.55; 74:e:=-9.3; 75:e:=-9.05;
76:e:=-8.8; 77:e:=-8.5; 78:e:=-8.2; 79:e:=-7.9; 80:e:=-7.5;
81:e:=-7.2; 82:e:=-6.9; 83:e:=-6.6; 84:e:=-6.3; 85:e:=-6.0;
86:e:=-5.7; 87:e:=-5.4; 88:e:=-5.1; 89:e:=-4.8; 90:e:=-4.5;
91:e:=-4.2; 92:e:=-3.9; 93:e:=-3.6; 94:e:=-3.3; 95:e:=-3.0;
96:e:=-2.7; 97:e:=-2.4; 98:e:=-2.1; 99:e:=-1.9; 100:e:=-1.5;
101:e:=-1.1; 102:e:=-0.9; 103:e:=-0.8; 104:e:=-0.65; 105:e:=-0.5;
106:e:=-0.35; 107:e:=-0.2; 108:e:=0.1; 109:e:=0.4; 110:e:=0.7;
111:e:=1.1; 112:e:=1.3; 113:e:=1.5; 114:e:=1.7; 115:e:=1.9;
116:e:=2.05; 117:e:=2.2; 118:e:=2.35; 119:e:=2.5; 120:e:=2.65;
121:e:=2.8; 122:e:=3.0; 123:e:=3.1; 124:e:=3.2; 125:e:=3.3;
126:e:=3.35; 127:e:=3.4; 128:e:=3.45; 129:e:=3.5; 130:e:=3.55;
131:e:=3.6; 132:e:=3.65; 133:e:=3.7; 134:e:=3.75; 135:e:=3.75;
136:e:=3.75; 137:e:=3.7; 138:e:=3.7; 139:e:=3.65; 140:e:=3.6;
141:e:=3.6; 142:e:=3.55; 143:e:=3.5; 144:e:=3.4; 145:e:=3.3;
146:e:=3.2; 147:e:=3.1; 148:e:=3.0; 149:e:=2.8; 150:e:=2.7;
151:e:=2.6; 152:e:=2.5; 153:e:=2.4; 154:e:=2.2; 155:e:=2.0;
156:e:=1.8; 157:e:=1.6; 158:e:=1.4; 159:e:=1.2; 160:e:=1.1;
161:e:=0.9; 162:e:=0.7; 163:e:=0.5; 164:e:=0.3; 165:e:=0.1;
166:e:=-0.1; 167:e:=-0.3; 168:e:=-0.5; 169:e:=-0.7; 170:e:=-0.9;
171:e:=-1.1; 172:e:=-1.4; 173:e:=-1.6; 174:e:=-1.8; 175:e:=-2.0;
176:e:=-2.3; 177:e:=-2.5; 178:e:=-2.7; 179:e:=-2.9; 180:e:=-3.1;
181:e:=-3.3; 182:e:=-3.5; 183:e:=-3.7; 184:e:=-3.9; 185:e:=-4.1;
186:e:=-4.3; 187:e:=-4.45; 188:e:=-4.6; 189:e:=-4.75; 190:e:=-4.9;
191:e:=-5.05; 192:e:=-5.2; 193:e:=-5.35; 194:e:=-5.5; 195:e:=-5.65;
```

196:e:=-5.8; 197:e:=-5.9; 198:e:=-6.0; 199:e:=-6.1; 200:e:=-6.2;
201:e:=-6.25; 202:e:=-6.3; 203:e:=-6.3; 204:e:=-6.35; 205:e:=-6.4;
206:e:=-6.4; 207:e:=-6.45; 208:e:=-6.45; 209:e:=-6.45; 210:e:=-7.4;
211:e:=-6.4; 212:e:=-6.35; 213:e:=-6.3; 214:e:=-6.2; 215:e:=-6.15;
216:e:=-6.1; 217:e:=-6.0; 218:e:=-5.9; 219:e:=-5.8; 220:e:=-5.65;
221:e:=-5.5; 222:e:=-5.4; 223:e:=-5.3; 224:e:=-5.15; 225:e:=-5.0;
226:e:=-4.8; 227:e:=-4.6; 228:e:=-4.4; 229:e:=-4.2; 230:e:=-4.0;
231:e:=-3.8; 232:e:=-3.6; 233:e:=-3.3; 234:e:=-3.05; 235:e:=-2.8;
236:e:=-2.55; 237:e:=-2.3; 238:e:=-2.05; 239:e:=-1.8; 240:e:=-1.5;
241:e:=-1.2; 242:e:=-0.9; 243:e:=-0.6; 244:e:=-0.3; 245:e:=0.0;
246:e:=0.3; 247:e:=0.6; 248:e:=1.0; 249:e:=1.35; 250:e:=1.7;
251:e:=2.05; 252:e:=2.4; 253:e:=2.75; 254:e:=3.1; 255:e:=3.45;
256:e:=3.8; 257:e:=4.15; 258:e:=4.5; 259:e:=4.85; 260:e:=5.2;
261:e:=5.55; 262:e:=5.9; 263:e:=6.25; 264:e:=6.6; 265:e:=6.95;
266:e:=7.3; 267:e:=7.65; 268:e:=8.0; 269:e:=8.35; 270:e:=8.7;
271:e:=9.05; 272:e:=9.4; 273:e:=9.7; 274:e:=10.0; 275:e:=10.35;
276:e:=10.7; 277:e:=11.0; 278:e:=11.3; 279:e:=11.6; 280:e:=11.9;
281:e:=12.2; 282:e:=12.5; 283:e:=12.75; 284:e:=13.0; 285:e:=13.25;
286:e:=13.5; 287:e:=13.75; 288:e:=14.0; 289:e:=14.25; 290:e:=14.5;
291:e:=14.75; 292:e:=14.95; 293:e:=15.1; 294:e:=15.2; 295:e:=15.35;
296:e:=15.5; 297:e:=15.65; 298:e:=15.8; 299:e:=15.9; 300:e:=16.0;
301:e:=16.1; 302:e:=16.2; 303:e:=16.25; 304:e:=16.35; 305:e:=16.4;
306:e:=16.45; 307:e:=16.5; 308:e:=16.45; 309:e:=16.4; 310:e:=16.35;
311:e:=16.3; 312:e:=16.25; 313:e:=16.2; 314:e:=16.1; 315:e:=16.0;
316:e:=15.9; 317:e:=15.8; 318:e:=15.65; 319:e:=15.5; 320:e:=15.35;
321:e:=15.2; 322:e:=15.0; 323:e:=14.8; 324:e:=14.6; 325:e:=14.3;
326:e:=14.05; 327:e:=13.8; 328:e:=13.55; 329:e:=13.3; 330:e:=13.0;
331:e:=12.7; 332:e:=12.4; 333:e:=12.0; 334:e:=11.7; 335:e:=11.3;
336:e:=10.9; 337:e:=10.5; 338:e:=10.1; 339:e:=9.7; 340:e:=9.3;
341:e:=8.9; 342:e:=8.45; 343:e:=8.0; 344:e:=7.55; 345:e:=7.1;
346:e:=6.65; 347:e:=6.2; 348:e:=5.8; 349:e:=5.3; 350:e:=4.8;
351:e:=4.3; 352:e:=3.8; 353:e:=3.3; 354:e:=2.8; 355:e:=2.3;
356:e:=1.8; 357:e:=1.3; 358:e:=0.8; 359:e:=0.3; 360:e:=-0.2;
361:e:=-0.7; 362:e:=-1.2; 363:e:=-1.7; 364:e:=-2.2; 365:e:=-2.7;
366:e:=-3.0;
end;
ephemeris:=e;
END;

{*************************************************************}
Function OzoneThickness (latitude, solardeclination:real):real;
{based on the model atmosphere data of McClatchey et al. (1971)
see Davies and Hay 1980: Calculation of the solar radiation incident
on a horizontal surface. Proceedings of the first Canadian solar radiation
data workshop. Edited by Hay and Won}

```
VAR
    summer,
    abslat : real;

BEGIN
     summer:=latitude*solardeclination;
     abslat:=abs(latitude);
     if(abslat<0.52360) then OzoneThickness:=2.3;
     if(abslat>=0.5236) and (abslat<=1.0472) and (summer>0.0) then
OzoneThickness:=3.1;
     if(abslat>=0.5236) and (abslat<=1.0472) and (summer<=0.0) then
OzoneThickness:=3.9;
     if(abslat>1.0472) and (summer>0.0) then OzoneThickness:=3.4;
     if(abslat>1.0472) and (summer<=0.0) then OzoneThickness:=4.5;
END;   {of Function OzoneThickness}

{*************************************************************}
Function ConvertToHours(seconds:longint):real;
VAR
      dum1,dum2,dum3:real;
    date:DateTimeRec;
BEGIN
    Secs2Date(seconds,date);
     dum1:=date.second/3600;
     dum2:=date.minute/60;
    dum3:=date.hour;
     ConvertToHours:=dum1+dum2+dum3;
END;   {of function ConvertToHours}

{*************************************************************}
{$S AIDMradn}
{*************************************************************}
Procedure GetClearSkyRadiation (julianday:integer;

latitude,longitude,temperature,dewpointtemp,atmospress,hourofday:real;
    var ClearSkyRadiation:real;var error:boolean);

CONST
    pi = 3.1417;
    sigma = 5.6696e-8;   {stefan-boltzman constant  w.m-2.k-4}
    g = 9.8;         {acc du to gravity m.s-2}
    vk = 0.4;         {von karman's constant}
    cp = 1003.0;       {sp ht of air at const press j.kg-1.k-1}
    gamma = 66.0;       {psychrometric constant pa.k-1}
```

```
    conv = 0.0174533;     {conversion from degrees to radians}
    inct = 600;           {increment in time between calculations in seconds}

VAR
    rayle: array[1..19] of real;

n,        {counter}
 nt,        {number of time stops in the time period}
 iem,       {integer portion of em (real)}
 daynumber  {julian day of the year}
   : integer;

p,        {atmospheric pressure in Pa}
  alpha,    {surface albedo as a fraction}
  phi,      {latitude in radians}
  delta,    {solar declination}
  thetao,   {to calculate delta}
  rrvsq,    {recip of radius vector of the sun}
  uo,       {ozone layer thickness in mm.}
  rad15,    {15 degrees in radians}
 cosp,
 sinp,
 cosd,
 sind,
 acap,  { }
  uw,       {precipitable water}
  tu,       {temperature at upper level}
  tdu,      {dew point temperature at upper level}
  del,      {time increment in hours (=inct/3600)}
 h,         {hour angle}
 cosz,      {cos of solar zenith angle}
  kex,      {extraterrestrial solar irradiance}
  em,       {relative optical air mass}
  dem,      {dummy of em}
  x1,       {path length for ozone absorption}
  aouv,     {absorptivity of ozone in the uv spectrum}
  aovis,    {absorptivity of ozone in the visible}
  tro,      {transmissivity after ozone absorption}
  trr,      {transmissivity after rayleigh scattering}
  x2,       {temp and pressure corrected path length for water vapor}
  aw,       {absorptivity of water vapor}
  tra,      {transmissivity after aerosol extinction}
  alphab,   {albedo of atmosphere for upwelling radiation}
 s,         {direct solar irradiance}
  dr,       {diffuse irradiance from rayleigh scattering}
```

```
  da,     {diffuse irradiance from aerosol}
  ds,     {diffuse irradiance from backscatterance}
  kdown,  {global solar irradiance in watts per square meter}
  kjoules {solar energy in kilo-joules per square meter}
    : real;
BEGIN
  rayle[1]:=0.8973;
  rayle[2]:=0.8344;
  rayle[3]:=0.7872;
  rayle[4]:=0.7493;
  rayle[5]:=0.7177;
  rayle[6]:=0.6907;
  rayle[7]:=0.6671;
  rayle[8]:=0.6463;
  rayle[9]:=0.6276;
  rayle[10]:=0.6108;
  rayle[11]:=0.5955;
  rayle[12]:=0.5815;
  rayle[13]:=0.5686;
  rayle[14]:=0.5566;
  rayle[15]:=0.5455;
  rayle[16]:=0.5351;
  rayle[17]:=0.5254;
  rayle[18]:=0.5162;
  rayle[19]:=0.4919;
  ClearSkyRadiation:=0.0;
  p:=atmospress*100.0;
  tu:=temperature;
  tdu:=dewpointtemp;
  phi:=latitude*conv;
  rad15:=15.0*conv;
  alpha:=0.5;
    daynumber:=julianday;
    thetao:=2*pi*(daynumber-1)/365.0;
    rrvsq:=1.0011+0.034221*cos(thetao)+0.00128*sin(thetao)+
        0.000719*cos(2.0*thetao)+0.000077*sin(2.0*thetao);
    delta:=0.006918-0.399912*cos(thetao)+0.070257*sin(thetao)-
        0.006758*cos(2.0*thetao)+0.000907*sin(2.0*thetao)-
        0.002697*cos(3.0*thetao)+0.00148*sin(3.0*thetao);
  cosp:=cos(phi);
  sinp:=sin(phi);
  cosd:=cos(delta);
  sind:=sin(delta);
  uo:=OzoneThickness (phi,delta);
```

```
    acap:=0.02023;
     if(daynumber>=90) and (daynumber<=180) then acap:=-0.0229;
    uw:=exp((0.07074*tdu)+acap);
   tu:=tu+273.16;
   tdu:=tdu+273.16;
{GetVapPress(tdu,eu)}
   nt:=(3600)div inct;
   del:=inct/3600.0;
 for n:=1 to nt do
 begin
    h:=(12.0-hourofday)*rad15;
    hourofday:=hourofday+del;
    cosz:=(sinp*sind)+(cosp*cosd*cos(h));
    if(cosz<0.02) then cosz:=0.0;
    kex:=1353.0*rrvsq*cosz;
    if(kex<=0.0)then kdown:=0.0
      else
        begin
         em:=1.0/cosz;
         x1:=uo*em;
             aouv:=(0.1082*x1)/(exp(0.805*ln(1.0+13.86*x1)))+(0.00658*x1)/
             (1.0+(exp(3.0*ln(10.36*x1))));
             aovis:=(0.002118*x1)/(1.0+0.0042*x1+3.23e-6*x1*x1);
         tro:=1.0-aouv-aovis;
         if(em>18.8)then trr:=0.5093
          else
            begin
             iem:=trunc(em);
             dem:=em-iem;
              trr:=rayle[iem]-(rayle[iem]-rayle[iem+1])*dem;
            end;
         x2:=(uw*em)*exp(0.75*ln(p/101.325))*sqrt(tu/273.16);
         aw:=(0.29*x2)/(exp(0.635*ln(1.0+14.15*x2))+0.5925*x2);
       tra:=exp(em*ln(0.91));
        alphab:=0.0685+0.15*(1.0-tra);
        s:=kex*((tro*trr)-aw)*tra;
        dr:=kex*tro*(1.0-trr)*tra/2.0;
        da:=kex*((tro*trr)-aw)*(1.0-tra)*0.85;
          ds:=alphab*alpha*(s+dr+da)/(1.0-(alphab*alpha));
        kdown:=s+dr+da+ds;
      end;
    kjoules:=kdown*inct/1000;
    ClearSkyRadiation:=ClearSkyRadiation+kjoules;
```

```
            if(ClearSkyRadiation<0.0) then ClearSkyRadiation:=0.0;
    end;
END;    {of ClearSkyRad}
{****************************************************************}
Procedure CheckCode (code:char; hour, julianday:integer);
begin
        if (code='s') then
            writeln(printer,'data estimated at ',hour,' on day ',julianday);
        if (code='t') then
            writeln(printer,'composite data at ',hour,' on day ',julianday);
        if (code='u') then
            writeln(printer,'composite data at ',hour,' on day ',julianday);
        if (code='x') then
            writeln(printer,'data invalid at ',hour,' on day ',julianday);
        if (code='y') then
            writeln(printer,'data missing at ',hour,' on day ',julianday);
        if (code='z') then
            writeln(printer,'data unprocessed at ',hour,' on day ',julianday);
end;

{****************************************************************}
Function  LGama(x:real):real;
CONST
    a = -0.5748646;
    b = 0.9512363;
    c = -0.6998588;
    d = 0.4245549;
    e = -0.1010678;
      EulerConst=0.5772156649;

VAR
   i,
   j : integer;

dummy,
   lny,
   num,
   Gama,
   RecipGama: real;

BEGIN
   IF (x<1.0)
   THEN
     BEGIN
       dummy:=1.0;
```

```
            for j:=1 to 10 do
              BEGIN
                num:=j;
                    dummy:=dummy*(1+x/num)*exp(-x/num);
              END;
              RecipGama:=x*exp(EulerConst*x)*dummy;
              Gama:=1/RecipGama;
              LGama:=ln(Gama);
            END
          ELSE
          BEGIN
              x := x-1;
              lny := 0.0;
              IF(x>=1.0)
              THEN
                BEGIN
                  i := trunc(x);
                  for j:= 1 to i do
                    BEGIN
                        lny:=lny + ln(x);
                        x:=x-1;
                    END;
                END;
              dummy := 1+a*x+b*x*x+c*x*x*x+d*x*x*x*x+e*x*x*x*x*x;
              LGama := lny + ln(dummy);
          END;
      END;

{***********************************************************}
PROCEDURE GetBetaPDF (x,dp,dq,GamaConst:real;var PDFx:real;var
error:boolean);
{November 16th 1987   from MiniTab equation.}

VAR
    lnx : real;

BEGIN
    IF (x=0.0) or (x=1.0)
    THEN  BEGIN
            PDFx:=0.0;
            exit;
          END
    ELSE
```

```
BEGIN
   lnx:=GamaConst+(dp-1.0)*ln(x)+(dq-1.0)*ln(1.0-x);
   PDFx:=exp(lnx);
  END;
END;

{************************************************************}
Procedure GetBetaCDF (minx,maxx,dp,dq,GamaConst:real;var CDFx:real;var error:boolean);

CONST
   delx = 0.002;

VAR
   newx,
   PDFx : real;

BEGIN
   newx:=minx;
    GetBetaPDF (newx,dp,dq,GamaConst,PDFx,error);
    IF (error=true)
   THEN exit;
   CDFx:=PDFx*delx/2.0;
    newx:=newx+delx;
   WHILE(newx<maxx) DO
     BEGIN
        GetBetaPDF (newx,dp,dq,GamaConst,PDFx,error);
        IF (error=true)
       THEN exit;
      CDFx:=CDFx + PDFx*delx;
        newx:=newx+delx;
      END;
    newx:=maxx;
    GetBetaPDF (newx,dp,dq,GamaConst,PDFx,error);
    IF (error=true)
   THEN exit;
   CDFx:=CDFx + PDFx*delx/2.0;
END;

{************************************************************}
Procedure GetEvapoTranspiration(SolarRad, DryBulb, WetBulb, TimeInSecs:real;
           var Evapotrans:real);
```

{dated May 4 1988}

```
VAR
     {EvapoTrans,    total evapotranspiration in mm per time interval, or
Kg/sq m/time.}
     SolarTrans,    {evapotranspiration due to solar energy input in ditto}
     DiffTrans,     {evapotranspiration due to water vapor gradients in
ditto}
     NetRadiation,  {radiation after taking into account various
attenuations - w/sq m}
     vaporresist,   {resistance to vapor movement in secs/m}
     airdens,       {density of air in kg/cu m}
     latheat,       {latent heat of water in J/kg}
     svpress,       {saturation vapor pressure in Pa}
     svslope,       {slope of the svp curve}
     vaporpress,    {vapor pressure in Pa}
     {DryBulb,      dry bulb temperature in C}
     {WetBulb,      wet bulb temperature in C}
     Const1,
     Const2,
     Const3,
     AirPress       {atmos pressure in Pa}
  :real;

m:integer;

BEGIN
    AirPress:=atmospress*100.0;
    airdens:=airdensity(drybulb);
    latheat:=latentheat(drybulb);
    svpress:=satvappress(drybulb);
    svslope:=satvapslope(drybulb);
    vaporpress:=vappress(drybulb,wetbulb);
    vaporresist:=vapresistance;
  SolarRad       := SolarRad/3.6;
  NetRadiation   := SolarRad*CoverTrans*(1-CropReflection)*
       ((1.0-CropTransmission)+CropTransmission*(FloorReflectivity));
  Const1         := svslope/(svslope+PsychroConstant);
   SolarTrans    := Const1*TimeInSecs*NetRadiation/latheat;
  Const2         := PsychroConstant/(svslope+PsychroConstant);
  Const3         := (svpress-vaporpress)/vaporresist;
  DiffTrans      := Const2*TimeInSecs*MolecularWeightRatio*Const3
          *airdens/AirPress;
```

```
        DiffTrans      := DiffTrans;
        EvapoTrans     := SolarTrans+DiffTrans;
END;

{***********************************************************}
PROCEDURE GetRadiation;

VAR
solarhour,     {solar time}
factor
        :real;
julianday
        :integer;

BEGIN
tab:=chr(9);
latitude:=40.8;
longitude:=81.92;
for m:=1 to 24 do
    begin
        ClearSkyRad[m]:=0.0;
        CSRwatts[m]:=0.0;
        ClearPAR[m]:=0.01;
        probs[1,m]:=1.0;
        probs[2,m]:=0.0;
        probs[3,m]:=0.0;
    end;
julianday:=dayOfYear;
writeln('          Getting the hourly irradiance and probabilities');
    writeln(' ');
    writeln(' ');
    writeln(' ');
writeln('              Sorry!  Takes a little time.');
    writeln(' ');
    writeln(' ');
    writeln(' ');
c:=(75.0-longitude)*4.0;
e:=ephemeris(julianday);
totalclearskyrad:=0.0;
factor:=0.45*CoverTrans*(1-CropReflection)*
    ((1.0-CropTransmission)+CropTransmission*(FloorReflectivity));
GamaConst:=LGama(betavar1+betavar2)-LGama(betavar1)-
LGama(betavar2);
```

```
for m:=6 to 20 do
     begin
         solarhour:=m+(c+e)/60.0;
             GetClearSkyRadiation (julianday,latitude,longitude,
                  airtemp,dewpointtemp,atmospress,solarhour,
             ClearSkyRad[m],error);
              TotalClearSkyRad:=totalclearskyrad+ClearSkyRad[m];
         CSRwatts[m]:=ClearSkyRad[m]/3.6;
         ClearPAR[m]:=(ClearPAR[m]+CSRwatts[m])*factor;
     end;
writeln;
writeln('                    Now getting the probabilities');
    writeln(' ');
    writeln(' ');
    writeln(' ');
    writeln(' ');
    writeln(' ');
    writeln(' ');
    writeln(' ');
for m:=6 to 20 do
   begin
   minx:=0.0;
    maxx:=50.0/ClearPAR[m];
   IF (maxx>1.0)
   THEN
      begin
      probs[1,m]:=1.0;
      probs[2,m]:=0.0;
      probs[3,m]:=0.0;
      end
   ELSE
     BEGIN
        GetBetaCDF(minx, maxx, betavar1, betavar2, GamaConst, CDFx, error);
      probs[1,m]:=CDFx;
       minx:=50.0/ClearPAR[m];
       maxx:=150.0/ClearPAR[m];
      IF (maxx>1.0)
      THEN
         begin
            probs[2,m]:=1.0-probs[1,m];
         probs[3,m]:=0.0;
         end
      ELSE
         BEGIN
```

```
        GetBetaCDF(minx, maxx, betavar1, betavar2, GamaConst, CDFx,
error);
        probs[2,m]:=CDFx;
            probs[3,m]:=1.0-probs[2,m]-probs[1,m];
      END;
    END;
  end;
END;
```

© 1988 BAHM, INC.

© 1988 BAHM, INC.

question(growth)=Which of the following best describes the plant growth?
legalvals(growth)=stunted,normal,elongated
question(leaf_color)=If leaves are affected, which of the following best describes the color?
legalvals(leaf_color)=normal_green,yellow/green,fading_to_brown,bronzed, dark_green,pale_green_to_yellow
question(leaf_margins)=What is the color of the leaf margins?
legalvals(leaf_margins)=normal_green,yellow/green
question(problem_location)=Where on the plant is the problem located?
legalvals(problem_location)=older_leaves,younger_leaves,uniform
question(flower_size)=What is the size of the flowers on the plant?
legalvals(flower_size)=none,small,normal,large
question(leaf_size)=What is the size of the upper leaves?
legalvals(leaf_size)=small,normal,large
question(internode_length)=What is the internode length of the younger nodes of the plant?
legalvals(internode_length)=short,normal,long
question(chlorosis)=Is there chlorosis present in the leaves?
legalvals(chlorosis)=yes,no,blotchy
question(chlorosis_flow)=Is there any movement of any chlorosis present?
legalvals(chlorosis_flow)=no_movement,leaf_edge_inwards
question(leaf_characteristics)=What are the characteristics of the leaves?
legalvals(leaf_characteristics)=normal,stiff,wilting,dessicated
question(problem_flow)=What is the flow direction of the problem?
legalvals(problem_flow)=older_to_younger_leaves,younger_to_older_leaves
question(apical_meristem)=How does the apical_meristem of the plant look?
legalvals(apical_meristem)=normal,dead
question(leaf_shape)=What is the shape of the leaves?
legalvals(leaf_shape)=normal,curved,cupped_upwards,cupped_downwards
question(leaf_appearance)=What is the appearance of the leaf surface?
legalvals(leaf_appearance)=normal,brown_veins,fine_interveinal_mottling, coarse_interveinal_mottling
question(necrosis)=Are there any necrotic areas on the leaves?
legalvals(necrosis)=none,slight,between_the_veins,leaf_edges
question(leaf_burn)=Is there leaf burn on any of the leaves?
legalvals(leaf_burn)=yes,no
question(new_leaf_size)=What is the size of new leaves?
legalvals(new_leaf_size)=normal,small rule1:    if
growth=stunted   and leaf_color=yellow/green and
problem_location=older_leaves and
flower_size=large and
leaf_nitrate=not_known
then
nutrition=deficiency_in_nitrogen.

rule2:     if
growth=stunted and
leaf_color=dark_green and
leaf_burn=yes and
problem_location=older_leaves and
leaf_shape=curved and
leaf_nitrate=not_known
then
nutrition=surplus_of_nitrogen.

question(leaf_nitrate)=What is the nitrate-nitrogen present in dry leaf analysis?
legalvals(leaf_nitrate)=not_known,less_than_0.1%,from_0.1%_to_0.3%,more_than_0.3% rule3:     if
leaf_nitrate=less_than_0.1%
then
nutrition=deficiency_in_nitrogen.

rule4:     if
leaf_nitrate=more_than_0.3%
then
nutrition=surplus_of_nitrogen.

rule5:     if
growth=stunted and
leaf_color=fading_to_brown and
leaf_phosphorus=not_known
then
nutrition=deficiency_in_phosphorus.

question(leaf_phosphorus)=What is the phosphate present in dry leaf analysis?
legalvals(leaf_phosphorus)=not_known,less_than_0.8%,more_than_0.8% rule7: if
leaf_phosphorus=less_than_0.8%
then
nutrition=deficiency_in_phosphorus.

rule9: if
growth=stunted and
internode_length=short and
leaf_size=small and
leaf_color=bronzed and
leaf_margins=yellow/green and
leaf_potassium=not_known
then
nutrition=deficiency_in_potassium.

question(leaf_potassium)=What is the potassium present in dry leaf analysis?
legalvals(leaf_potassium)=not_known,less_than_3%,more_than_3% rule11: if
leaf_potassium=less_than_3%
then
nutrition=deficiency_in_potassium.

rule13: if
chlorosis=yes and
chlorosis_flow=leaf_edge_inwards and
problem_flow=older_to_younger_leaves and
leaf_magnesium=not_known
then
nutrition=deficiency_in_magnesium.

question(leaf_magnesium)=What is the magnesium present in dry leaf analysis?
legalvals(leaf_magnesium)=not_known,less_than_0.5%,more_than_0.5% rule15: if
leaf_magnesium=less_than_0.5%
then
nutrition=deficiency_in_magnesium.

rule17: if
chlorosis=yes and chlorosis_flow=no_movement and
growth=stunted and
internode_length=short and
problem_location=younger_leaves and
leaf_calcium=not_known
then
nutrition=deficiency_in_calcium.

question(leaf_calcium)=What is the calcium present in dry leaf analysis?
legalvals(leaf_calcium)=not_known,less_than_6%,more_than_6% rule19:   if
leaf_calcium=less_than_6%
then
nutrition=deficiency_in_calcium.

rule21:   if
growth=stunted and
leaf_size=small and
leaf_color=pale_green_to_yellow and
problem_location=younger_leaves and
leaf_sulphur=not_known
then
nutrition=deficiency_in_sulphur.

question(leaf_sulphur)=What is the sulphur present in dry leaf analysis?
legalvals(leaf_sulphur)=not_known,less_than_0.6%,more_than_0.6% rule23:   if
leaf_sulphur=less_than_0.6%
then
nutrition=deficiency_in_sulphur.

rule25:   if
apical_meristem=dead and
leaf_shape=cupped_upwards and
leaf_characteristics=stiff and
leaf_boron=not_known
then
nutrition=deficiency_in_boron.

rule26:   if
leaf_margins=yellow/green   and problem_location=older_leaves and
leaf_shape=cupped_downwards and
leaf_characteristics=wilting and
problem_flow=older_to_younger_leaves and
growth=stunted and
leaf_size=small and
leaf_boron=not_known
then
nutrition=surplus_of_boron.

question(leaf_boron)=What is the boron present in dry leaf analysis?
legalvals(leaf_boron)=not_known,less_than_40ppm,from_40ppm_to_300ppm,more_than_300ppm rule27: if
leaf_boron=less_than_40ppm
then
nutrition=deficiency_in_boron.

rule28: if
leaf_boron=more_than_300ppm
then
nutrition=surplus_of_boron.

rule29: if
growth=stunted and
internode_length=short and
leaf_size=small and
chlorosis=blotchy and
leaf_copper=not_known
then
nutrition=deficiency_in_copper.

question(leaf_copper)=What is the copper present in dry leaf analysis?
legalvals(leaf_copper)=not_known,less_than_7ppm,more_than_7ppm rule31: if
leaf_copper=less_than_7ppm
then
nutrition=deficiency_in_copper.

rule33: if
leaf_appearance=fine_interveinal_mottling and problem_location=younger_leaves and
necrosis=between_the_veins and
growth=stunted and
new_leaf_size=small and
leaf_manganese=not_known
then
nutrition=deficiency_in_manganese.

rule34: if
leaf_appearance=brown_veins and
problem_location=older_leaves and
necrosis=between_the_veins and
problem_flow=older_to_younger_leaves and
leaf_manganese=not_known
then
nutrition=surplus_of_manganese.

question(leaf_manganese)=What is the manganese present in dry leaf analysis?
legalvals(leaf_manganese)=not_known,less_than_100ppm,from_100ppm_to_500ppm,more_than_500ppm rule35: if
leaf_manganese=less_than_100ppm
then
nutrition=deficiency_in_manganese.

rule36: if
leaf_manganese=more_than_500ppm
then
nutrition=surplus_of_manganese.

rule37: if
leaf_color=pale_green_to_yellow and
problem_location=older_leaves and
problem_flow=older_to_younger_leaves and
flower_size=small and
leaf_molybdenum=not_known
then
nutrition=deficiency_in_molybdenum.

question(leaf_molybdenum)=What is the molybdenum present in dry leaf analysis?

legalvals(leaf_molybdenum)=not_known,less_than_0.8ppm,more_than_0.8ppm rule39: if
leaf_molybdenum=less_than_0.8ppm
then
nutrition=deficiency_in_molybdenum.

rule41: if
leaf_appearance=fine_interveinal_mottling and
problem_location=younger_leaves and
necrosis=leaf_edges and
problem_flow=younger_to_older_leaves and
leaf_iron=not_known
then
nutrition=deficiency_in_iron.

question(leaf_iron)=What is the iron present in dry leaf analysis?
legalvals(leaf_iron)=not_known,less_than_100ppm,more_than_100ppm rule43: if
leaf_iron=less_than_100ppm
then
nutrition=deficiency_in_iron.

rule45: if
leaf_appearance=coarse_interveinal_mottling and
problem_location=older_leaves and
necrosis=slight and
internode_length=short and
problem_flow=older_to_younger_leaves and
leaf_zinc=not_known
then
nutrition=deficiency_in_zinc.

question(leaf_zinc)=What is the zinc present in dry leaf analysis?
legalvals(leaf_zinc)=not_known,less_than_100ppm,from_100ppm_to_900ppm,more_than_900ppm rule47: if
leaf_zinc=less_than_100ppm
then
nutrition=deficiency_in_zinc.

rule48: if
leaf_zinc=more_than_900ppm
then
nutrition=surplus_of_zinc.

question(crop_height)=What is the height of the plant?
legalvals(crop_height)=less_than_four_feet,more_than_four_feet
question(fruit_presence)=Is there fruit present on the plant?
legalvals(fruit_presence)=yes,no
question(picking)=Have you started picking fruit from the crop?
legalvals(picking)=yes,no
question(flower_presence)=Is there an abundance of flowers present on the crop?
legalvals(flower_presence)=yes,no rule50: if
crop_height=less_than_four_feet and
flower_presence=no
then
physage=plant_to_flower.

rule51: if
crop_height=more_than_four_feet and
picking=no and
flower_presence=no
then
physage=plant_to_flower.

rule52: if
fruit_presence=yes and
picking=yes
then
physage=fruiting.

rule53: if
flower_presence=yes and
fruit_presence=yes and
picking=no
then
physage=flower_to_fruit.

question(recipe)=What is the recipe number?

legalvals(recipe)=1,2,3,4,5,6,7,8,9 rule101: if
physage=plant_to_flower and
recipe=1
then
nitrogen=75_to_120_mg/l and
potassium=150_to_240_mg/l and
calcium=80_to_120_mg/l and
phosphorus=40_to_75_mg/l and
magnesium=30_to_50_mg/l and
sulphur=30_to_40_mg/l and
MaxEC=1800_micromhos.

rule102: if
physage=plant_to_flower and
recipe=2
then
nitrogen=75_to_120_mg/l and
potassium=150_to_240_mg/l and
calcium=120_to_160_mg/l and
phosphorus=40_to_75_mg/l and
magnesium=30_to_50_mg/l and
sulphur=30_to_40_mg/l and
MaxEC=1800_micromhos.

rule103: if
physage=plant_to_flower and
recipe=3
then
nitrogen=75_to_120_mg/l and
potassium=150_to_240_mg/l and
calcium=160_to_200_mg/l and
phosphorus=40_to_75_mg/l and
magnesium=30_to_50_mg/l and
sulphur=30_to_40_mg/l and
MaxEC=1800_micromhos.

rule104 if
physage=plant_to_flower and
recipe=4
then
nitrogen=120_to_160_mg/l and potassium=240_to_320_mg/l and
calcium=80_to_120_mg/l and
phosphorus=40_to_75_mg/l and
magnesium=30_to_50_mg/l and
sulphur=30_to_40_mg/l and
MaxEC=1800_micromhos.

rule105: if
physage=plant_to_flower and
recipe=5
then
nitrogen=120_to_160_mg/l and
potassium=240_to_320_mg/l and
calcium=120_to_160_mg/l and
phosphorus=40_to_75_mg/l and
magnesium=30_to_50_mg/l and
sulphur=30_to_40_mg/l and
MaxEC=1800_micromhos.

rule106: if
physage=plant_to_flower and
recipe=6
then
nitrogen=120_to_160_mg/l and
potassium=240_to_320_mg/l and
calcium=160_to_200_mg/l and
phosphorus=40_to_75_mg/l and
magnesium=30_to_50_mg/l and
sulphur=30_to_40_mg/l and
MaxEC=1800_micromhos.

rule107: if
physage=plant_to_flower and
recipe=7
then
nitrogen=160_to_200_mg/l and
potassium=320_to_400_mg/l and
calcium=80_to_120_mg/l and
phosphorus=40_to_75_mg/l and
magnesium=30_to_50_mg/l and
sulphur=30_to_40_mg/l and
MaxEC=1800_micromhos.

rule108: if
physage=plant_to_flower and
recipe=8
then
nitrogen=160_to_200_mg/l and
potassium=320_to_400_mg/l and
calcium=120_to_160_mg/l and
phosphorus=40_to_75_mg/l and
magnesium=30_to_50_mg/l and
sulphur=30_to_40_mg/l and
MaxEC=1800_micromhos.

rule109: if
physage=plant_to_flower and
recipe=9
then
nitrogen=160_to_200_mg/l and
potassium=320_to_400_mg/l and
calcium=160_to_200_mg/l and
phosphorus=40_to_75_mg/l and
magnesium=30_to_50_mg/l and
sulphur=30_to_40_mg/l and
MaxEC=1800_micromhos.

rule111: if
physage=flower_to_fruit and
recipe=1
then
nitrogen=150_to_200_mg/l and
potassium=300_to_400_mg/l and
calcium=60_to_140_mg/l and
phosphorus=40_to_75_mg/l and
magnesium=30_to_50_mg/l and
sulphur=30_to_40_mg/l and
MaxEC=2500_micromhos.

rule112: if
physage=flower_to_fruit and
recipe=2
then
nitrogen=150_to_200_mg/l and
potassium=300_to_400_mg/l and
calcium=140_to_220_mg/l and phosphorus=40_to_75_mg/l and
magnesium=30_to_50_mg/l and
sulphur=30_to_40_mg/l and
MaxEC=2500_micromhos.

rule113: if
physage=flower_to_fruit and
recipe=3
then
nitrogen=150_to_200_mg/l and
potassium=300_to_400_mg/l and
calcium=220_to_300_mg/l and
phosphorus=40_to_75_mg/l and
magnesium=30_to_50_mg/l and
sulphur=30_to_40_mg/l and
MaxEC=2500_micromhos.

rule114: if
physage=flower_to_fruit and
recipe=4
then
nitrogen=200_to_250_mg/l and
potassium=400_to_500_mg/l and
calcium=60_to_140_mg/l and
phosphorus=40_to_75_mg/l and
magnesium=30_to_50_mg/l and
sulphur=30_to_40_mg/l and
MaxEC=2500_micromhos.

rule115: if
physage=flower_to_fruit and
recipe=5
then
nitrogen=200_to_250_mg/l and
potassium=400_to_500_mg/l and
calcium=140_to_220_mg/l and
phosphorus=40_to_75_mg/l and
magnesium=30_to_50_mg/l and
sulphur=30_to_40_mg/l and
MaxEC=2500_micromhos.

rule116: if
physage=flower_to_fruit and recipe=6
then
nitrogen=200_to_250_mg/l and
potassium=400_to_500_mg/l and
calcium=220_to_300_mg/l and
phosphorus=40_to_75_mg/l and
magnesium=30_to_50_mg/l and
sulphur=30_to_40_mg/l and
MaxEC=2500_micromhos.

rule117: if
physage=flower_to_fruit and
recipe=7
then
nitrogen=250_to_300_mg/l and
potassium=500_to_600_mg/l and
calcium=60_to_140_mg/l and
phosphorus=40_to_75_mg/l and
magnesium=30_to_50_mg/l and
sulphur=30_to_40_mg/l and
MaxEC=2500_micromhos.

rule118: if
physage=flower_to_fruit and
recipe=8
then
nitrogen=250_to_300_mg/l and
potassium=500_to_600_mg/l and
calcium=140_to_220_mg/l and
phosphorus=40_to_75_mg/l and
magnesium=30_to_50_mg/l and
sulphur=30_to_40_mg/l and
MaxEC=2500_micromhos.

rule119: if
physage=flower_to_fruit and
recipe=9
then
nitrogen=250_to_300_mg/l and
potassium=500_to_600_mg/l and
calcium=220_to_300_mg/l and
phosphorus=40_to_75_mg/l and
magnesium=30_to_50_mg/l and sulphur=30_to_40_mg/l and
MaxEC=2500_micromhos.

rule121: if
physage=fruiting and
recipe=1
then
nitrogen=50_to_100_mg/l and
potassium=100_to_200_mg/l and
calcium=80_to_150_mg/l and
phosphorus=40_to_75_mg/l and
magnesium=30_to_50_mg/l and
sulphur=30_to_40_mg/l and
MaxEC=2500_micromhos.

rule122: if
physage=fruiting and
recipe=2
then
nitrogen=50_to_100_mg/l and
potassium=100_to_200_mg/l and
calcium=150_to_230_mg/l and
phosphorus=40_to_75_mg/l and
magnesium=30_to_50_mg/l and
sulphur=30_to_40_mg/l and
MaxEC=2500_micromhos.

rule123: if
physage=fruiting and
recipe=3
then
nitrogen=50_to_100_mg/l and
potassium=100_to_200_mg/l and
calcium=230_to_300_mg/l and
phosphorus=40_to_75_mg/l and
magnesium=30_to_50_mg/l and
sulphur=30_to_40_mg/l and
MaxEC=2500_micromhos.

rule124: if
physage=fruiting and
recipe=4
then nitrogen=100_to_150_mg/l and
potassium=200_to_300_mg/l and
calcium=80_to_150_mg/l and
phosphorus=40_to_75_mg/l and
magnesium=30_to_50_mg/l and
sulphur=30_to_40_mg/l and
MaxEC=2500_micromhos.

rule125: if
physage=fruiting and
recipe=5
then
nitrogen=100_to_150_mg/l and
potassium=200_to_300_mg/l and
calcium=150_to_230_mg/l and
phosphorus=40_to_75_mg/l and
magnesium=30_to_50_mg/l and
sulphur=30_to_40_mg/l and
MaxEC=2500_micromhos.

rule126: if
physage=fruiting and
recipe=6
then
nitrogen=100_to_150_mg/l and
potassium=200_to_300_mg/l and
calcium=230_to_300_mg/l and
phosphorus=40_to_75_mg/l and
magnesium=30_to_50_mg/l and
sulphur=30_to_40_mg/l and
MaxEC=2500_micromhos.

rule127: if
physage=fruiting and
recipe=7
then
nitrogen=150_to_200_mg/l and
potassium=300_to_400_mg/l and
calcium=80_to_150_mg/l and
phosphorus=40_to_75_mg/l and
magnesium=30_to_50_mg/l and
sulphur=30_to_40_mg/l and
MaxEC=2500_micromhos.

rule128: if
physage=fruiting and
recipe=8
then
nitrogen=150_to_200_mg/l and
potassium=300_to_400_mg/l and
calcium=150_to_230_mg/l and
phosphorus=40_to_75_mg/l and
magnesium=30_to_50_mg/l and
sulphur=30_to_40_mg/l and
MaxEC=2500_micromhos.

rule129: if
physage=fruiting and
recipe=9
then
nitrogen=150_to_200_mg/l and
potassium=300_to_400_mg/l and
calcium=230_to_300_mg/l and
phosphorus=40_to_75_mg/l and
magnesium=30_to_50_mg/l and
sulphur=30_to_40_mg/l and
MaxEC=2500_micromhos.

© 1988 BAHM, INC.

APPENDIX B

CROP NUTRITION RULEBASE

Discussion

The rulebase includes the questions and legal values that were acceptable to the inference software. It was deemed better to define the possible answers and give the operator a choice of answers. This circumvented the problem of mis-spelling of words and parsing of sentences.

The rulebase © 1988 BAHM, INC.

question(growth)=Which of the following best describes the plant growth?
legalvals(growth)=stunted, normal, elongated question(leaf_color)=If leaves are affected, which of the following best describes the color?
legalvals(leaf_color)=normal_green, yellow/green, fading_to_brown, bronzed, dark_green, pale_green_to_yellow question(leaf_margins)=What is the color of the leaf margins?
legalvals(leaf_margins)=normal_green, yellow/green question(problem_location)=Where on the plant is the problem located?
legalvals(problem_location)=older_leaves, younger_leaves, uniform question(flower_size)=What is the size of the flowers on the plant?
legalvals(flower_size)=none, small, normal, large question(leaf_size)=What is the size of the upper leaves?
legalvals(leaf_size)=small, normal, large question(internode_length)=What is the internode length of the younger nodes of the plant?
legalvals(internode_length)=short, normal, long question(chlorosis)=Is there chlorosis present in the leaves?
legalvals(chlorosis)=yes, no, blotchy question(chlorosis_flow)=Is there any movement of any chlorosis present?
legalvals(chlorosis_flow)=no_movement, leaf_edge_inwards question(leaf_characteristics)=What are the characteristics of the leaves?
legalvals(leaf_characteristics)=normal, stiff, wilting, dessicated question(problem_flow)=What is the flow direction of the problem?
legalvals(problem_flow)=older_to_younger_leaves, younger_to_older_leaves question(apical_meristem)=How does the apical meristem of the plant look?
legalvals(apical_meristem)=normal, dead question(leaf_shape)=What is the shape of the leaves?
legalvals(leaf_shape)=normal, curved, cupped_upwards, cupped_downwards question(leaf_appearance)=What is the appearance of the leaf surface?
legalvals(leaf_appearance)=normal, brown_veins, fine_interveinal_mottling, coarse_interveinal_mottling question(necrosis)=Are there any necrotic areas on the leaves?
legalvals(necrosis)=none, slight, between_the_veins, leaf_edges question(leaf_burn)=Is there leaf burn on any of the leaves?
legalvals(leaf_burn)=yes, no question(new_leaf_size)=What is the size of new leaves?
legalvals(new_leaf_size)=normal, small rule1:              if
      growth=stunted and
      leaf_color=yellow/green and
      problem_location=older_leaves and
      flower_size=large and
      leaf_nitrate=not_known
      then
      nutrition=deficiency_in_nitrogen.

rule2:              if
      growth=stunted and
      leaf_color=dark_green and
      leaf_burn=yes and
      problem_location=older_leaves and
      leaf_shape=curved and
      leaf_nitrate=not_known
      then
      nutrition=surplus_of_nitrogen.

question(leaf_nitrate)=What is the nitrate-nitrogen present in dry leaf analysis?
legalvals(leaf_nitrate)=not_known, less_than_0.1%, from_0.1%_to_0.3%, more_than_0.3% rule3:              if
      leaf_nitrate=less_than_0.1%
      then
      nutrition=deficiency_in_nitrogen.

rule4:         if
leaf_nitrate=more_than_0.3%
then
nutrition=surplus_of_nitrogen.

rule5:         if
growth=stunted and
leaf_color=fading_to_brown and
leaf_phosphorus=not_known
then
nutrition=deficiency_in_phosphorus.

question(leaf_phosphorus)=What is the phosphate present in dry leaf analysis?
legalvals(leaf_phosphorus)=not_known, less_than_0.8%, more_than_0.8% rule7:         if
leaf_phosphorus=less_than_0.8%
then
nutrition=deficiency_in_phosphorus.

rule9:         if
growth=stunted and
internode_length=short and
leaf_size=small and
leaf_color=bronzed and
leaf_margins=yellow/green and
leaf_potassium=not_known
then
nutrition=deficiency_in_potassium.

question(leaf_potassium)=What is the potassium present in dry leaf analysis?
legalvals(leaf_potassium)=not_known, less_than_3%, more_than_3%

>        rule11:     if
>        leaf_potassium=less_than_3%
>        then
>        nutrition=deficiency_in_potassium.
>
>        rule13:     if
>        chlorosis=yes and
>        chlorosis_flow=leaf_edge_inwards and
>        problem_flow=older_to_younger_leaves and
>        leaf_magnesium=not_known
>        then
>        nutrition=deficiency_in_magnesium.

question(leaf_magnesium)=What is the magnesium present in dry leaf analysis?
legalvals(leaf_magnesium)=not_known, less_than_0.5%, more_than_0.5%

>        rule15:     if
>        leaf_magnesium=less_than_0.5%
>        then
>        nutrition=deficiency_in_magnesium.
>
>        rule17:     if
>        chlorosis=yes and
>        chlorosis_flow=no_movement and
>        growth=stunted and
>        internode_length=short and
>        problem_location=younger_leaves and leaf_calcium=not_known
then
nutrition=deficiency_in_calcium.

question(leaf_calcium)=What is the calcium present in dry leaf analysis?
legalvals(leaf_calcium)=not_known, less_than_6%, more_than_6% rule19:    if
    leaf_calcium=less_than_6%
    then
    nutrition=deficiency_in_calcium.

rule21:    if
    growth=stunted and
    leaf_size=small and
    leaf_color=pale_green_to_yellow and
    problem_location=younger_leaves and
    leaf_sulphur=not_known
    then
    nutrition=deficiency_in_sulphur.

question(leaf_sulphur)=What is the sulphur present in dry leaf analysis?
legalvals(leaf_sulphur)=not_known, less_than_0.6%, more_than_0.6% rule23:    if
    leaf_sulphur=less_than_0.6%
    then
    nutrition=deficiency_in_sulphur.

rule25:    if
    apical_meristem=dead and leaf_shape=cupped_upwards and
leaf_characteristics=stiff and
leaf_boron=not_known
then
nutrition=deficiency_in_boron.

rule26: if
leaf_margins=yellow/green and
problem_location=older_leaves and
leaf_shape=cupped_downwards and
leaf_characteristics=wilting and
problem_flow=older_to_younger_leaves and
growth=stunted and
leaf_size=small and
leaf_boron=not_known
then
nutrition=surplus_of_boron.

question(leaf_boron)=What is the boron present in dry leaf analysis?
legalvals(leaf_boron)=not_known, less_than_40ppm,
from_40ppm_to_300ppm, more_than_300ppm rule27: if
leaf_boron=less_than_40ppm
then
nutrition=deficiency_in_boron.

rule28: if
leaf_boron=more_than_300ppm
then
nutrition=surplus_of_boron.

rule29: if
growth=stunted and internode_length=short and
leaf_size=small and
chlorosis=blotchy and
leaf_copper=not_known
then
nutrition=deficiency_in_copper.

question(leaf_copper)=What is the copper present in dry leaf analysis?
legalvals(leaf_copper)=not_known, less_than_7ppm, more_than_7ppm rule31:　　if
leaf_copper=less_than_7ppm
then
nutrition=deficiency_in_copper.

rule33:　　if
leaf_appearance=fine_interveinal_mottling and
problem_location=younger_leaves and
necrosis=between_the_veins and
growth=stunted and
new_leaf_size=small and
leaf_manganese=not_known
then
nutrition=deficiency_in_manganese.

rule34:　　if
leaf_appearance=brown_veins and
problem_location=older_leaves and
necrosis=between_the_veins and
problem_flow=older_to_younger_leaves and
leaf_manganese=not_known
then nutrition=surplus_of_manganese.

question(leaf_manganese)=What is the manganese present in dry leaf analysis?
legalvals(leaf_manganese)=not_known, less_than_100ppm, from_100ppm_to_500ppm, more_than_500ppm > rule35: if
> leaf_manganese=less_than_100ppm
> then
> nutrition=deficiency_in_manganese.
>
> rule36: if
> leaf_manganese=more_than_500ppm
> then
> nutrition=surplus_of_manganese.
>
> rule37: if
> leaf_color=pale_green_to_yellow and
> problem_location=older_leaves and
> problem_flow=older_to_younger_leaves and
> flower_size=small and
> leaf_molybdenum=not_known
> then
> nutrition=deficiency_in_molybdenum.

question(leaf_molybdenum)=What is the molybdenum present in dry leaf analysis?
legalvals(leaf_molybdenum)=not_known, less_than_0.8ppm, more_than_0.8ppm > rule39: if
> leaf_molybdenum=less_than_0.8ppm
> then nutrition=deficiency_in_molybdenum.

rule41: if
leaf_appearance=fine_interveinal_mottling and
problem_location=younger_leaves and
necrosis=leaf_edges and
problem_flow=younger_to_older_leaves and
leaf_iron=not_known
then
nutrition=deficiency_in_iron.

question(leaf_iron)=What is the iron present in dry leaf analysis?
legalvals(leaf_iron)=not_known, less_than_100ppm,
more_than_100ppm rule43: if
leaf_iron=less_than_100ppm
then
nutrition=deficiency_in_iron.

rule45: if
leaf_appearance=coarse_interveinal_mottling and
problem_location=older_leaves and
necrosis=slight and
internode_length=short and
problem_flow=older_to_younger_leaves and
leaf_zinc=not_known
then
nutrition=deficiency_in_zinc.

question(leaf_zinc)=What is the zinc present in dry leaf analysis?
legalvals(leaf_zinc)=not_known, less_than_100ppm,
from_100ppm_to_900ppm, more_than_900ppm rule47: if
leaf_zinc=less_than_100ppm
then
nutrition=deficiency_in_zinc.

rule48: if
leaf_zinc=more_than_900ppm
then
nutrition=surplus_of_zinc.

question(crop_height)=What is the height of the plant?
legalvals(crop_height)=less_than_four_feet, more_than_four_feet
question(fruit_presence)=Is there fruit present on the plant?
legalvals(fruit_presence)=yes, no
question(picking)=Have you started picking fruit from the crop?
legalvals(picking)=yes, no
question(flower_presence)=Is there an abundance of flowers present on the crop?
legalvals(flower_presence)=yes, no rule50: if
crop_height=less_than_four_feet and
flower_presence=no
then
physage=plant_to_flower.

rule51: if
crop_height=more_than_four_feet and
picking=no and
flower_presence=no
then
physage=plant_to_flower.

rule52: if fruit_presence=yes and
picking=yes
then
physage=fruiting.

rule53:    if
flower_presence=yes and
fruit_presence=yes and
picking=no
then
physage=flower_to_fruit.

question(recipe)=What is the recipe number?
legalvals(recipe)=1, 2, 3, 4, 5, 6, 7, 8, 9 rule101:    if
physage=plant_to_flower and
recipe=1
then
nitrogen=75_to_120_mg/l and
potassium=150_to_240_mg/l and
calcium=80_to_120_mg/l and
phosphorus=40_to_75_mg/l and
magnesium=30_to_50_mg/l and
sulphur=30_to_40_mg/l and
MaxEC=1800_micromhos.

rule102:    if
physage=plant_to_flower and
recipe=2
then
nitrogen=75_to_120_mg/l and
potassium=150_to_240_mg/l and
calcium=120_to_160_mg/l and phosphorus=40_to_75_mg/l and
magnesium=30_to_50_mg/l and
sulphur=30_to_40_mg/l and
MaxEC=1800_micromhos.

rule103: if
physage=plant_to_flower and
recipe=3
then
nitrogen=75_to_120_mg/l and
potassium=150_to_240_mg/l and
calcium=160_to_200_mg/l and
phosphorus=40_to_75_mg/l and
magnesium=30_to_50_mg/l and
sulphur=30_to_40_mg/l and
MaxEC=1800_micromhos.

rule104 if
physage=plant_to_flower and
recipe=4.
then
nitrogen=120_to_160_mg/l and
potassium=240_to_320_mg/l and
calcium=80_to_120_mg/l and
phosphorus=40_to_75_mg/l and
magnesium=30_to_50_mg/l and
sulphur=30_to_40_mg/l and
MaxEC=1800_micromhos.

rule105: if
physage=plant_to_flower and
recipe=5
then
nitrogen=120_to_160_mg/l and potassium=240_to_320_mg/l and
calcium=120_to_160_mg/l and
phosphorus=40_to_75_mg/l and
magnesium=30_to_50_mg/l and
sulphur=30_to_40_mg/l and
MaxEC=1800_micromhos.

rule106: if
physage=plant_to_flower and
recipe=6
then
nitrogen=120_to_160_mg/l and
potassium=240_to_320_mg/l and
calcium=160_to_200_mg/l and
phosphorus=40_to_75_mg/l and
magnesium=30_to_50_mg/l and
sulphur=30_to_40_mg/l and
MaxEC=1800_micromhos.

rule107: if
physage=plant_to_flower and
recipe=7
then
nitrogen=160_to_200_mg/l and
potassium=320_to_400_mg/l and
calcium=80_to_120_mg/l and
phosphorus=40_to_75_mg/l and
magnesium=30_to_50_mg/l and
sulphur=30_to_40_mg/l and
MaxEC=1800_micromhos.

rule108: if
physage=plant_to_flower and
recipe=8
then
nitrogen=160_to_200_mg/l and
potassium=320_to_400_mg/l and
calcium=120_to_160_mg/l and phosphorus=40_to_75_mg/l and
magnesium=30_to_50_mg/l and
sulphur=30_to_40_mg/l and
MaxEC=1800_micromhos.

rule109: if
physage=plant_to_flower and
recipe=9
then
nitrogen=160_to_200_mg/l and
potassium=320_to_400_mg/l and
calcium=160_to_200_mg/l and
phosphorus=40_to_75_mg/l and
magnesium=30_to_50_mg/l and
sulphur=30_to_40_mg/l and
MaxEC=1800_micromhos.

rule111: if
physage=flower_to_fruit and
recipe=1
then
nitrogen=150_to_200_mg/l and
potassium=300_to_400_mg/l and
calcium=60_to_140_mg/l and
phosphorus=40_to_75_mg/l and
magnesium=30_to_50_mg/l and
sulphur=30_to_40_mg/l and
MaxEC=2500_micromhos.

rule112: if
physage=flower_to_fruit and
recipe=2
then
nitrogen=150_to_200_mg/l and
potassium=300_to_400_mg/l and
calcium=140_to_220_mg/l and
phosphorus=40_to_75_mg/l and
magnesium=30_to_50_mg/l and sulphur=30_to_40_mg/l and
MaxEC=2500_micromhos.

rule113: if
physage=flower_to_fruit and
recipe=3
then
nitrogen=150_to_200_mg/l and
potassium=300_to_400_mg/l and
calcium=220_to_300_mg/l and
phosphorus=40_to_75_mg/l and
magnesium=30_to_50_mg/l and
sulphur=30_to_40_mg/l and
MaxEC=2500_micromhos.

rule114: if
physage=flower_to_fruit and
recipe=4
then
nitrogen=200_to_250_mg/l and
potassium=400_to_500_mg/l and
calcium=60_to_140_mg/l and
phosphorus=40_to_75_mg/l and
magnesium=30_to_50_mg/l and
sulphur=30_to_40_mg/l and
MaxEC=2500_micromhos.

rule115: if
physage=flower_to_fruit and
recipe=5
then
nitrogen=200_to_250_mg/l and
potassium=400_to_500_mg/l and
calcium=140_to_220_mg/l and
phosphorus=40_to_75_mg/l and
magnesium=30_to_50_mg/l and
sulphur=30_to_40_mg/l and
MaxEC=2500_micromhos.

rule116: if
physage=flower_to_fruit and
recipe=6
then
nitrogen=200_to_250_mg/l and
potassium=400_to_500_mg/l and
calcium=220_to_300_mg/l and
phosphorus=40_to_75_mg/l and
magnesium=30_to_50_mg/l and
sulphur=30_to_40_mg/l and
MaxEC=2500_micromhos.

rule117: if
physage=flower_to_fruit and
recipe=7
then
nitrogen=250_to_300_mg/l and
potassium=500_to_600_mg/l and
calcium=60_to_140_mg/l and
phosphorus=40_to_75_mg/l and
magnesium=30_to_50_mg/l and
sulphur=30_to_40_mg/l and
MaxEC=2500_micromhos.

rule118:
physage=flower_to_fruit and
recipe=8
then
nitrogen=250_to_300_mg/l and
potassium=500_to_600_mg/l and
calcium=140_to_220_mg/l and
phosphorus=40_to_75_mg/l and
magnesium=30_to_50_mg/l and
sulphur=30_to_40_mg/l and
MaxEC=2500_micromhos.

rule119: if
physage=flower_to_fruit and recipe=9
then
nitrogen=250_to_300_mg/l and
potassium=500_to_600_mg/l and
calcium=220_to_300_mg/l and
phosphorus=40_to_75_mg/l and
magnesium=30_to_50_mg/l and
sulphur=30_to_40_mg/l and
MaxEC=2500_micromhos.

rule121:   if
physage=fruiting and
recipe=1
then
nitrogen=50_to_100_mg/l and
potassium=100_to_200_mg/l and
calcium=80_to_150_mg/l and
phosphorus=40_to_75_mg/l and
magnesium=30_to_50_mg/l and
sulphur=30_to_40_mg/l and
MaxEC=2500_micromhos.

rule122:   if
physage=fruiting and
recipe=2
then
nitrogen=50_to_100_mg/l and
potassium=100_to_200_mg/l and
calcium=150_to_230_mg/l and
phosphorus=40_to_75_mg/l and
magnesium=30_to_50_mg/l and
sulphur=30_to_40_mg/l and
MaxEC=2500_micromhos.

rule123:   if
physage=fruiting and
recipe=3
then nitrogen=50_to_100_mg/l and
potassium=100_to_200_mg/l and
calcium=230_to_300_mg/l and
phosphorus=40_to_75_mg/l and
magnesium=30_to_50_mg/l and
sulphur=30_to_40_mg/l and
MaxEC=2500_micromhos.

rule124:   if
physage=fruiting and
recipe=4
then
nitrogen=100_to_150_mg/l and
potassium=200_to_300_mg/l and
calcium=80_to_150_mg/l and
phosphorus=40_to_75_mg/l and
magnesium=30_to_50_mg/l and
sulphur=30_to_40_mg/l and
MaxEC=2500_micromhos.

rule125:   if
physage=fruiting and
recipe=5
then
nitrogen=100_to_150_mg/l and
potassium=200_to_300_mg/l and
calcium=150_to_230_mg/l and
phosphorus=40_to_75_mg/l and
magnesium=30_to_50_mg/l and
sulphur=30_to_40_mg/l and
MaxEC=2500_micromhos.

rule126:   if
physage=fruiting and
recipe=6
then
nitrogen=100_to_150_mg/l and
potassium=200_to_300_mg/l and calcium=230_to_300_mg/l and
phosphorus=40_to_75_mg/l and
magnesium=30_to_50_mg/l and
sulphur=30_to_40_mg/l and
MaxEC=2500_micromhos.

rule127:    if
physage=fruiting and
recipe=7
then
nitrogen=150_to_200_mg/l and
potassium=300_to_400_mg/l and
calcium=80_to_150_mg/l and
phosphorus=40_to_75_mg/l and
magnesium=30_to_50_mg/l and
sulphur=30_to_40_mg/l and
MaxEC=2500_micromhos.

rule128:    if
physage=fruiting and
recipe=8
then
nitrogen=150_to_200_mg/l and
potassium=300_to_400_mg/l and
calcium=150_to_230_mg/l and
phosphorus=40_to_75_mg/l and
magnesium=30_to_50_mg/l and
sulphur=30_to_40_mg/l and
MaxEC=2500_micromhos.

rule129: if
physage=fruiting and
recipe=9
then
nitrogen=150_to_200_mg/l and
potassium=300_to_400_mg/l and
calcium=230_to_300_mg/l and
phosphorus=40_to_75_mg/l and
magnesium=30_to_50_mg/l and
sulphur=30_to_40_mg/l and
MaxEC=2500_micromhos.

© 1988 BAHM, INC.

APPENDIX C
The $\beta$ Distribution
Description

The family of beta densities is a two-parameter family of densities that is positive on the interval (0,1) and can assume quite a variety of different shapes. The beta probability density function has the property of totalling unity when integrated from 0 to 1. It was deemed the most appropriate function to model the probability distribution of a set of data. It has the flexibility required to reflect the variance of a set of data, and it is unimodal so that a local maximum may be established.

If a set of data is found to be bimodal or multi-modal, then it is most probably insufficiently described. The correct priors should reduce the function to a unimodal one. Thus the $\beta$ distribution was select as the distribution to describe the data provided that a sufficient number of priors was used.

In the model proposed by Mustacchi, Cena and Rocchi (1979) the probability density functions of solar radiation were bimodal, but they were only considering sectioning the year by summer, winter or the whole year. No other priors obtained from weather forecasts such as weather front positions and locations of high and low pressures were considered by them.

In general, the $\beta$ distribution is described as follows:

$$\beta(a,b) = \frac{\Gamma(a+b)}{\Gamma(a)*\Gamma(b)} \quad (C.1)$$

where the $\Gamma$ function is:

$$\Gamma(t) = \int_0^\infty x^{(t-1)} e^{-x} dx, \ t > 0 \quad (C.2)$$

The $\beta$ probability density function, PDF is:

$$f(x) = \frac{\Gamma(a+b)}{\Gamma(a)*\Gamma(b)} * x^{(a-1)} * (1-x)^{(b-1)}, \{x\epsilon(0,1)\} \quad (C.3)$$

with $a>0$ and $b>0$.

The $\beta$ cumulative distribution function, CDF, is the integral of this between chosen limits, that is:

$$\int_{min}^{max} f(x)dx = \frac{\Gamma(a+b)}{\Gamma(a)*\Gamma(b)} \int_{min}^{max} x^{(a-1)} * (1-x)^{(b-1)} dx \quad (C.4)$$

The various characteristics of the $\beta$ function are as follows: the mode, $$c = \frac{a-1}{a+b-2} \quad (C.5)$$

the mean, $$\mu = \frac{a}{a+b} \quad (C.6)$$

and the variance, $$\sigma^2 = \frac{ab}{(a+b+1)(a+b)^2}. \quad (C.7)$$

Derivation of a and b parameters

In order to use the $\beta$ distribution it was necessary to derive the two parameters, a and b, used in the function. This was done as follows.

Using the sample mean $\bar{x}$ and the sample variance $s^2$ as estimates of $\mu$ and $\sigma^2$, define a parameter dum, such that:

$$dum = \frac{\bar{x}}{1-\bar{x}} \quad (C.8)$$

Now, from the definition of the mean, $\mu$, equation F.6 above, $$a = dum * b \quad (C.9)$$

Using the definition of $\sigma^2$ (equation F.7 above), b can be derived from:

$$b = \frac{dum}{s^2(dum + 1)^3} - \frac{1}{dum + 1}. \quad (C.10)$$

Thus, knowing the sample mean and the sample variance of a set of numbers between zero and one, the $\beta$ parameters, a and b, could be derived to give the $\beta$ function for the set.

APPENDIX D

Clear Sky Irradiance Model

Model history

The solar radiation model used in the decision model was assembled using the notes and work from a course by Dr. A. John Arnfield of Ohio State University on microclimatology. A computer program written by Dr. Arnfield for distribution at the annual meeting of the Association of American Geographers on Apr.23rd, 1984, entitled "Surface climate simulation model. Level IV: Radiative-Conductive-Convective equilibrium (moist surface)" and the paper by Davies and Hay, 1980, were also used for reference.

Model construction

The distance from the sun to the earth changes during the year. The earth rotates about an angled axis at a rate that is not constant and the atmosphere changes from minute to minute. All these factors and more had to be considered in the computation of the radiation received at the earth's surface from the sun. The model was constructed to take account of these and other items as follows.

Extra-terrestrial solar irradiance was computed from the radius vector of the sun, the cosine of the solar zenith angle and the solar constant. The zenith angle is a function of the latitude of the site, the solar declination and the hour angle, or time of day. The time of day was expressed in solar time, and that changes from day to day by the ephemeris of the sun.

Equation D.1 gives the derivation of $K_{EX}$, the extra-terrestrial solar irradiance for a given place and time.

$$K_{EX} = I_o \left(\frac{\overline{d}}{d}\right)^2 \cos(z) \quad (D.1)$$

where $$\cos(z) = \sin\phi \sin\delta + \cos\phi \cos\delta \cos(H) \quad (D.2)$$

and $I_o = 1353$ (w.m$^{-2}$)

$[\overline{d}/d]$ = ratio of the mean sun distance to the actual sun distance on that day $\phi$ = latitude $\delta$ = solar declination $H$ = hour angle which included the ephemeris of the sun.

Once the extra-terrestrial irradiance was established an account was made of different parts of the atmosphere that absorbed and/or scattered the incoming radiation.

Attenuation

Radiation passing through the atmosphere is attenuated by water, carbon dioxide, ozone, nitrogen, oxygen, dust and clouds. This attenuation occurs as a function of the gas or particles and the wavelength of the radiation. Different wavelengths are attenuated as follows:

- wavelengths of less than 0.12 μm are removed in the thermosphere by oxygen, nitrogen and photoionization,
- wavelengths from 0.12 μm to 0.18 μm are attenuated by the photodissociation of oxygen in the stratosphere,
- wavelengths from 0.18 μm to 0.34 μm are attenuated by ozone and photodissociation of oxygen,
- wavelengths from 0.34 μm to 0.70 μm are not significantly absorbed, and,
- wavelengths from 0.70 μm to 4.0 μm are primarily absorbed by carbon dioxide and water vapor.

Scattering

Scattering comes in two primary forms, Rayleigh scattering and Mie scattering. Rayleigh is very strongly wavelength dependent being approximately proportional to (wavelength)$^{-4}$. It is symmetrical in that similar amounts of radiation are scattered both forwards and backwards. When Rayleigh scattering dominates, the sky will be blue. Mie scattering is due to particles and aerosols and is approximately independent of wavelength. It is primarily forwards oriented. When Mie scattering dominates, the sky will be white.

Attenuation in the model

The model defined four parameters that would attenuate irradiance so that the clear sky irradiance could be computed from $K_{EX}$, the extraterrestrial irradiance. They are listed below.

$T_o(U_o m)$—Transmission after absorption by ozone. This was a function of the thickness of the ozone layer, $U_o$, and the relative optical air mass, m, that the ray passes through. m was a function of the solar zenith angle.

$T_R(m)$—Transmission after Rayleigh scattering. This was a function of the relative optical air mass, m, alone.

$a_w(u_w m)$—Absorption due to water vapor. This was a function of the precipital water, $u_w$, in the atmosphere and the air mass, m. It was not to be confused with cloud cover. It was the amount of water present in the atmosphere at all levels.

$T_a(m)$—Transmission after attenuation by aerosols. This was a function of the air mass.

Global shortwave radiation is composed of the solar direct irradiance, which is the component that has not been absorbed or scattered, and the diffuse irradiance, which is the component that has not been absorbed, but has been scattered down. Diffuse irradiance arrives at a point from a solid angle of $2\pi$, that is all over the hemisphere.

Solar direct irradiance

The direct irradiance received at the earth's surface was expressed in equation D.3.

$$S = K_{EX}[T_o(u_o m) * T_R(m) - a_w(u_w M)] * T_a(m) \quad (D.3)$$

where $U_o$ was read from Table D.3 which gave a value in mm. for the ozone thickness over the tropics, the mid-latitudes and the polar regions for summer and winter, and, m=sec(z), where z is the solar zenith angle (Davies and Hay 1980).

TABLE D.3

| | Ozone thickness, $u_o$, in mm. | |
|---|---|---|
| | summer | winter |
| tropics | 2.3 | 2.3 |
| mid-latitudes | 3.1 | 3.9 |
| polar | 3.4 | 4.5 |

$T_o(u_o m)$

To compute the absorption of the radiation by the ozone layer, the following equations were used; for ultra-violet $$a_o^{uv} = \frac{0.1082 \, u_o m}{(1 + 13.86 \, u_o m)^{0.805}} + \frac{0.00658 \, u_o m}{1 + (10.36 \, u_o m)^3} \quad (D.4)$$

for the visible $$a_o^{vis} = \frac{0.002118 \, u_o m}{1 + 0.0042 \, u_o m + 3.23 \cdot 10^{-6} (u_o m)^2} \quad (D.5)$$

then, $$T_o(u_o m) = 1 - a_o^{uv} - a_o^{vis} \text{ TM} \quad (D.6)$$

$T_R(m)$

Transmission after Rayleigh scattering is complex. Sellers gives it as:

$$T_R(m) = \frac{\int_0^\infty I_\lambda e^{-\tau \lambda R m d\lambda}}{1353} \quad (D.7)$$

where $I_\lambda$ is the spectral radiation intensity at wavelength $\lambda$ and $\tau_{80\,R}$ is the atmospheric optical depth. These figures have been computed and tabulated for various air masses, m (Davies and Hay 1980). In the model, the figures were looked up from a table which was stored as a vector and then used in an algorithm to derive $T_R$. Table D.4 shows the numbers that were used in the model.

TABLE D.4

| $T_4$ factor as a function of m. | |
|---|---|
| m | $T_R$ factor |
| 1 | 0.8973 |
| 2 | 0.8344 |
| 3 | 0.7872 |
| 4 | 0.7493 |
| 5 | 0.7177 |
| 6 | 0.6907 |
| 7 | 0.6671 |
| 8 | 0.6463 |
| 9 | 0.6276 |
| 10 | 0.6108 |
| 11 | 0.5955 |
| 12 | 0.5815 |
| 13 | 0.5686 |
| 14 | 0.5566 |
| 15 | 0.5455 |
| 16 | 0.5351 |
| 17 | 0.5254 |
| 18 | 0.5162 |
| 19 | 0.4919 |

The algorithm used to derive $T_R$ was as follows:
If $m > 18.8$, then $T_R = 0.5093$,
otherwise, $$T_R = T_R factor(int \, m) - (T_R factor(int \, m) - T_R factor(int \, m+1)) * fract \, m \quad (D.8)$$

where
  int m was the integer portion of m, and
  fract m was the fractional portion of m.

$a_w(u_w m)$

Attenuation due to precipitable water, $a_w$ was first corrected for temperature, T, and pressure, p, as follows;

$$(u_w m)' = (u_w m) \left(\frac{p}{p_o}\right)^{\frac{3}{4}} \left(\frac{273}{T}\right)^{\frac{1}{2}} \quad (D.9)$$

where,
  $(u_w m)'$ was the corrected value of $(u_w m)$, and,
  po = 101352 Pa.

Once corrected, the precipitable water was computed from;

$$a_w((u_w m)') = \frac{0.29(u_w m)'}{(1 + 14.15(u_w m)')^{0.635} + 0.5925(u_w m)'} \quad (D.10)$$

$T_a(m)$

Transmission of irradiance through aerosols was treated by simply using equation G.11 and substituting a value for k.

$$T_a(m) = k^m \quad (D.11)$$

k at 0.95 seemed to be a good figure for seaside areas and places low in aerosols. Under industrial conditions a value of 0.88 was better. The model used a value of 0.91 for Wooster, which was the same as the value used by Arnfield for Columbus.

Solar diffuse irradiance

Diffuse irradiance is made up of components from Rayleigh scattering, scattering from aerosols and back-scatterance.

The equation is shown in D.12

$$D = D_R + D_A + D_s \quad (D.12)$$

where:

$$D_R = \frac{K_{EX} T_o(u_o m)[1 - T_R(m)] T_a(m)}{2} \quad (D.13)$$

$$D_A = K_{EX}[T_o(u_o m) T_R(m) - a_w(u_w m)][1 - T_a(m)] w_o B_a \quad (D.14)$$

and, $$D_s = (S + D_R + D_A)(a_s a_b + a_s^2 a_b^2 + \dots) \quad (D.15);$$

where
  $w_o$ was the single-scattering albedo, and $$w_o = \frac{\text{amount scattered by aerosol}}{\text{total amount attenuated by aerosol}} \quad (D.16)$$

$w_o$ had a value of unity in the model, i.e. all was scattered;

and $B_a$ was the amount scattered downwards by aerosols and which evidence suggested has a value of 0.85 according to Arnfield, and where $a_s$ was the albedo of the earth's surface, and $a_b$ was the albedo of the atmosphere.

the infinite series was taken into account by dividing by $(1 - a_s a_b)$, giving $$D_S = \frac{(S + D_R + D_A)a_s a_b}{1 - a_s a_b} \quad (D.17)$$

Total irradiance

Total irradiance $K \downarrow$ was the sum of the direct and the diffuse irradiance, $$K \downarrow = S + D \quad (D.18)$$

What is claimed is:

1. An apparatus for controlling, during a given period of time, component quantities of a system affected by one or more stochastic variables and by one or more measured variables to direct the system toward a desired status, said apparatus comprising:

controller means for controlling the component quantities of the system;

determining means for determining the stochastic variables and the measured variables preceding the given period of time; memory means for storing initial data corresponding to the stochastic variables and the measured variables determined by said determining means; and computer control means including:

estimating means for estimating projected stochastic variables for the given period of time based on the initial data in the memory means;

calculating means for calculating projected component quantities having the highest probability of producing the desired status of the system based on the initial data in the memory means and based on the projected stochastic variables; and means, responsive to the calculating means, for controlling the controller means to adjust, during the given period of time, the component quantities as a function of the projected component quantities.

2. The apparatus of claim 1 wherein the system is a nutrient control system for feeding plants the given period of time is during daylight hours of a day, the component quantities are nutrient amounts provided to be provided to the plants by the nutrient control system, the stochastic variables are amounts of sunlight during the hours of daylight, the controller means is an injector system for injecting the nutrient amounts into the nutrient control system and the determining means are sensors for detecting environmental conditions of the plant.

3. The apparatus of claim 2 wherein said estimating means includes means for estimating recipes of nutrient amounts which are available, means for estimating the levels of sunlight which can occur during each hour of daylight, and means for estimating the probability that each level of sunlight will occur during each hour; and wherein said calculating means includes means for calculating, during each hour of daylight, the probability that each estimated recipe in combination with each level of sunlight will produce the desired result and means for selecting the recipe with the highest probability of producing the desired result.

4. The apparatus of claim 3 further comprising means for collecting liquid leachate from the plants and means for measuring the concentrations of the nutrients in the collected leachate and wherein said nutrient control system includes means for supplying at least a portion of the collected leachate to the plants.

5. The apparatus of claim 4 further comprising means for treating the leachate before said means for supplying supplies at least a portion of the collected leachate to the plants.

6. The apparatus of claim 5 wherein said means for treating comprises an ultraviolet or heating or membrane cleansing means.

7. The apparatus of claim 1 further comprising means for monitoring the stochastic variables during the given period of time and providing real time data representative thereof; wherein said memory means stores the real time data provided by the monitoring means; and wherein said estimating means estimates the projected stochastic variables based on the initial data and the real time data in the memory means.

8. The nutrient control system of claim 1 wherein said component quantities are individual quantities of specific elements, wherein said initial data includes forecast data, and wherein said calculating means selects a combination of elements having a corresponding maximum expected value, y(i), where:

$$y(i) = \sum_{j=1}^{n} p_k(j) * u(i,j) \text{ for } i = 1, \ldots m$$

wherein m is the number of element combinations, $p_k(j)$ is the probability of occurrence of the $j^{th}$ level of a stochastic variable predicted from the $k^{th}$ selection of parameters of a beta distribution based on the forecast data, n is the number of levels of the stochastic variable and u(i,j) is a utility function derived from the historical expertise of operating the system using the $i^{th}$ element recipe and the $j^{th}$ level of the stochastic variable.

9. A nutrient control system for nourishing plants, the system comprising:

means for providing a quantity of nourishment having individual concentrations of specific nutrients;

means for distributing the quantity of nourishment to the plants;

first storage means for storing initial data relating to the plants being nourished; and computer control means including:

means for selecting the amounts of specific nutrients and for selecting the quantity of nourishment to be applied to the plants based on the initial data in the first storage means; and means, responsive to the selecting means, for controlling the providing means to adjust the individual concentrations of the specific nutrients as a function of the initial data and the quantity of nourishment to be supplied to the plants as a function of the selected amounts of the specific nutrients and the selected quantity of nourishment.

10. The system of claim 9 wherein said selecting means includes means for estimating recipes of nutrient amounts which are available, means for estimating the levels of sunlight which can occur during each time interval of daylight, means for estimating the probability that each level of sunlight will occur during each time interval, means for calculating, for each time interval of daylight, the probability that each estimated recipe in combination with each level of sunlight will produce the desired result and means for selecting the recipe with the highest probability of producing the desired result.

11. The system of claim 9 wherein said means for providing comprises means for collecting liquid leachate from the plants and supplying at least a portion of the collected leachate as the quantity of nourishment and means for measuring the concentrations of the nutrients in the collected leachate, said means for selecting being responsive to said means for measuring.

12. The apparatus of claim 11 further comprising means for treating the leachate before said means for supplying supplies at least a portion of the collected leachate to the plants.

13. The apparatus of claim 12 wherein said means for treating comprises an ultraviolet or heating or membrane cleansing means.

14. The nutrient control system of claim 9 further comprising means for monitoring the environment of the plants as the plants are nourished and providing actual data representative of the environment; wherein said first storage means stores the actual data provided by the monitoring means; and wherein said computer control means includes projecting means for estimating the amount of specific nutrients and the quantity of liquid nourishment to be needed by the plants based on the initial data and the actual data in the first storage means.

15. The nutrient control system of claim 14 further comprising second storage means for storing expert rulebase data relating to predefined rules to be followed when nourishing the plants; and third storage means for storing options rulebase data relating to options based on the selected amounts and quantity for nourishing wherein said selecting means includes means for calculating, based on the initial data, expert rulebase data and options rulebase data, the probability that the options in the third storage means will produce a desired result in the plants, said selecting means selecting the amounts of specific nutrients in the quantity of nourishment which correspond to the option with the highest probability.

16. The nutrient control system of claim 15 wherein said means for distributing comprises an irrigation system for supplying the quantity of liquid nourishment to the plants, said means for providing is an injector system for injecting nutrients into the irrigation system, said first storage means is a first memory, said second storage means is a second memory, said third storage means is a third memory, said computer control means is a central processing unit and said means for monitoring comprises sensors for measuring the environmental conditions of the plants.

17. The nutrient control system of claim 9 wherein said selecting means comprises means for estimating the quantity of nourishment and the amounts of specific nutrients which will produce a desired result in the plants based on the initial data in the first storage means.

18. The nutrient control system of claim 17 further comprising means for monitoring the environment of the plants as the plants are nourished and providing actual data representative of the environment; wherein said first storage means stores the actual data provided by the monitoring means; and wherein said estimating means estimates the amount of specific nutrients and the quantity of liquid nourishment to be needed by the plants based on the initial data and the actual data in the first storage means.

19. The nutrient control system of claim 18 wherein said initial data includes weather forecast data, and wherein said projecting means selects a recipe of specific nutrients having a corresponding maximum expected value, y(i), where:

$$y(i) = \sum_{j=1}^{n} p_k(j) * u(i,j) \text{ for } i = 1, \ldots m$$

wherein m is the number of nutrient recipes, $p_k(j)$ is the probability of occurrence of the $j^{th}$ level of solar irradiance predicted from the $k^{th}$ selection of parameters of a beta distribution based on the weather forecast data, n is the number of solar irradiance levels, and u(i,j) is a utility function derived from the historical expertise of growing the plants using the $i^{th}$ nutrient recipe and the $j^{th}$ level of solar irradiance.

20. A nutrient control system for nourishing plants, the system comprising:
    means for providing a quantity of nourishment having individual concentrations of specific nutrients;
    means for distributing the quantity of nourishment to the plants;
    first storage means for storing initial data relating to the plants to be nourished;
    computer control means including:
        means for calculating, based on the initial data in the first storage means, the probability that various amounts of specific nutrients and various quantities of nourishment will produce a desired result in the plants;
        means, responsive to the calculating means, for selecting the amounts of specific nutrients with the highest probability and for selecting the quantity of nourishment with the highest probability;
        means, responsive to the selecting means, for controlling the providing means to adjust the individual concentrations of the specific nutrients and the quantity of nourishment to be supplied to the plants as a function of the selected amounts of specific nutrients and the selected quantity of nourishment.

21. The apparatus of claim 20 wherein said selecting means includes means for estimating recipes of nutrient amounts which are available, means for estimating the levels of sunlight which can occur during each hour of daylight, means for estimating the probability that each level of sunlight will occur during each hour, means for calculating, for each hour of daylight, the probability that each estimated recipe in combination with each level of sunlight will produce the desired result and means for selecting the recipe with the highest probability of producing the desired result.

22. The system of claim 20 wherein said means for providing comprises means for collecting liquid leachate from the plants and supplying at least a portion of the collected leachate as the quantity of nourishment and means for measuring the concentrations of the nutrients in the collected leachate, said means for selecting being responsive to said means for measuring.

23. The apparatus of claim 22 further comprising means for treating the leachate before said means for supplying supplies at least a portion of the collected leachate to the plants.

24. The apparatus of claim 23 wherein said means for treating comprises an ultraviolet or heating or membrane cleansing means.

25. A nutrient control system for nourishing plants through their roots as the plants grow, the system comprising:
- conduit means for delivering liquid nourishment to the plants;
- injector means for introducing into said conduit means a quantity of liquid nourishment having individual quantities of specific nutrients, said injector means being adjustable for varying the quantity of liquid nourishment and the individual quantities of each nutrient introduced into said conduit means;
- means for collecting liquid leachate from the roots;
- means for measuring the concentrations of specific nutrients in the liquid leachate; and
- computer control means, responsive to the measuring means, for controlling the injector means to adjust the quantity of liquid nourishment as a function of the measured concentrations of the specific nutrients and/or the individual quantities of the specific nutrients in the quantity of liquid nourishment as a function of the measured concentrations of the specific nutrients in the liquid leachate whereby the individual concentrations of the specific nutrients in the quantity of liquid nourishment is controlled in response to the concentrations of specific nutrients in the liquid leachate.

26. The nutrient control system according to claim 25 wherein the injector means comprises means for supplying fresh water having known concentrations of the specific nutrients, means for supplying the liquid leachate having known concentrations of the specific nutrients, and a plurality of injectors for supplying specific quantities of the specific nutrients to the liquid nourishment, and wherein the computer control means comprises means for controlling the relative proportions of the fresh water and liquid leachate and means for actuating the injectors to adjust the concentrations of the specific nutrients in the liquid nourishment.

27. The nutrient control system according to claim 26 wherein the means for supplying fresh water includes means for measuring the concentrations of the specific nutrients in the water and means for supplying the measured concentrations of the specific nutrients in he water to the computer controller.

28. The nutrient control system according to claim 26 wherein the means for supplying liquid leachate comprises a tank for accumulating liquid leachate, means for measuring the concentration of specific nutrients in the accumulated liquid leachate, and means for supplying the measured concentrations of the specific nutrients in the accumulated liquid leachate to the computer controller.

29. The apparatus of claim 25 wherein said computer control means includes means for estimating recipes of nutrient amounts which are available, means for estimating the various levels of sunlight which can occur, means for estimating the probability that each level of sunlight will occur, means for calculating the probability that each estimated recipe in combination with each level of sunlight will produce the desired result and means for selecting the recipe with the highest probability of producing the desired result.

30. The system of claim 25 wherein said means for providing comprises means for collecting liquid leachate from the plants and supplying at least a portion of the collected leachate as the quantity of nourishment and means for measuring the concentrations of the nutrients in the collected leachate, said means for selecting being responsive to said means for measuring.

31. The apparatus of claim 30 further comprising means for treating the leachate before said means for supplying supplies at least a portion of the collected leachate to the plants.

32. The apparatus of claim 31 wherein said means for treating comprises an ultraviolet or heating or membrane cleansing means.

33. The nutrient control system of claim 25 further comprising means for monitoring the environment of the plants as the plants are nourished and providing actual data representative of the environment; wherein said computer control means includes means for storing the actual data provided by the monitoring means and projecting means for estimating the amount of specific nutrients and the quantity of liquid nourishment to be needed by the plants based on the actual data in the first storage means, said injector means being controlled in response to the estimated amounts.

34. A method of controlling, during a given period of time, component quantities of a system affected by stochastic variables and by measured variables to direct the system toward a desired status, said method comprising the steps of:
- controlling the component quantities of the system;
- determining the stochastic variables and the measured variables preceding the given period of time;
- storing initial data corresponding to the stochastic variables and the measured variables determined by said determining step;
- estimating projected stochastic variables for the given period of time based on the initial data;
- calculating projected component quantities having the highest probability of producing the desired status of the system based on the initial data and based on the projected stochastic variables; and
- controlling, in response to said calculating step, the controlling step to adjust, during the given period of time, the component quantities as a function of the projected component quantities.

35. A nutrient control method for nourishing plants comprising the steps of:
- providing a quantity of nourishment having individual concentrations of specific nutrients;
- distributing the quantity of nourishment to the plants;
- storing initial data relating to the plants being nourished; and
- selecting the amounts of specific nutrients and selecting the quantity of nourishment to be applied to the plants based on the initial data; and
- controlling, in response to the selecting step, the providing step to adjust the quantity of the liquid nourishment as a function of the initial data the individual concentrations of the specific nutrients and the quantity of nourishment to be supplied to the plants as a function of the selected amounts of the specific nutrients and the selected quantity of nourishment.

36. A nutrient control method for nourishing plants comprising the steps of:
- providing a quantity of nourishment having individual concentrations of specific nutrients;
- distributing the quantity of nourishment to the plants;

storing initial data relating to the plants to be nourished;

calculating, based on the initial data, the probability that various amounts of sPecific nutrients and various quantities of nourishment will Produce a desired result in the plants;

selecting, in response to the calculating step, the amounts of specific nutrients with the highest probability of occurrence and for selecting the quantity of nourishment with the highest probability of occurrence;

controlling, in response to the selecting step, the providing step to adjust the individual concentrations of the specific nutrients and the quantity of nourishment to be supplied to the plants as a function of the selected amounts of specific nutrients and the selected quantity of nourishment.

37. The method of claim 36 wherein said selecting step comprises the steps of estimating recipes of nutrient amounts which are available, estimating the various levels of sunlight which can occur, estimating the probability that each level of sunlight will occur, calculating the probability that each estimated recipe in combination with each level of sunlight will produce the desired result and selecting the recipe with the highest probability of producing the desired result.

38. The method of claim 37 wherein said providing step comprises the steps of collecting liquid leachate from the plants, supplying at least a portion of the collected leachate as the quantity of nourishment, and measuring the concentrations of the nutrients in the collected leachate.

39. A nutrient control method for nourishing plants through their roots as the plants grow, comprising the steps of:

delivering liquid nourishment to the plants;

introducing into the liquid nourishment individual quantities of specific nutrients;

collecting liquid leachate from the roots;

measuring the concentrations of specific nutrients in the liquid leachate; and controlling, in response to the measuring step, the introducing step to adjust the quantity of the liquid nourishment as a function of the measured concentrations of the specific nutrients and the individual quantities of the specific nutrients in the quantity of liquid nourishment as a function of the measured concentrations of the specific nutrients in the liquid leachate whereby the individual concentrations of the specific nutrients in the quantity of liquid nourishment is controlled in response to the concentrations of specific nutrients in the liquid leachate.

40. The method of claim 39 wherein said controlling step comprises the steps of estimating recipes of nutrient amounts which are available, estimating the various levels of sunlight which can occur, estimating the probability that each level of sunlight will occur, calculating the probability that each estimated recipe in combination with each level of sunlight will produce the desired result and selecting the recipe with the highest probability of producing the desired result.

41. The method of claim 39 wherein said providing step comprises the steps of collecting liquid leachate from the plants, supplying at least a portion of the collected leachate as the quantity of nourishment and measuring the concentrations of the nutrients in the collected leachate, said selecting step being responsive to said measuring step.

42. The method of claim 41 further comprising the step of treating the leachate before said supplying step.

43. The method of claim 42 wherein said treating step comprises the step of ultraviolet cleaning, heating or membrane filtering.

44. The method of claim 41 further comprising the steps of monitoring the environment of the plants as the plants are nourished, providing actual data representative of the environment, storing the actual data provided by the monitoring means and projecting the amount of specific nutrients and the quantitY of liquid nourishment to be needed by the plants based on the actual data.

45. A nutrient control system for nourishing plants, the system comprising:

conduit means for delivering liquid nourishment to the plants;

injector means for introducing into said conduit means a quantity of liquid nourishment having individual quantities of specific nutrients, said injector means being adjustable for varying the quantity of liquid nourishment and the individual quantities of each nutrient introduced into said conduit means; and computer control means for controlling the injector means to adjust the quantity of liquid nourishment as a function of the measured concentrations of the specific nutrients and the individual quantities of the specific nutrients in the quantity of liquid nourishment whereby the amount of specific nutrients and the quantity of liquid nourishment delivered to the plants for nourishing the plants is controlled.

46. The nutrient control system according to claim 45 wherein the injector means comprises means for supplying fresh water having known concentrations of the specific nutrients, and a plurality of injectors for supplying specific quantities of the specific nutrients to the water, and wherein the computer control means comprises means for controlling the relative proportions of the fresh water and specific quantities of the specific nutrients, and means for actuating the injectors to adjust the concentrations of the specific nutrients in the liquid nourishment.

47. The nutrient control system according to claim 46 wherein the means for supplying fresh water includes means for measuring the concentrations of the specific nutrients in the water and means for supplying the measured concentrations of the specific nutrients in the water to the computer control means.

48. The apparatus of claim 45 wherein said computer control means includes means for estimating recipes of nutrient amounts which are available, means for estimating the various levels of sunlight which can occur, means for estimating the probability that each level of sunlight will occur, means for calculating the probability that each estimated recipe in combination with each level of sunlight will produce the desired result and means for selecting the recipe with the highest probability of producing the desired result.

* * * * *